US012668528B2

(12) United States Patent
Yokota et al.

(10) Patent No.: US 12,668,528 B2
(45) Date of Patent: Jun. 30, 2026

(54) GLASS ARTICLE

(71) Applicant: NIPPON ELECTRIC GLASS CO., LTD., Otsu (JP)

(72) Inventors: Yuki Yokota, Otsu (JP); Takahiro Matano, Otsu (JP); Shohei Yokoyama, Otsu (JP); Tsukasa Matsubara, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 417 days.

(21) Appl. No.: 18/024,133

(22) PCT Filed: Sep. 6, 2021

(86) PCT No.: PCT/JP2021/032580
§ 371 (c)(1),
(2) Date: Mar. 1, 2023

(87) PCT Pub. No.: WO2022/059532
PCT Pub. Date: Mar. 24, 2022

(65) Prior Publication Data
US 2023/0322613 A1      Oct. 12, 2023

(30) Foreign Application Priority Data
Sep. 15, 2020    (JP) ................................. 2020-154671

(51) Int. Cl.
*C03C 10/00* (2006.01)
*C03C 17/30* (2006.01)
(Continued)

(52) U.S. Cl.
CPC .......... *C03C 10/0027* (2013.01); *C03C 17/30* (2013.01); *F24C 15/10* (2013.01); *H05B 3/74* (2013.01); *C03C 2204/00* (2013.01)

(58) Field of Classification Search
CPC ................ C03C 10/0027; C03C 17/30; C03C 2204/00; C03C 3/083; C03C 3/087;
(Continued)

(56) References Cited

U.S. PATENT DOCUMENTS 6,413,906 B1    7/2002    Shimatani et al.
9,446,982 B2    9/2016    Siebers et al.
(Continued)

FOREIGN PATENT DOCUMENTS

CN        1285328 A      2/2001
CN        101657390 A    2/2010
(Continued)

OTHER PUBLICATIONS

Official Communication issued in corresponding European Patent Application No. 21869219.2, mailed on Oct. 11, 2024, 6 pages.
(Continued)

*Primary Examiner* — Blaine Copenheaver
(74) *Attorney, Agent, or Firm* — Keating & Bennett, LLP

(57) ABSTRACT

To provide a glass article suitable for a top plate for a cooker, in which a color tone of a colored layer is not impaired. A glass article is characterized by including a $Li_2O$—$Al_2O_3$—$SiO_2$-based crystallized glass sheet having lightness $L^*$ of 70 or greater, chromaticity $a^*$ of within ±5, and chromaticity $b^*$ of within ±5 at a thickness of 3 mm, and a colored layer formed on a back surface of the glass sheet.

7 Claims, 2 Drawing Sheets

(51) Int. Cl.
  *F24C 15/10*          (2006.01)
  *H05B 3/74*           (2006.01)
(58) Field of Classification Search
  CPC ......... C03C 3/093; C03C 3/097; F24C 15/10;
                                                    H05B 3/74
  See application file for complete search history.

(56)                References Cited

U.S. PATENT DOCUMENTS

| | | | |
|---|---|---|---|
| 2010/0099546 A1 | 4/2010 | Aitken et al. | |
| 2010/0167903 A1 | 7/2010 | Comte et al. | |
| 2011/0071011 A1 | 3/2011 | Fujisawa et al. | |
| 2013/0047672 A1 | 2/2013 | Comte et al. | |
| 2017/0260086 A1 | 9/2017 | Plevacova et al. | |
| 2019/0062201 A1 | 2/2019 | Weiss et al. | |
| 2022/0033298 A1* | 2/2022 | Yokota | C03C 10/0054 |
| 2022/0212980 A1* | 7/2022 | Yokota | C03C 13/00 |
| 2023/0159379 A1* | 5/2023 | Yokota | C03C 4/082 |
| | | | 501/7 |
| 2023/0312403 A1* | 10/2023 | Matano | C03C 21/002 |
| | | | 501/7 |
| 2023/0357070 A1* | 11/2023 | Matano | C03C 21/002 |

| | | | |
|---|---|---|---|
| 2023/0382787 A1* | 11/2023 | Yokota | C03C 3/085 |
| 2025/0002397 A1* | 1/2025 | Yokota | C03C 3/083 |

FOREIGN PATENT DOCUMENTS

| | | |
|---|---|---|
| CN | 102036926 A | 4/2011 |
| CN | 106795039 A | 5/2017 |
| JP | 39-21049 B | 9/1964 |
| JP | 40-20182 B | 9/1965 |
| JP | 01-308845 A | 12/1989 |
| JP | H11228181 A | 8/1999 |
| JP | 2010-510952 A | 4/2010 |
| JP | 2012046413 A | 3/2012 |
| JP | 2015074596 A | 4/2015 |
| JP | 2016108202 A | 6/2016 |
| JP | 2017-222561 A | 12/2017 |

OTHER PUBLICATIONS

Official Communication issued in corresponding Chinese Patent Application No. 202180057973.7, mailed on Jan. 25, 2025, 10 pages.
Official Communication issued in International Patent Application No. PCT/JP2021/032580, mailed on Nov. 16, 2021.

* cited by examiner

GLASS ARTICLE

TECHNICAL FIELD

The present invention relates to a glass article suitable for a top plate for a cooker.

BACKGROUND ART

A $Li_2O$—$Al_2O_3$—$SiO_2$-based crystallized glass substrate with a low thermal expansion coefficient is used for a top plate for a cooker such as an induction cooker, a radiant heater cooker, and a gas cooker (see Patent Literatures 1 to 3, for example). Such a glass substrate of a top plate for a cooker includes a cooking surface and a back surface located inside of the cooker.

The back surface of the glass substrate of the top plate for a cooker is generally formed with a colored layer for a purpose of improving the design and concealing a structure inside the cooker.

CITATION LIST

Patent Literature

Patent Literature 1: JP 39-21049 B
Patent Literature 2: JP 40-20182 B
Patent Literature 3: JP 01-308845 A

SUMMARY OF INVENTION

Technical Problem

However, the $Li_2O$—$Al_2O_3$—$SiO_2$-based crystallized glass is colored due to $TiO_2$, $Fe_2O_3$, and the like, and thus, there is a problem that a color tone of a colored layer is impaired, and as a result, the appearance of the top plate for a cooker is impaired.

An object of the present invention is to provide a glass article suitable for a top plate for a cooker, in which a color tone of a colored layer is not impaired.

Solution to Problem

A glass article of the present invention is characterized by including a $Li_2O$—$Al_2O_3$—$SiO_2$-based crystallized glass sheet having lightness L* of 70 or greater, chromaticity a* of within ±5, and chromaticity b* of within ±5 at a thickness of 3 mm, and a colored layer formed on a back surface of the $Li_2O$—$Al_2O_3$—$SiO_2$-based crystallized glass sheet.

In the glass article of the present invention, the $Li_2O$—$Al_2O_3$—$SiO_2$-based crystallized glass sheet preferably includes, in mass %, $SiO_2$ from 40 to 90%, $Al_2O_3$ from 5 to 30%, $Li_2O$ from 1 to 10%, $TiO_2$ 0 to less than 2%, $SnO_2$ from 0 to 20%, $ZrO_2$ from 1 to 20%, MgO from 0 to 10%, $P_2O_5$ from 0 to 10%, and $Sb_2O_3$+$As_2O_3$ from 0 to less than 2%.

In the glass article of the present invention, an appearance of the $Li_2O$—$Al_2O_3$—$SiO_2$-based crystallized glass sheet is preferably colorless and transparent.

In the glass article of the present invention, a transmittance at a thickness of 3 mm and a wavelength of 300 nm of the $Li_2O$—$Al_2O_3$—$SiO_2$-based crystallized glass sheet is preferably 10% or greater.

In the glass article of the present invention, the $Li_2O$—$Al_2O_3$—$SiO_2$-based crystallized glass sheet has a thermal expansion coefficient of $30\times10^{-7}$/° C. or less at 30 to 380° C.

In the glass article of the present invention, the $Li_2O$—$Al_2O_3$—$SiO_2$-based crystallized glass sheet has a thermal expansion coefficient of $30\times10^{-7}$/° C. or less at 30 to 750° C.

A top plate for a cooker of the present invention is characterized by including the glass article described above.

Advantageous Effects of Invention

According to the present invention, it is possible to provide a glass article suitable for a top plate for a cooker, in which a color tone of a colored layer is not impaired.

DESCRIPTION OF EMBODIMENTS

Preferred embodiments are described below. Note that the following embodiments are exemplary only, and the present invention is not limited to the following embodiments.
Glass Article 1

Figure 1:
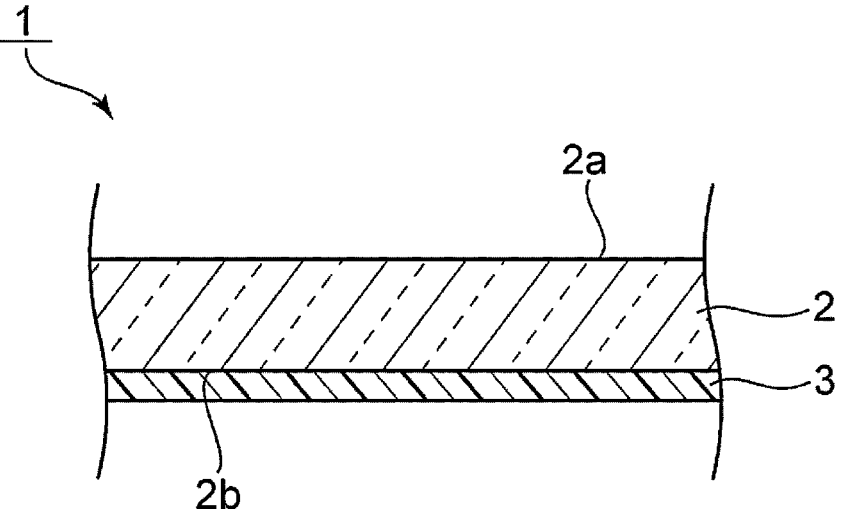
FIG. 1 is a schematic front cross-sectional view illustrating a glass article according to an embodiment of the present invention.

FIG. 1 is a schematic front cross-sectional view illustrating a glass article 1 according to an embodiment of the present invention. As illustrated in FIG. 1, the glass article 1 includes a $Li_2O$—$Al_2O_3$—$SiO_2$-based crystallized glass sheet 2, and a colored layer 3 formed on a back surface of the $Li_2O$—$Al_2O_3$—$SiO_2$-based crystallized glass sheet 2. The $Li_2O$—$Al_2O_3$—$SiO_2$-based crystallized glass sheet 2 includes a cooking surface 2a which is a main surface on one side, and a back surface 2b which is a main surface on the other side. The cooking surface 2a is a surface on which cookware such as a pot and a frying pan is placed. The back surface 2b is a surface facing a heating device on an inner side of the cooker. Therefore, the cooking surface 2a and the back surface 2b are a front side and a back side, respectively.
$Li_2O$—$Al_2O_3$—$SiO_2$-Based Crystallized Glass Sheet 2

A $Li_2O$—$Al_2O_3$—$SiO_2$-based crystallized glass sheet 2 preferably includes, in mass %, $SiO_2$ from 40 to 90%, $Al_2O_3$ from 5 to 30%, $Li_2O$ from 1 to 10%, $TiO_2$ 0 to less than 2%, $SnO_2$ from 0 to 20%, $ZrO_2$ from 1 to 20%, MgO from 0 to 10%, $P_2O_5$ from 0 to 10%, and $Sb_2O_3$+$As_2O_3$ from 0 to less than 2%. Note that, in the description regarding the content of each component below, "%" means "mass %" unless otherwise indicated.

$SiO_2$ is a component that forms the skeleton of the glass and forms a $Li_2O$—$Al_2O_3$—$SiO_2$-based crystal. The content of $SiO_2$ is preferably from 40 to 90%, from 52 to 80%, from 55 to 75%, from 56 to 70%, from 59 to 70%, from 60 to 70%, from 60 to 69.5%, from 60.5 to 69.5%, from 61 to 69.5%, from 61.5 to 69.5%, from 62 to 69.5%, from 62.5 to 69.5%, from 63 to 69.5%, and in particular, from 63.5 to 69.5%. If the content of $SiO_2$ is excessively small, the thermal expansion coefficient tends to be high, and thus, it is difficult to produce crystallized glass having excellent thermal shock resistance. Further, the crystallized glass tends to have poor chemical durability. On the other hand, if the content of $SiO_2$ is excessively large, the meltability of the glass decreases and the viscosity of the glass melt increases. Thus, glass fining and glass forming becomes difficult, resulting in decrease in productivity. In addition, a time required for crystallization is increased, and the productivity easily decreases.

$Al_2O_3$ is a component that forms the skeleton of the glass and forms a $Li_2O$—$Al_2O_3$—$SiO_2$-based crystal. In addition, $Al_2O_3$ is a component that is located around a crystal nucleus and forms a core-shell structure. The presence of the core-shell structure makes it less likely to feed a crystal nucleus component from the outside of the shell, and thus, the crystal nuclei are less likely to be enlarged, and a large number of small crystal nuclei are easily formed. The content of $Al_2O_3$ is preferably from 5 to 30%, from 8 to 30%, from 9 to 28%, from 10 to 27%, from 12 to 27%, from 14 to 27%, from 16 to 27%, from 17 to 27%, from 18 to 27%, from 18 to 26.5%, from 18.1 to 26.5%, from 19 to 26.5%, from 19.5 to 26.5%, from 20 to 26.5%, from 20.5 to 26.5%, and in particular, from 20.8 to 25.8%. If the content of $Al_2O_3$ is excessively small, the thermal expansion coefficient tends to be high, and thus, it is difficult to produce crystallized glass having excellent thermal shock resistance. Further, the crystallized glass tends to have poor chemical durability. In addition, the crystal nuclei increase in size, the crystallized glass is more likely to be cloudy, and the color tone of the colored layer 3 is likely to be impaired. On the other hand, if the content of $Al_2O_3$ is excessively large, the meltability of the glass decreases and the viscosity of the glass melt increases. Thus, glass fining and glass forming becomes difficult, resulting in decrease in productivity. In addition, the crystal of mullite tends to be precipitated, causing devitrification of the glass. In such a case, the crystallized glass is easily breakable.

$Li_2O$ is a component forming a $Li_2O$—$Al_2O_3$—$SiO_2$-based crystal, and a component having a large effect on crystallinity and reducing the viscosity of the glass to improve the meltability and the formability of glass. The content of $Li_2O$ is preferably from 1 to 10%, from 2 to 10%, from 2 to 8%, from 2.5 to 6%, from 2.8 to 5.5%, from 2.8 to 5%, from 3 to 5%, from 3 to 4.5%, from 3 to 4.2%, and in particular, from 3.2 to 4%. If the content of $Li_2O$ is excessively small, the crystal of mullite tends to be precipitated, causing devitrification of the glass. In addition, in crystallizing the glass, $Li_2O$—$Al_2O_3$—$SiO_2$-based crystal does not easily precipitate, and thus, it is difficult to obtain crystallized glass having excellent thermal shock resistance. Further, the meltability of the glass decreases and the viscosity of the glass melt increases. Thus, glass fining and glass forming becomes difficult, resulting in decrease in productivity. On the other hand, if the content of $Li_2O$ is excessively large, crystallinity is excessively high, and thus, the glass tends to be subject to devitrification and crystallized glass becomes easily breakable.

$SiO_2$, $Al_2O_3$, and $Li_2O$ are main constituent components of β-quartz solid solution, which is the main crystal, and $Li_2O$ and $Al_2O_3$ compensate the mutual charges to dissolve into the $SiO_2$ skeleton. With such three components being contained in a suitable ratio, crystallization progresses efficiently to enable low-cost production. The mass ratio of $(SiO_2+Al_2O_3)/Li_2O$ is preferably 20 or greater, 20.2 or greater, 20.4 or greater, 20.6 or greater, 20.8 or greater, and in particular, 21 or greater.

$TiO_2$ is a nucleating component for precipitating crystals in a crystallization step. On the other hand, if $TiO_2$ is contained in a large amount, the degree of coloration of the glass significantly increases, and the color tone of the colored layer 3 is likely to be impaired. In particular, a zirconia titanate-based crystal containing $ZrO_2$ and $TiO_2$ acts as a crystal nucleus, and transition of electrons from a valence band of oxygen serving a ligand to a conduction band of zirconia and titanium, which is a central metal, (LMCT transition) occurs. LMCT transition is involved in the coloration of crystallized glass. If titanium remains in a residual glass phase, the LMCT transition may occur from the valence band of a $SiO_2$ skeleton to the conduction band of tetravalent titanium in the residual glass phase. In trivalent titanium in the residual glass phase, a d-d transition occurs, and this transition is involved in the coloration of crystallized glass. Furthermore, when titanium and iron coexist, an ilmenite ($FeTiO_3$)-like coloration develops. It is also known that when titanium and tin coexist, the degree of yellowish coloration increases. Thus, the content of $TiO_2$ is preferably from 0 to less than 2%, from 0 to 1%, from 0 to less than 0.5%, from 0 to 0.48%, from 0 to 0.46%, from 0 to 0.44%, from 0 to 0.42%, from 0 to 0.4%, from 0 to 0.38%, from 0 to 0.36%, from 0 to 0.34%, from 0 to 0.32%, from 0 to 0.3%, from 0 to 0.28%, from 0 to 0.26%, from 0 to 0.24%, from 0 to 0.22%, from 0 to 0.2%, from 0 to 0.18%, from 0 to 0.16%, from 0 to 0.14%, from 0 to 0.12%, and in particular, from 0 to 0.1%. However, $TiO_2$ is easily mixed as an impurity, and thus, when it is attempted to completely remove $TiO_2$, the production cost tends to increase due to increase in the cost of the raw material batch. In order to suppress the increase in production cost, a lower limit of the content of $TiO_2$ is preferably 0.0003% or greater, 0.0005% or greater, 0.001% or greater, 0.005% or greater, 0.01% or greater, and in particular, 0.02% or greater.

$SnO_2$ is a component acting as a fining agent. In addition, $SnO_2$ is also a component necessary to efficiently precipitate crystals in a crystallization step. On the other hand, if $SnO_2$ is contained in large amounts, the degree of coloration of the glass significantly increases. The content of $SnO_2$ is preferably from 0 to 20%, from greater than 0 to 20%, from 0.05 to 20%, from 0.1 to 10%, from 0.1 to 5%, from 0.1 to 4%, from 0.1 to 3%, from 0.15 to 3%, from 0.2 to 3%, from 0.2 to 2.7%, from 0.2 to 2.4%, from 0.25 to 2.4%, from 0.3 to 2.4%, from 0.35 to 2.4%, from 0.4 to 2.4%, from 0.45 to 2.4%, from 0.5 to 2.4%, from 0.5 to 2.35%, from 0.5 to 2.3%, from 0.5 to 2.2%, from 0.5 to 2.1%, from 0.5 to 2.05%, from 0.5 to 2%, from 0.5 to 1.95%, from 0.5 to 1.93%, from 0.5 to 1.91%, from 0.5 to 1.9%, from 0.5 to 1.88%, from 0.5 to 1.85%, from 0.5 to 1.83%, from 0.5 to 1.81%, and in particular, from 0.5 to 1.8%. If the content of $SnO_2$ is excessively small, it is difficult to clarify the glass, and the productivity tends to decrease. Further, the crystal nuclei are not sufficiently formed, and coarse crystals may precipitate out, and the glass may possibly be cloudy or damaged. On the other hand, if the content of $SnO_2$ is excessively large, the coloration of the crystallized glass may be strong, and the color tone of the colored layer 3 is likely to be impaired. In addition, the amount of $SnO_2$ to be evaporated at melting tends to increase, and thus environmental burden tends to increase.

$ZrO_2$ is a nucleating component for precipitating crystals in the crystallization step. The content of $ZrO_2$ is preferably from 1 to 20%, from 1 to 15%, from 1 to 10%, from 1 to 5%, from 1.5 to 5%, from 1.75 to 4.5%, from 1.75 to 4.4%, from 1.75 to 4.3%, from 1.75 to 4.2%, from 1.75 to 4.1%, from 1.75 to 4%, from 1.8 to 4%, from 1.85 to 4%, from 1.9 to 4%, from 1.95 to 4%, from 2 to 4%, from 2.05 to 4%, from 2.1 to 4%, from 2.15 to 4%, from 2.2 to 4%, from 2.25 to 4%, from 2.3 to 4%, from 2.3 to 3.95%, from 2.3 to 3.9%, from 2.3 to 3.95%, from 2.3 to 3.9%, from 2.3 to 3.85%, from 2.3 to 3.8%, from greater than 2.7 to 3.8%, from 2.8 to 3.8%, from 2.9 to 3.8%, and in particular, from 3 to 3.8%. If the content of $ZrO_2$ is excessively small, the crystal nuclei are not sufficiently formed and coarse crystals precipitate out. In such a case, the crystallized glass tends to be cloudy, which results in impairment of the color tone of the colored layer 3, and the crystallized glass may be damaged. On the other hand, if the content of $ZrO_2$ is excessively large, coarse $ZrO_2$ crystals precipitate and the glass is easily subject to devitrification, and the crystallized glass becomes easily breakable.

$TiO_2$ and $ZrO_2$ are components that may function as a crystal nucleus. Ti and Zr are congeners, and are similar in electrical electronegativity, ion radii, and the like. Thus, it is known that, both components easily adopt a similar molecular conformation as an oxide, and in the coexistence of $TiO_2$ and $ZrO_2$, phase separation in the early stage of crystallization tends to occur. Thus, as long as an unacceptable level of coloration does not occur, the mass ratio of $TiO_2/ZrO_2$ is preferably from 0.0001 to 5.0, from 0.0001 to 4.0, from 0.0001 to 3.0, from 0.0001 to 2.5, from 0.0001 to 2.0, from 0.0001 to 1.5, from 0.0001 to 1.0, from 0.0001 to 0.5, from 0.0001 to 0.4, and in particular, from 0.0001 to 0.3. If $TiO_2/ZrO_2$ is excessively small, the production cost tends to increase due to increase in the cost of the raw material batch. On the other hand, if $TiO_2/ZrO_2$ is excessively large, crystal nucleation rate is decreased, and production costs may increase.

$SnO_2+ZrO_2$ is preferably from 1 to 30%, from 1.1 to 30%, from 1.1 to 27%, from 1.1 to 24%, from 1.1 to 21%, from 1.1 to 20%, from 1.1 to 17%, from 1.1 to 14%, from 1.1 to 11%, from 1.1 to 9%, from 1.1 to 7.5%, from 1.4 to 7.5%, from 1.8 to 7.5%, from 2.0 to 7.5%, from 2.2 to 7%, from 2.2 to 6.4%, from 2.2 to 6.2%, from 2.2 to 6%, from 2.3 to 6%, from 2.4 to 6%, from 2.5 to 6%, and in particular, from 2.8 to 6%. If $SnO_2+ZrO_2$ is excessively small, crystal nuclei are less likely to precipitate, and less likely to crystallize. On the other hand, if $SnO_2+ZrO_2$ is excessively large, the crystal nuclei increase in size, the crystallized glass is more likely to be cloudy, and the color tone of the colored layer 3 is likely to be impaired.

$SnO_2$ has an effect of promoting phase separation in the glass. To efficiently cause separation of phases while maintaining a liquidus temperature low (while suppressing the risk of devitrification due to primary phase precipitation) to promptly perform nucleation and crystal growth in later steps, the mass ratio of $SnO_2/(SnO_2+ZrO_2)$ is preferably from 0.01 to 0.99, from 0.01 to 0.98, from 0.01 to 0.94, from 0.01 to 0.90, from 0.01 to 0.86, from 0.01 to 0.82, from 0.01 to 0.78, from 0.01 to 0.74, from 0.01 to 0.70, from 0.03 to 0.70, and in particular, from 0.05 to 0.70.

In addition, when $SnO_2$ is under a high temperature condition, a reaction of $SnO_2 \rightarrow SnO + \frac{1}{2}O_2$ occurs, and $O_2$ gas is released into the glass melt. Such a reaction is known as a fining mechanism by $SnO_2$, and the $O_2$ gas released during the reaction has a "defoaming effect" in which the fine bubbles existing in the glass melt are enlarged and the bubbles are released outside the glass system, and in addition, a "stirring effect" in which the glass melt is mixed. In the $Li_2O$—$Al_2O_3$—$SiO_2$-based crystallized glass of the present invention, the contents of $SiO_2$ and $Al_2O_3$ accounts for the majority and these components are poorly soluble, and thus, in order to efficiently form a homogeneous glass melt, these three components should be contained in suitable proportions. The mass ratio of $(SiO_2+Al_2O_3)/SnO_2$ is preferably 44 or greater, 44.3 or greater, 44.7 or greater, 45 or greater, 45.2 or greater, 45.4 or greater, 45.6 or greater, 45.8 or greater, and in particular, 46 or greater.

The mass ratio of $Al_2O_3/(SnO_2+ZrO_2)$ is preferably 7.1 or less, 7.05 or less, 7.0 or less, 6.95 or less, 66.9 or less, 6.85 or less, 6.8 or less, 6.75 or less, 6.7 or less, 6.65 or less, 6.6 or less, 6.55 or less, 6.5 or less, 6.45 or less, 6.4 or less, 6.35 or less, 6.3 or less, 6.25 or less, 6.2 or less, 6.15 or less, 6.1 or less, 6.05 or less, 6.0 or less, 5.98 or less, 5.95 or less, 5.92 or less, 5.9 or less, 5.8 or less, 5.7 or less, 5.6 or less, and in particular, 5.5 or less. If $Al_2O_3/(SnO_2+ZrO_2)$ is excessively high, nucleation does not proceed efficiently, which makes it difficult to achieve efficient crystallization. On the other hand, if $Al_2O_3/(SnO_2+ZrO_2)$ is excessively small, the crystal nuclei increase in size, the crystallized glass is more likely to be cloudy, and the color tone of the colored layer 3 is likely to be impaired. Thus, the lower limit of $Al_2O_3/(SnO_2+ZrO_2)$ is preferably 0.01 or greater.

MgO is a component that can be incorporated into a $Li_2O$—$Al_2O_3$—$SiO_2$-based crystal to form a solid solution together to increase the thermal expansion coefficient of a $Li_2O$—$Al_2O_3$—$SiO_2$-based crystal. The content of MgO is preferably from 0 to 10%, from 0 to 8%, from 0 to 6%, from 0 to 5%, from 0 to 4.5%, from 0 to 4%, from 0 to 3.5%, from 0.02 to 3.5%, from 0.05 to 3.5%, from 0.08 to 3.5%, from 0.1 to 3.5%, from 0.1 to 3.3%, from 0.1 to 3%, from 0.13 to 3%, from 0.15 to 3%, from 0.17 to 3%, from 0.19 to 3%, from 0.2 to 2.9%, from 0.2 to 2.7%, from 0.2 to 2.5%, from 0.2 to 2.3%, from 0.2 to 2.2%, 0.2 to 2.1%, and in particular, from 0.2 to 2%. If the content of MgO is excessively small, the thermal expansion coefficient tends to be excessively small. In addition, the amount of volume shrinkage that occurs in the crystal precipitation may be excessively large. In addition, a difference in thermal expansion coefficient between a crystal phase and a residual glass phase after crystallization becomes large, and thus, crystallized glass may become easily breakable. If the content of MgO is excessively large, crystallinity is excessively strong and the crystallized glass is easily subject to devitrification and becomes easily breakable. The thermal expansion coefficient tends to be excessively high.

$P_2O_5$ is a component that suppresses the precipitation of coarse $ZrO_2$ crystals. The content of $P_2O_5$ is preferably from 0 to 10%, from 0 to 8%, from 0 to 6%, from 0 to 5%, from 0 to 4%, from 0 to 3.5%, from 0.02 to 3.5%, from 0.05 to 3.5%, from 0.08 to 3.5%, from 0.1 to 3.5%, from 0.1 to 3.3%, from 0.1 to 3%, from 0.13 to 3%, from 0.15 to 3%, from 0.17 to 3%, from 0.19 to 3%, from 0.2 to 2.9%, from 0.2 to 2.7%, from 0.2 to 2.5%, from 0.2 to 2.3%, from 0.2 to 2.2%, from 0.2 to 2.1%, from 0.2 to 2%, and in particular, from 0.3 to 1.8%. If the content of $P_2O_5$ is excessively small, coarse $ZrO_2$ crystals precipitate and the glass is easily subject to devitrification, and thus, the crystallized glass may become easily breakable. On the other hand, if the content of $P_2O_5$ is excessively large, the amount of $Li_2O$—$Al_2O_3$—$SiO_2$-based crystals to precipitate decreases and the thermal expansion coefficient tends to be high.

$As_2O_3$ and $Sb_2O_3$ are highly toxic, and may pollute the environment during glass manufacturing processing, disposal of waste glass, and the like. Thus, $Sb_2O_3+As_2O_3$ is preferably less than 2%, 1% or less, 0.7% or less, less than 0.7%, 0.65% or less, 0.6% or less, 0.55% or less, 0.5% or less, 0.45% or less, 0.4% or less, 0.35% or less, 0.3% or less, 0.25% or less, 0.2% or less, 0.15% or less, 0.1% or less, and in particular, it is preferable that substantially no $Sb_2O_3+As_2O_3$ is contained (specifically, the content is preferably less than 0.1 mass %). Note that if $As_2O_3$ and $Sb_2O_3$ are contained, these components may be functioned as fining agents and nucleating agents.

The $Li_2O$—$Al_2O_3$—$SiO_2$-based crystallized glass of the present invention may contain the following components in the glass composition in addition to the above components.

$Na_2O$ is a component that can be incorporated into a $Li_2O$—$Al_2O_3$—$SiO_2$-based crystal to form a solid solution together, and is a component that has a significant effect on crystallinity and reduces the viscosity of the glass to improve glass meltability and formability. $Na_2O$ is used also for adjusting the thermal expansion coefficient and the refractive index of the crystallized glass. The content of $Na_2O$ is preferably from 0 to 10%, from 0 to 8%, from 0 to 6%, from 0 to 5%, from 0 to 4.5%, from 0 to 4%, from 0 to 3.5%, from 0 to 3%, from 0 to 2.7%, from 0 to 2.4%, from 0 to 2.1%, from 0 to 1.8%, and in particular, from 0 to 1.5%. If the content of $Na_2O$ is excessively large, crystallinity is excessively strong and the glass is easily subject to devitrification and the resultant crystallized glass becomes easily breakable. An ionic radius of a Na cation is larger than a Li cation, a Mg cation, and the like, which are the constituent components of the main crystal, and the Na cation is not easily incorporated into the crystal, and thus, the Na cation after crystallization is likely to remain in the residual glass (glass matrix). Therefore, if the content of $Na_2O$ is excessively large, a refractive index difference between the crystal phase and the residual glass is likely to occur, the crystallized glass is more likely to be cloudy, and the color tone of the colored layer 3 is likely to be impaired. However, $Na_2O$ is easily mixed as an impurity, and thus, when it is attempted to completely remove $Na_2O$, the production cost tends to increase due to increase in the cost of the raw material batch. In order to suppress the increase in production cost, the lower limit of the content of $Na_2O$ is preferably 0.0003% or greater, 0.0005% or greater, and in particular, 0.001% or greater.

$K_2O$ is a component that can be incorporated into a $Li_2O$—$Al_2O_3$—$SiO_2$-based crystal to form a solid solution together, and is a component that has a significant effect on crystallinity and reduces the viscosity of the glass to improve glass meltability and formability. $K_2O$ is used also for adjusting the thermal expansion coefficient and the refractive index of the crystallized glass. The content of $K_2O$ is preferably from 0 to 10%, from 0 to 8%, from 0 to 6%, from 0 to 5%, from 0 to 4.5%, from 0 to 4%, from 0 to 3.5%, from 0 to 3%, from 0 to 2.7%, from 0 to 2.4%, from 0 to 2.1%, from 0 to 1.8%, from 0 to 1.5%, from 0 to 1.4%, from 0 to 1.3%, from 0 to 1.2%, from 0 to 1.1%, from 0 to 1%, from 0 to 0.9%, and in particular, from 0.1 to 0.8%. If the content of $K_2O$ is excessively large, crystallinity is excessively strong and the glass is easily subject to devitrification and the crystallized glass becomes easily breakable. An ionic radius of a K cation is larger than a Li cation, a Mg cation, and the like, which are the constituent components of the main crystal, and the K cation is not easily incorporated into the crystal, and thus, the K cation after crystallization is likely to remain in the residual glass. Therefore, if the content of $K_2O$ is excessively large, a refractive index difference between the crystal phase and the residual glass is likely to occur, the crystallized glass is more likely to be cloudy, and the color tone of the colored layer 3 is likely to be impaired. However, $K_2O$ is easily mixed as an impurity, and thus, when it is attempted to completely remove $K_2O$, the production cost tends to increase due to increase in the cost of the raw material batch. In order to suppress the increase in production cost, the lower limit of the content of $K_2O$ is preferably 0.0003% or greater, 0.0005% or greater, and in particular, 0.001% or greater.

$Li_2O$, $Na_2O$, $K_2O$ are components that improve the meltability and the formability of the glass, but if the content of these components is excessively large, the low temperature viscosity excessively decreases, which may result in too high fluidity of the glass during crystallization. $Li_2O$, $Na_2O$, $K_2O$ are components that may deteriorate the weather resistance, the water resistance, the chemical resistance, and the like of the glass before crystallization. If the glass before crystallization is degraded by moisture or the like, desired crystallization behavior, by extension, desired characteristics, may not be possibly obtained. On the other hand, $ZrO_2$ is a component that functions as a nucleating agent, and has an effect of preferential crystallization at the initial stage of crystallization to suppress the flow of residual glass. $ZrO_2$ has an effect of efficiently filling a void part of a glass network mainly composed of a $SiO_2$ skeleton and inhibiting a diffusion of protons and various chemical components in the glass network, and improves weather resistance, water resistance, chemical resistance, and the like of glass before crystallization. To obtain crystallized glass having a desired shape and properties, $(Li_2O+Na_2O+K_2O)/ZrO_2$ should be controlled in a suitable manner. The mass ratio of $(Li_2O+Na_2O+K_2O)/ZrO_2$ is preferably 2.0 or less, 1.98 or less, 1.96 or less, 1.94 or less, 1.92 or less, and in particular, 1.90 or less.

CaO is a component that reduces the viscosity of the glass and enhances the meltability and formability of the glass. CaO is used also for adjusting the thermal expansion coefficient and the refractive index of the crystallized glass. The content of CaO is preferably from 0 to 10%, from 0 to 8%, from 0 to 6%, from 0 to 5%, from 0 to 4.5%, from 0 to 4%, from 0 to 3.5%, from 0 to 3%, from 0 to 2.7%, from 0 to 2.4%, from 0 to 2.1%, from 0 to 1.8%, and in particular, from 0 to 1.5%. If the content of CaO is excessively large, the glass is easily subject to devitrification, and thus, the crystallized glass becomes easily breakable. An ionic radius of a Ca cation is larger than a Li cation, a Mg cation, and the like, which are the constituent components of the main crystal, and the Ca cation is not easily incorporated into the crystal, and thus, the Ca cation after crystallization is likely to remain in the residual glass. Therefore, if the content of CaO is excessively large, a refractive index difference between the crystal phase and the residual glass is likely to occur, the crystallized glass is more likely to be cloudy, and the color tone of the colored layer 3 is likely to be impaired. However, CaO is easily mixed as an impurity, and thus, when it is attempted to completely remove CaO, the production cost tends to increase due to increase in the cost of the raw material batch. In order to suppress the increase in production cost, the lower limit of the content of CaO is preferably 0.0001% or greater, 0.0003% or greater, and in particular, 0.0005% or greater.

SrO is a component that reduces the viscosity of the glass and enhances the meltability and formability of the glass. SrO is used also for adjusting the thermal expansion coefficient and the refractive index of the crystallized glass. The content of SrO is preferably from 0 to 10%, from 0 to 8%, from 0 to 6%, from 0 to 5%, from 0 to 4.5%, from 0 to 4%, from 0 to 3.5%, from 0 to 3%, from 0 to 2.7%, from 0 to 2.4%, from 0 to 2.1%, from 0 to 1.8%, from 0 to 1.5%, and in particular, from 0 to 1%. If the content of SrO is excessively large, the glass is easily subject to devitrification, and thus, the crystallized glass becomes easily breakable. An ionic radius of a Sr cation is larger than a Li cation, a Mg cation, and the like, which are the constituent components of the main crystal, and the Sr cation is not easily incorporated into the crystal, and thus, the Sr cation after crystallization is likely to remain in the residual glass. Therefore, if the content of SrO is excessively large, a refractive index difference between the crystal phase and the residual glass is likely to occur, the crystallized glass is more likely to be cloudy, and the color tone of the colored layer 3 is likely to be impaired. However, SrO is easily mixed as an impurity, and thus, when it is attempted to completely remove SrO, the production cost tends to increase due to increase in the cost of the raw material batch. In order to suppress the increase in production cost, the lower limit of the content of SrO is preferably 0.0001% or greater, 0.0003% or greater, and in particular, 0.0005% or greater.

BaO is a component that reduces the viscosity of the glass and enhances the meltability and formability of the glass. BaO is used also for adjusting the thermal expansion coefficient and the refractive index of the crystallized glass. The content of BaO is preferably from 0 to 10%, from 0 to 8%, from 0 to 6%, from 0 to 5%, from 0 to 4.5%, from 0 to 4%, from 0 to 3.5%, from 0 to 3%, from 0 to 2.7%, from 0 to 2.4%, from 0 to 2.1%, from 0 to 1.8%, from 0 to 1.5%, and in particular, from 0 to 1%. If the content of BaO is excessively large, crystals containing Ba precipitate, and the glass is easily subject to devitrification, and the crystallized glass becomes easily breakable. An ionic radius of a Ba cation is larger than a Li cation, a Mg cation, and the like, which are the constituent components of the main crystal, and the Ba cation is not easily incorporated into the crystal, and thus, the Ba cation after crystallization is likely to remain in the residual glass. Therefore, if the content of BaO is excessively large, a refractive index difference between the crystal phase and the residual glass is likely to occur, the crystallized glass is more likely to be cloudy, and the color tone of the colored layer 3 is likely to be impaired. However, BaO is easily mixed as an impurity, and thus, when it is attempted to completely remove BaO, the production cost tends to increase due to increase in the cost of the raw material batch. In order to suppress the increase in production cost, the lower limit of the content of BaO is preferably 0.0001% or greater, 0.0003% or greater, and in particular, 0.0005% or greater.

MgO, CaO, SrO, and BaO are components that improve the meltability and the formability of the glass, but if the content of these components is excessively high, the low temperature viscosity excessively decreases, which may result in too high fluidity of the glass during crystallization. On the other hand, $ZrO_2$ is a component that functions as a nucleating agent, and has an effect of preferential crystallization at the initial stage of crystallization to suppress the flow of residual glass. To obtain crystallized glass having a desired shape and properties, $(MgO+CaO+SrO+BaO)/ZrO_2$ should be controlled in a suitable manner. The mass ratio of $(MgO+CaO+SrO+BaO)/ZrO_2$ is preferably from 0 to 3, from 0 to 2.8, from 0 to 2.6, from 0 to 2.4, from 0 to 2.2, from 0 to 2.1, from 0 to 2, from 0 to 1.8, from 0 to 1.7, from 0 to 1.6, and in particular, from 0 to 1.5.

$Na_2O$, $K_2O$, CaO, SrO, and BaO are likely to remain in the residual glass after crystallization. Therefore, if the total amount of these components are excessively large, a refractive index difference between the crystal phase and the residual glass is likely to occur, and the crystallized glass is likely to be cloudy. Therefore, $Na_2O+K_2O+CaO+SrO+BaO$ is preferably 8% or less, 7% or less, 6% or less, 5% or less, 4.5% or less, 4% or less, 3.5% or less, 3% or less, 2.7% or less, 2.42% or less, 2.415% or less, 2.410% or less, 2.405% or less, and in particular, 2.4% or less.

$Li_2O$, $Na_2O$, $K_2O$, MgO, CaO, SrO, and BaO are components that improve the meltability and the formability of the glass. A glass melt containing a large amount of MgO, CaO, SrO, and BaO tends to exhibit a gradual change in viscosity (viscosity curve) versus the temperature, and a glass melt containing a large amount of $Li_2O$, $Na_2O$, and $K_2O$ tends to exhibit a steep change. If the change in the viscosity curve is excessively gradual, the glass still flows even after the glass is formed into a desired shape, and obtaining a desired shape is not easy. On the other hand, if the change in the viscosity curve is excessively steep, the glass melt solidifies during the formation, and obtaining a desired shape is not easy. Therefore, $(MgO+CaO+SrO+BaO)/(Li_2O+Na_2O+K_2O)$ should be controlled in a suitable manner. The mass ratio of $(MgO+CaO+SrO+BaO)/(Li_2O+Na_2O+K_2O)$ is preferably from 0 to 2, from 0 to 1.8, from 0 to 1.5, from 0 to 1.2, from 0 to 1, from 0 to 0.9, from 0 to 0.8, from 0 to 0.7, from 0 to 0.6, from 0 to 0.5, and in particular, from 0 to 0.45.

ZnO is a component that can be incorporated into a $Li_2O$—$Al_2O_3$—$SiO_2$-based crystal to form a solid solution together and applies a great effect on the crystallinity. ZnO is used also for adjusting the thermal expansion coefficient and the refractive index of the crystallized glass. The content of ZnO is preferably from 0 to 10%, from 0 to 8%, from 0 to 6%, from 0 to 5%, from 0 to 4.5%, from 0 to 4%, from 0 to 3.5%, from 0 to 3%, from 0 to 2.7%, from 0 to 2.4%, from 0 to 2.1%, from 0 to 1.8%, from 0 to 1.5%, and in particular, from 0 to 1%. If the content of ZnO is excessively large, crystallinity is excessively strong and the crystallized glass is more susceptible to devitrification and becomes easily breakable. However, ZnO is easily mixed as an impurity, and thus, when it is attempted to completely remove ZnO, the production cost tends to increase due to increase in the cost of the raw material batch. In order to suppress the increase in production cost, the lower limit of the content of ZnO is preferably 0.0001% or greater, 0.0003% or greater, and in particular, 0.0005% or greater.

In the $Li_2O$—$Al_2O_3$—$SiO_2$-based crystallized glass, a Li cation, a Mg cation, and a Zn cation are components that easily dissolve in a β-quartz solid solution, and compared with the Ba cation and the like, components that may contribute slightly to an increase in refractive index of the residual glass after crystallization. $Li_2O$, MgO, and ZnO function as a flux when vitrifying the raw material, and thus, it can be said that these components are important for producing colorless and transparent crystallized glass at a low temperature. $Li_2O$ is an essential component to achieve low expansion, and is preferably contained at least 1%. A sufficient amount of $Li_2O$ should be contained in order to achieve a desired thermal expansion coefficient and the like. However, in such a case, if the contents of MgO and ZnO are also increased correspondingly, the viscosity of the glass may decrease excessively. If the low temperature viscosity is excessively low, during firing, the fluidity of the softened glass is excessively large, and thus, crystallization into a desired shape may be difficult. If the high temperature viscosity is excessively low, the thermal load on the manufacturing equipment is reduced, but the speed of convection during heating increases, and this may result in a risk that refractories and the like are easily eroded physically. Therefore, it is preferable to control a content ratio of $Li_2O$, MgO, and ZnO, and in particular, it is preferable to control the total amount of MgO and ZnO relative to $Li_2O$ that functions well as a flux. Therefore, the mass ratio of $(MgO+ZnO)/Li_2O$ is preferably 0.394 or less, 0.393 or less, 0.392 or less, 0.391 or less, and in particular, 0.390 or less, and alternatively, 0.755 or greater, 0.756 or greater, 0.757 or greater, 0.758 or greater, and in particular, 0.759 or greater.

$B_2O_3$ is a component that reduces the viscosity of the glass and enhances the meltability and formability of the glass. $B_2O_3$ component may contribute to the likelihood of phase separation during crystal nucleus formation. The content of $B_2O_3$ is preferably from 0 to 10%, from 0 to 8%, from 0 to 6%, from 0 to 5%, from 0 to 4.5%, from 0 to 4%, from 0 to 3.5%, from 0 to 3%, from 0 to 2.7%, from 0 to 2.4%, from 0 to 2.1%, from 0 to 1.8%, and in particular, from 0 to 1.5%. If the content of $B_2O_3$ is excessively large, the amount of $B_2O_3$ that evaporates during melting increases, and an environmental burden increases. However, $B_2O_3$ is easily mixed as an impurity, and thus, when it is attempted to completely remove $B_2O_3$, the production cost tends to increase due to increase in the cost of the raw material batch. In order to suppress the increase in production cost, the crystallized glass may contain 0.0001% or greater, 0.0003% or greater, and in particular, 0.0005% or greater of $B_2O_3$.

It is known that in the $Li_2O$—$Al_2O_3$—$SiO_2$-based crystallized glass, phase separated regions are formed within the glass prior to crystal nucleation, and then crystal nuclei including $TiO_2$ and $ZrO_2$ are formed within the phase separated region. $SnO_2$, $ZrO_2$, $P_2O_5$, $TiO_2$, and $B_2O_3$ serve a vital role in the phase separation formation, and thus, $SnO_2$+$ZrO_2$+$P_2O_5$+$TiO_2$+$B_2O_3$ is preferably from 1.5 to 30%, from 1.5 to 26%, from 1.5 to 22%, from 1.5 to 20%, from 1.5 to 18%, from 1.5 to 16%, from 1.5 to 15%, from 1.8 to 15%, from 2.1 to 15%, from 2.4 to 15%, from 2.5 to 15%, from 2.8 to 15%, from 2.8 to 13%, from 2.8 to 12%, from 2.8 to 11%, from 2.8 to 10%, from 3 to 9.5%, from 3 to 9.2%, and in particular, from 3 to 9%, and the mass ratio of $SnO_2/(SnO_2+ZrO_2+P_2O_5+TiO_2+B_2O_3)$ is preferably 0.06 or greater, 0.07 or greater, 0.08 or greater, 0.09 or greater, 0.1 or greater, 0.103 or greater, 0.106 or greater, 0.11 or greater, 0.112 or greater, 0.115 or greater, 0.118 or greater, 0.121 or greater, 0.124 or greater, 0.127 or greater, 0.128 or greater, in particular, 0.13 or greater. If $SnO_2+ZrO_2+P_2O_5+TiO_2+B_2O_3$ is excessively small, the phase separated region is not easily formed and crystallization is difficult. On the other hand, if $SnO_2+ZrO_2+P_2O_5+TiO_2+B_2O_3$ is excessively large, and/or $SnO_2/(SnO_2+ZrO_2+P_2O_5+TiO_2+B_2O_3)$ is excessively small, the phase separated region becomes larger, the crystallized glass easily becomes cloudy, and the color tone of the colored layer 3 is likely to be impaired. Note that the upper limit of $SnO_2/(SnO_2+ZrO_2+P_2O_5+TiO_2+B_2O_3)$ is not particularly limited, but realistically, 0.9 or less is preferable.

$Fe_2O_3$ is a component that increases the degree of coloration of the glass, and in particular, due to the interaction with $TiO_2$ and $SnO_2$, remarkably strengthens the coloration. The content of $Fe_2O_3$ is preferably 0.10% or less, 0.08% or less, 0.06% or less, 0.05% or less, 0.04% or less, 0.035% or less, 0.03% or less, 0.02% or less, 0.015% or less, 0.013% or less, 0.012% or less, 0.011% or less, 0.01% or less, 0.009% or less, 0.008% or less, 0.007% or less, 0.006% or less, 0.005% or less, 0.004% or less, 0.003% or less, and in particular, 0.002% or less. However, $Fe_2O_3$ is easily mixed as an impurity, and thus, when it is attempted to completely remove $Fe_2O_3$, the production cost tends to increase due to increase in the cost of the raw material batch. In order to suppress the increase in production cost, the lower limit of the content of $Fe_2O_3$ is preferably 0.0001% or greater, 0.0002% or greater, 0.0003% or greater, 0.0005% or greater, and in particular, 0.001% or greater.

When titanium and iron coexist, an ilmenite ($FeTiO_3$)-like coloration may develop. Particularly, in the $Li_2O$—$Al_2O_3$—$SiO_2$-based crystallized glass, titanium and iron components that do not precipitate as crystal nuclei or main crystals may remain in the residual glass after crystallization, and the development of the coloration may be promoted. It is possible to reduce the amount of such components when the composition is designed, but $TiO_2$ and $Fe_2O_3$ are easily mixed as an impurity, and thus, when it is attempted to completely remove $TiO_2$ and $Fe_2O_3$, the production cost tends to increase due to increase in the cost of the raw material batch. Therefore, in order to suppress the increase in production cost, $TiO_2$ and $Fe_2O_3$ may be contained within the above-described range, and, in the perspective of further reducing costs, both components may be contained as long as an unacceptable level of coloration does not occur. In such a case, the mass ratio of $TiO_2/(TiO_2+Fe_2O_3)$ is preferably from 0.001 to 0.999, from 0.003 to 0.997, from 0.005 to 0.995, from 0.007 to 0.993, from 0.009 to 0.991, from 0.01 to 0.99, from 0.1 to 0.9, from 0.15 to 0.85, from 0.2 to 0.8, from 0.25 to 0.25, from 0.3 to 0.7, from 0.35 to 0.65, and in particular, from 0.4 to 0.6. This makes it easy to achieve low-cost production of crystallized glass with high level of colorless transparency.

Pt is a component that may be mixed into glass as ions, colloid, or metal, and develops coloration such as yellow to brown, which easily impairs the color tone of the colored layer 3. Such a tendency becomes prominent after crystallization. Further, after careful consideration, it was revealed that when Pt is mixed, nucleation and crystallization behavior of crystallized glass may be affected, and as a result the glass may be cloudy. Therefore, the content of the Pt is preferably 7 ppm or less, 6 ppm or less, 5 ppm or less, 4 ppm or less, 3 ppm or less, 2 ppm or less, 1.6 ppm or less, 1.4 ppm or less, 1.2 ppm or less, 1 ppm or less, 0.9 ppm or less, 0.8 ppm or less, 0.7 ppm or less, 0.6 ppm or less, 0.5 ppm or less, 0.45 ppm or less, 0.40 ppm or less, 0.35 ppm or less, and in particular, 0.30 ppm or less. It is preferable to avoid contamination of Pt where possible, but if general melting equipment is used, the use of a Pt material may be desired to obtain homogeneous glasses. Therefore, if it is attempted to completely remove Pt, the production cost tends to increase. As long as the coloration is permitted, to suppress the increase in production cost, the lower limit of the content of Pt is preferably 0.0001 ppm or greater, 0.001 ppm or greater, 0.005 ppm or greater, 0.01 ppm or greater, 0.02 ppm or greater, 0.03 ppm or greater, 0.04 ppm or greater, 0.05 ppm or greater, 0.06 ppm or greater, and in particular, 0.07 ppm or greater. In a case where coloration is permitted, similarly to $ZrO_2$ and $TiO_2$, Pt may be used as a nucleating agent that promotes precipitation of main crystals. In that case, Pt alone may be a nucleating agent, or as a complex, Pt and other components may be a nucleating agent. In a case where Pt is a nucleating agent, any form (colloid, metal crystal, and the like) may be used.

Rh is a component that may be mixed into glass as ions, colloid, or metal. Similarly to Pt, Rh tends to develop coloration such as yellow to brown and to make the crystallized glass cloudy, and as a result, the color tone of the colored layer 3 is likely to be impaired. Therefore, the content of the Rh is preferably 7 ppm or less, 6 ppm or less, 5 ppm or less, 4 ppm or less, 3 ppm or less, 2 ppm or less, 1.6 ppm or less, 1.4 ppm or less, 1.2 ppm or less, 1 ppm or less, 0.9 ppm or less, 0.8 ppm or less, 0.7 ppm or less, 0.6 ppm or less, 0.5 ppm or less, 0.45 ppm or less, 0.40 ppm or less, 0.35 ppm or less, and in particular, 0.30 ppm or less. It is preferable to avoid contamination of Rh where possible, but if general melting equipment is used, the use of a Rh material may be desired to obtain homogeneous glasses. Therefore, if it is attempted to completely remove Rh, the production cost tends to increase. As long as the coloration is permitted, to suppress the increase in production cost, the lower limit of the content of Rh is preferably 0.0001 ppm or greater, 0.001 ppm or greater, 0.005 ppm or greater, 0.01 ppm or greater, 0.02 ppm or greater, 0.03 ppm or greater, 0.04 ppm or greater, 0.05 ppm or greater, 0.06 ppm or greater, and in particular, 0.07 ppm or greater. In a case where coloration is permitted, similarly to $ZrO_2$ and $TiO_2$, Rh may be used as a nucleating agent. In that case, Rh alone may be a nucleating agent, or as a complex, Rh and other components may be a nucleating agent. In a case where Rh is a nucleating agent that promotes precipitation of main crystals, any form (colloid, metal crystal, and the like) may be used.

Pt+Rh is preferably 9 ppm or less, 8 ppm or less, 7 ppm or less, 6 ppm or less, 5 ppm or less, 4.75 ppm or less, 4.5 ppm or less, 4.25 ppm or less, 4 ppm or less, 3.75 ppm or less, 3.5 ppm or less, 3.25 ppm or less, 3 ppm or less, 2.75 ppm or less, 2.5 ppm or less, 2.25 ppm or less, 2 ppm or less, 1.75 ppm or less, 1.5 ppm or less, 1.25 ppm or less, 1 ppm or less, 0.95 ppm or less, 0.9 ppm or less, 0.85 ppm or less, 0.8 ppm or less, 0.75 ppm or less, 0.7 ppm or less, 0.65 ppm or less, 0.60 ppm or less, 0.55 ppm or less, 0.50 ppm or less, 0.45 ppm or less, 0.40 ppm or less, 0.35 ppm or less, and in particular, 0.30 ppm or less. It is preferable to avoid contamination of Pt and Rh where possible, but if general melting equipment is used, the use of a Pt material or Rh material may be desired to obtain homogeneous glasses. Therefore, if it is attempted to completely remove Pt and Rh, the production cost tends to increase. As long as the coloration is permitted, to suppress the increase in production cost, the lower limit of Pt+Rh is preferably 0.0001 ppm or greater, 0.001 ppm or greater, 0.005 ppm or greater, 0.01 ppm or greater, 0.02 ppm or greater, 0.03 ppm or greater, 0.04 ppm or greater, 0.05 ppm or greater, 0.06 ppm or greater, and in particular, 0.07 ppm or greater.

Typically, in developing glass materials, glasses having different compositions are produced using various crucibles. Therefore, there is often platinum and rhodium evaporated from the crucible inside the electric furnace used for melting. It was confirmed that the Pt and Rh present in the electric furnace are mixed into the glass. The amount of Pt and Rh to be mixed can be controlled by selecting appropriate raw materials and crucible materials. In addition, the contents of Pt and Rh in the glass can also be controlled by attaching a quartz lid to the crucible, lowering the melting temperature, shortening the time required for melting, or the like.

In addition to the above components, as long as no adverse effect is applied on the coloration, minor components, such as $H_2$, $CO_2$, CO, $H_2O$, He, Ne, Ar, and $N_2$ may be contained, and each of the minor components may be contained at up to 0.1%. An intentional addition of Ag, Au, Pd, Ir, V, Cr, Sc, Ce, Pr, Pm, Sm, Eu, Gd, Tb, Dy, Ho, Er, Tm, Yb, Lu, Ac, Th, Pa, U, and the like in the glass increases raw material costs, and tends to increase production costs. On the other hand, if a glass containing Ag, Au, and the like is subjected to light irradiation or heat treatment, aggregates of such components are formed, and crystallization may be promoted from such aggregates. If Pd and the like, which have various catalytic effects, are contained, it is possible to impart unique functions to the glass or the crystallized glass. In view of these circumstances, with an aim to promote crystallization or impart other functions, the crystallized glass may contain 1% or less, 0.5% or less, 0.3% or less, and 0.1% or less of each of the above components, and otherwise, it is preferable to contain 500 ppm or less, 300 ppm or less, 100 ppm or less, and in particular 10 ppm or less of each of the above components.

As long as no adverse effect is applied on the coloration, the $Li_2O$—$Al_2O_3$—$SiO_2$-based crystallized glass may contain up to 10% of $SO_3$, MnO, $Cl_2$, $Y_2O_3$, $MoO_3$, $La_2O_3$, $WO_3$, $HfO_2$, $Ta_2O_5$, $Nd_2O_3$, $Nb_2O_5$, $RfO_2$, and the like, in total. However, raw material batches of these components are costly and use of such raw material batches tends to increase production costs, and thus, unless there are special circumstances, these components may not be added. In particular, $HfO_2$ has a high raw material cost and $Ta_2O_5$ may be a conflict mineral, and thus, the total amount of these components is preferably, in mass %, 5% or less, 4% or less, 3% or less, 2% or less, 1% or less, 0.5% or less, 0.4% or less, 0.3% or less, 0.2% or less, 0.1% or less, 0.05% or less, less than 0.05%, 0.049% or less, 0.048% or less, 0.047% or less, 0.046% or less, and in particular, 0.045% or less.

The $Li_2O$—$Al_2O_3$—$SiO_2$-based crystallized glass sheet 2 preferably has a β-OH value from 0.001 to 2/mm, from 0.01 to 1.5/mm, from 0.02 to 1.5/mm, from 0.03 to 1.2/mm, from 0.04 to 1.5/mm, from 0.05 to 1/mm, from 0.06 to 1/mm, from 0.07 to 1/mm, from 0.08 to 0.9/mm, from 0.08 to 0.85/mm, from 0.08 to 0.8/mm, from 0.08 to 0.75/mm, from 0.08 to 0.7/mm, from 0.08 to 0.65/mm, from 0.08 to 0.6/mm, from 0.08 to 0.55/mm, from 0.08 to 0.54/mm, from 0.08 to 0.53/mm, from 0.08 to 0.52/mm, from 0.08 to 0.51/mm, and in particular, from 0.08 to 0.5/mm. If the β-OH value is excessively small, a crystal nucleus formation rate in the crystallization step is decreased, and a smaller number of crystal nuclei may be generated. As a result, the number of coarse crystals increases, resulting in cloudy and less transparent appearance of the crystallized glass. Such crystallized glass easily impairs the color tone of the colored layer 3. The reasons why a high β-OH value promotes crystallization is not completely known, but it is assumed that one of the reasons is that the β-OH groups weaken the bond of the glass skeleton and lower the viscosity of the glass. It is assumed that another reason is that the presence of the β-OH groups in the glass leads to increasing the mobility of components that can function as a crystal nucleus, such as Zr. On the other hand, if the β-OH value is excessively large, bubbles are likely to be generated at interface between the glass and a glass manufacturing furnace member made of metal containing Pt and the like, and a glass manufacturing furnace members including refractories, and the like, and thus, the quality of a glass product may be deteriorated. Note that the β-OH value is changed depending on the raw material, the melting atmosphere, the melting temperature, the melting time, and the like, and as necessary, these conditions can be changed to adjust the β-OH value. Note that the "β-OH value" refers to a value obtained by substituting a transmittance of glass measured by using FT-IR, in the following formula.

$$β\text{-OH value}=(1/X)\log(T_1/T_2)$$

X: Glass thickness (mm)

$T_1$: Transmittance (%) at a reference wavelength of 3846 cm$^{-1}$ $T_2$: Minimum transmittance (%) near an absorption wavelength of hydroxyl groups of 3600 cm$^{-1}$ That is, a preferable composition range of the $Li_2O$—$Al_2O_3$—$SiO_2$-based crystallized glass sheet 2 is: $SiO_2$ from 50 to 75%, $Al_2O_3$ from 10 to 30%, $Li_2O$ from 1 to 8%, $SnO_2$ from 0 to 5%, $ZrO_2$ from 1 to 5%, MgO from 0 to 10%, $P_2O_5$ from 0 to 5%, $TiO_2$ from 0 to less than 1.5%, $(Li_2O+Na_2O+K_2O)/ZrO_2$ from 0 to 1.5, $TiO_2/(TiO_2+Fe_2O_3)$ from 0.01 to 0.99, $(MgO+ZnO)/Li_2O$ from 0 to 0.8, and β-OH value from 0.001 to 2/mm; preferably, $SiO_2$ from 50 to 75%, $Al_2O_3$ from 10 to 30%, $Li_2O$ from 1 to 8%, $SnO_2$ from greater than 0 to 5%, $ZrO_2$ from 1 to 5%, MgO from 0 to 10%, $P_2O_5$ from 0 to 5%, $TiO_2$ from 0 to less than 1.5%, $(Li_2O+Na_2O+K_2O)/ZrO_2$ from 0 to 1.5, $TiO_2/(TiO_2+Fe_2O_3)$ from 0.01 to 0.99, $(MgO+ZnO)/Li_2O$ from 0 to 0.8, $(MgO+CaO+SrO+BaO)/$ $(Li_2O+Na_2O+K_2O)$ from 0 to 0.5, and β-OH value from 0.001 to 2/mm; more preferably, $SiO_2$ from 50 to 75%, $Al_2O_3$ from 10 to 30%, $Li_2O$ from 1 to 8%, $SnO_2$ from greater than 0 to 5%, $ZrO_2$ from 1 to 5%, MgO from 0 to 10%, $P_2O_5$ from 0 to 5%, $TiO_2$ from 0 to less than 1.5%, $(Li_2O+Na_2O+K_2O)/ZrO_2$ from 0 to 1.5, $TiO_2/(TiO_2+Fe_2O_3)$ from 0.01 to 0.99, $(MgO+ZnO)/Li_2O$ from 0 to 0.8, $(MgO+CaO+SrO+BaO)/(Li_2O+Na_2O+K_2O)$ from 0 to 0.5, $(MgO+CaO+SrO+BaO)/ZrO_2$ from 0 to 2, and β-OH value from 0.001 to 2/mm; further preferably, $SiO_2$ from 50 to 75%, $Al_2O_3$ from 10 to 30%, $Li_2O$ from 1 to 8%, $SnO_2$ from greater than 0 to 5%, $ZrO_2$ from 1 to 5%, MgO from 0 to 10%, $P_2O_5$ from 0 to 5%, $TiO_2$ from 0 to less than 1.5%, $(Li_2O+Na_2O+K_2O)/ZrO_2$ from 0 to 1.5, $TiO_2/(TiO_2+Fe_2O_3)$ from 0.01 to 0.99, $(MgO+ZnO)/Li_2O$ from 0 to 0.8, $(MgO+CaO+SrO+BaO)/(Li_2O+Na_2O+K_2O)$ from 0 to 0.5, $(MgO+CaO+SrO+BaO)/ZrO_2$ from 0 to 2, $SnO_2/(SnO_2+ZrO_2+P_2O_5+TiO_2+B_2O_3)$ from 0.06 to 0.9, and β-OH value from 0.001 to 2/mm; further preferably, $SiO_2$ from 50 to 75%, $Al_2O_3$ from 10 to 30%, $Li_2O$ from 1 to 8%, $SnO_2$ from greater than 0 to 5%, $ZrO_2$ from 1 to 5%, MgO from 0 to 10%, $P_2O_5$ from 0 to 5%, $TiO_2$ from 0 to less than 1.5%, $(Li_2O+Na_2O+K_2O)/ZrO_2$ from 0 to 1.5, $TiO_2/(TiO_2+Fe_2O_3)$ from 0.01 to 0.99, $(MgO+ZnO)/Li_2O$ from 0 to 0.8, $(MgO+CaO+SrO+BaO)/(Li_2O+Na_2O+K_2O)$ from 0 to 0.5, $(MgO+CaO+SrO+BaO)/ZrO_2$ from 0 to 2, $SnO_2/(SnO_2+ZrO_2+P_2O_5+TiO_2+B_2O_3)$ from 0.06 to 0.9, Pt+Rh from 0 to 5 ppm, and β-OH value from 0.001 to 2/mm; further preferably, $SiO_2$ from 50 to 75%, $Al_2O_3$ from 10 to 30%, $Li_2O$ from 1 to 8%, $SnO_2$ from greater than 0 to 5%, $ZrO_2$ from 1 to 5%, MgO from 0 to 10%, $P_2O_5$ from 0 to 5%, $TiO_2$ from 0 to less than 1.5%, $(Li_2O+Na_2O+K_2O)/ZrO_2$ from 0 to 1.5, $TiO_2/(TiO_2+Fe_2O_3)$ from 0.01 to 0.99, $(MgO+ZnO)/Li_2O$ from 0 to 0.394, $(MgO+CaO+SrO+BaO)/(Li_2O+Na_2O+K_2O)$ from 0 to 0.5, $(MgO+CaO+SrO+BaO)/ZrO_2$ from 0 to 2, $SnO_2/(SnO_2+ZrO_2+P_2O_5+TiO_2+B_2O_3)$ from 0.06 to 0.9, Pt+Rh from 0 to 5 ppm, and β-OH value from 0.001 to 2/mm; and most preferably, $SiO_2$ from 50 to 75%, $Al_2O_3$ from 10 to 30%, $Li_2O$ from 1 to 8%, $SnO_2$ from greater than 0 to 5%, $ZrO_2$ from 1 to 5%, MgO from 0 to 10%, $P_2O_5$ from 0 to 5%, $TiO_2$ from 0 to less than 1.5%, $(Li_2O+Na_2O+K_2O)/ZrO_2$ from 0 to 1.5, $TiO_2/(TiO_2+Fe_2O_3)$ from 0.01 to 0.99, $(MgO+ZnO)/Li_2O$ from 0 to 0.394, $(MgO+CaO+SrO+BaO)/(Li_2O+Na_2O+K_2O)$ from 0 to 0.5, $(MgO+CaO+SrO+BaO)/ZrO_2$ from 0 to 2, $SnO_2/(SnO_2+ZrO_2+P_2O_5+TiO_2+B_2O_3)$ from 0.06 to 0.9, Pt+Rh from 0 to 5 ppm, $HfO_2+Ta_2O_5$ from 0 to less than 0.05%, β-OH value from 0.001 to 2/mm, and $Sb_2O_3+As_2O_3$ less than 0.7%.

The $Li_2O$—$Al_2O_3$—$SiO_2$-based crystallized glass sheet 2 having the above-described composition is likely to have colorless and transparent appearance and less likely to impair the color tone of the colored layer 3.

In the $Li_2O$—$Al_2O_3$—$SiO_2$-based crystallized glass sheet 2, it is preferable that a lightness L* at a thickness of 3 mm is 70% or greater, 75 or greater, 80 or greater, 85 or greater, 90 or greater, 91 or greater, 92 or greater, 93 or greater, 94 or greater, 95 or greater, 96 or greater, 96.1 or greater, 96.3 or greater, and in particular, 96.5 or greater. If the lightness L* is excessively small, the glass tends to be grayish and look dark regardless of the magnitude of chromaticity, and the color tone of the colored layer 3 is likely to be impaired.

In the $Li_2O$—$Al_2O_3$—$SiO_2$-based crystallized glass sheet 2, a chromaticity a* at a thickness of 3 mm is preferably within ±5, within ±4.5, within ±4, within ±3.6, within ±3.2, within ±2.8, within ±2.4, within ±2, within ±1.8, within ±1.6, within ±1.4, within ±1.2, within ±1, within ±0.9, within ±0.8, within ±0.7, within ±0.6, and in particular, within ±0.5. If the lightness a* is a negative value with an excessively large absolute value, the glass tends to be green, if the lightness a* is a positive value with an excessively large absolute value, the glass tends to be red, and in such cases, the color tone of the colored layer 3 is likely to be impaired.

In the $Li_2O$—$Al_2O_3$—$SiO_2$-based crystallized glass sheet 2, a chromaticity b* at a thickness of 3 mm is preferably within ±5, within ±4.5, within ±4, within ±3.6, within ±3.2, within ±2.8, within ±2.4, within ±2, within ±1.8, within ±1.6, within ±1.4, within ±1.2, within ±1, within ±0.9, within ±0.8, within ±0.7, within ±0.6, and in particular, within ±0.5. If the lightness b* is a negative value with an excessively large absolute value, the glass tends to be blue, if the lightness b* is a positive value with an excessively large absolute value, the glass tends to be yellow, and in such cases, the color tone of the colored layer 3 is likely to be impaired.

The $Li_2O$—$Al_2O_3$—$SiO_2$-based crystallized glass sheet 2 preferably has a transmittance at a thickness of 3 mm and a wavelength of 200 nm of 0% or greater, 2.5% or greater, 5% or greater, 10% or greater, 12% or greater, 14% or greater, 16% or greater, 18% or greater, 20% or greater, 22% or greater, 24% or greater, 26% or greater, 28% or greater, 30% or greater, 32% or greater, 34% or greater, 36% or greater, 38% or greater, 40% or greater, 40.5% or greater, 41% or greater, 41.5% or greater, 42% or greater, 42.5% or greater, 43% or greater, 43.5% or greater, 44% or greater, 44.5% or greater, and in particular, 45% or greater. If the transmittance at a wavelength of 200 nm is excessively low, the desired transmission performance may not be obtained, and the color tone of the colored layer 3 is likely to be impaired.

The $Li_2O$—$Al_2O_3$—$SiO_2$-based crystallized glass sheet 2 preferably has a transmittance at a thickness of 3 mm and a wavelength of 250 nm of 0% or greater, 1% or greater, 2% or greater, 3% or greater, 4% or greater, 5% or greater, 6% or greater, 7% or greater, 8% or greater, 9% or greater, 10% or greater, 10.5% or greater, 11% or greater, 11.5% or greater, 12% or greater, 12.5% or greater, 13% or greater, 13.5% or greater, 14% or greater, 14.5% or greater, 15% or greater, 15.5% or greater, and in particular, 16% or greater. If the transmittance at a wavelength of 250 nm is excessively low, the desired transmission performance may not be obtained, and the color tone of the colored layer 3 is likely to be impaired.

The $Li_2O$—$Al_2O_3$—$SiO_2$-based crystallized glass sheet 2 preferably has a transmittance at a thickness of 3 mm and a wavelength of 300 nm of 0% or greater, 2.5% or greater, 5% or greater, 10% or greater, 12% or greater, 14% or greater, 16% or greater, 18% or greater, 20% or greater, 22% or greater, 24% or greater, 26% or greater, 28% or greater, 30% or greater, 32% or greater, 34% or greater, 36% or greater, 38% or greater, 40% or greater, 40.5% or greater, 41% or greater, 41.5% or greater, 42% or greater, 42.5% or greater, 43% or greater, 43.5% or greater, 44% or greater, 44.5% or greater, and in particular, 45% or greater. If the transmittance at a wavelength of 300 nm is excessively low, the desired transmission performance may not be obtained, and the color tone of the colored layer 3 is likely to be impaired.

The $Li_2O$—$Al_2O_3$—$SiO_2$-based crystallized glass sheet 2 preferably has a transmittance at a thickness of 3 mm and a wavelength of 325 nm of 0% or greater, 2.5% or greater, 5% or greater, 10% or greater, 12% or greater, 14% or greater, 16% or greater, 18% or greater, 20% or greater, 22% or greater, 24% or greater, 26% or greater, 28% or greater, 30% or greater, 32% or greater, 34% or greater, 36% or greater, 38% or greater, 40% or greater, 42% or greater, 44% or greater, 46% or greater, 48% or greater, 50% or greater, 52% or greater, 54% or greater, 56% or greater, 57% or greater, 58% or greater, 59% or greater, 60% or greater, 61% or greater, 62% or greater, 63% or greater, 64% or greater, and in particular, 65% or greater. If the transmittance at a wavelength of 325 nm is excessively low, the desired transmission performance may not be obtained, and the color tone of the colored layer 3 is likely to be impaired.

The $Li_2O$—$Al_2O_3$—$SiO_2$-based crystallized glass sheet 2 preferably has a transmittance at a thickness of 3 mm and a wavelength of 350 nm is 0% or greater, 5% or greater, 10% or greater, 15% or greater, 20% or greater, 25% or greater, 30% or greater, 35% or greater, 40% or greater, 45% or greater, 50% or greater, 55% or greater, 60% or greater, 65% or greater, 70% or greater, 71% or greater, 72% or greater, 73% or greater, 74% or greater, 75% or greater, 76% or greater, 77% or greater, 78% or greater, 80% or greater, 81% or greater, 82% or greater, and 83% or greater. If the transmittance at a wavelength of 350 nm is excessively low, the desired transmission performance may not be obtained, and the color tone of the colored layer 3 is likely to be impaired.

The $Li_2O$—$Al_2O_3$—$SiO_2$-based crystallized glass sheet 2 preferably has a transmittance at a thickness of 3 mm and a wavelength of 380 nm of 50% or greater, 55% or greater, 60% or greater, 65% or greater, 70% or greater, 75% or greater, 78% or greater, 80% or greater, 81% or greater, 82% or greater, 83% or greater, and in particular, 84% or greater. If the transmittance at a wavelength of 380 nm is excessively low, the glass develops a strong yellow color and the transparency of the crystallized glass decreased, and as a result, the desired transmission performance may not be obtained and the color tone of the colored layer 3 is likely to be impaired.

The $Li_2O$—$Al_2O_3$—$SiO_2$-based crystallized glass sheet 2 preferably has a transmittance at a thickness of 3 mm and a wavelength of 800 nm of 50% or greater, 55% or greater, 60% or greater, 65% or greater, 70% or greater, 75% or greater, 78% or greater, 80% or greater, 81% or greater, 82% or greater, 83% or greater, 84% or greater, 85% or greater, 86% or greater, 87% or greater, and in particular, 88% or greater. If the transmittance at a wavelength of 800 nm is excessively low, the glass tends to be green and thus to impair the color tone of the colored layer 3.

The $Li_2O$—$Al_2O_3$—$SiO_2$-based crystallized glass sheet 2 preferably has a transmittance at a thickness of 3 mm and a wavelength of 1200 nm of 50% or greater, 55% or greater, 60% or greater, 65% or greater, 70% or greater, 72% or greater, 74% or greater, 76% or greater, 78% or greater, 80% or greater, 81% or greater, 82% or greater, 83% or greater, 84% or greater, 85% or greater, 86% or greater, 87% or greater, 88% or greater, and in particular, 89% or greater. If the transmittance at a wavelength of 1200 nm is excessively low, the glass tends to be green and thus to impair the color tone of the colored layer 3.

The $Li_2O$—$Al_2O_3$—$SiO_2$-based crystallized glass sheet 2 preferably has a rate of transmittance change before and after crystallization at a thickness of 3 mm and at a wavelength of 300 nm of 50% or less, 48% or less, 46% or less, 44% or less, 42% or less, 40% or less, 38% or less, 37.5% or less, 37% or less, 36.5% or less, 36% or less, 35.5% or less, and in particular, 35% or less. If the rate of transmittance change before and after crystallization is reduced, it is possible to predict and control, before the crystallization, the transmittance after crystallization, and it is easier to obtain the desired transmission performance after crystallization. It is preferable that the rate of transmittance change before and after crystallization is small not only at a wavelength of 300 nm but also over the entire wavelength range.

In the $Li_2O$—$Al_2O_3$—$SiO_2$-based crystallized glass sheet 2, in a state of the glass before crystallization, a strain point (temperature corresponding to the viscosity of the glass of about $10^{14.5}$ dPa·s) is preferably 600° C. or higher, 605° C. or higher, 610° C. or higher, 615° C. or higher, 620° C. or higher, 630° C. or higher, 635° C. or higher, 640° C. or higher, 645° C. or higher, 650° C. or higher, and in particular, 655° C. or higher. If the strain point is excessively low, the pre-crystallized glass becomes easily breakable when formed.

In the $Li_2O$—$Al_2O_3$—$SiO_2$-based crystallized glass sheet 2, in a state of the glass before crystallization, an annealing point (temperature corresponding to the viscosity of the glass of about $10^{13}$ dPa·s) is preferably 680° C. or higher, 685° C. or higher, 690° C. or higher, 695° C. or higher, 700° C. or higher, 705° C. or higher, 710° C. or higher, 715° C. or higher, 720° C. or higher, and in particular, 725° C. or higher. If the annealing point is excessively low, the pre-crystallized glass becomes easily breakable when formed.

The $Li_2O$—$Al_2O_3$—$SiO_2$-based crystallized glass sheet 2 is easily crystallized by heat treatment, and thus, unlike general glass such soda lime glass, it is not easy to measure a softening point (temperature corresponding to the viscosity of the glass of about $10^{7.6}$ dPa·s). Therefore, in the $Li_2O$—$Al_2O_3$—$SiO_2$-based crystallized glass of the present invention, a temperature at which the slope of the thermal expansion curve of the glass before crystallization changes is used as a glass transition temperature, and is regarded as an alternative to the softening point. In the $Li_2O$—$Al_2O_3$—$SiO_2$-based crystallized glass sheet 2, in a the glass state before crystallization, the glass transition temperature is preferably 680° C. or higher, 685° C. or higher, 690° C. or higher, 695° C. or higher, 700° C. or higher, 705° C. or higher, 710° C. or higher, 715° C. or higher, 720° C. or higher, and in particular, 725° C. or higher. An excessively low glass transition temperature results in excessively high fluidity of the glass during crystallization, which makes it difficult to form the glass into a desired shape.

In the $Li_2O$—$Al_2O_3$—$SiO_2$-based crystallized glass sheet 2, a liquidus temperature is preferably 1540° C. or less, 1535° C. or less, 1530° C. or less, 1525° C. or less, 1520° C. or less, 1515° C. or less, 1510° C. or less, 1505° C. or less, 1500° C. or less, 1495° C. or less, 1490° C. or less, 1485° C. or less, 1480° C. or less, 1475° C. or less, 1470° C. or less, 1465° C. or less, 1460° C. or less, 1455° C. or less, 1450° C. or less, 1445° C. or less, 1440° C. or less, 1435° C. or less, 1430° C. or less, 1425° C. or less, 1420° C. or less, 1415° C. or less, and in particular, 1410° C. or less. If the liquidus temperature is excessively high, the glass is easily subject to devitrification during production. On the other hand, if the liquidus temperature is 1480° C. or less, it is easy to manufacture the glass by a roll method and the like, if the liquidus temperature is 1450° C. or less, it is easy to manufacture the glass by a casting method, and the like, and If the liquidus temperature is 1410° C. or less, it is easy to manufacture the glass by a fusion method and the like.

In the $Li_2O$—$Al_2O_3$—$SiO_2$-based crystallized glass sheet 2, a liquidus viscosity (logarithm of the viscosity corresponding to the liquidus temperature) is preferably 2.70 or greater, 2.75 or greater, 2.80 or greater, 2.85 or greater, 2.90 or greater, 2.95 or greater, 3.00 or greater, 3.05 or greater, 3.10 or greater, 3.15 or greater, 3.20 or greater, 3.25 or greater, 3.30 or greater, 3.35 or greater, 3.40 or greater, 3.45 or greater, 3.50 or greater, 3.55 or greater, 3.60 or greater, 3.65 or greater, and in particular, 3.70 or greater. If the liquidus viscosity is excessively low, the glass is easily subject to devitrification during production. On the other hand, if the liquidus viscosity is 3.40 or greater, it is easy to manufacture the glass by a roll method and the like, if the liquidus viscosity is 3.50 or greater, it is easy to manufacture the glass by a casting method, and the like, and If the liquidus viscosity is 3.70 or greater, it is easy to manufacture the glass by a fusion method and the like.

In the $Li_2O$—$Al_2O_3$—$SiO_2$-based crystallized glass sheet 2, a β-quartz solid solution preferably precipitates as a main crystal. If the β-quartz solid solution precipitates as the main crystal, the crystal grain easily decreases in size, and thus, the crystallized glass easily transmits visible light. As a result, transparency of the crystallized glass easily increases and the color tone of the colored layer 3 is not easily impaired. It is also possible to easily bring the thermal expansion coefficient of the glass close to zero, and during heat treatment and cooling, the glass is not easily breakable. Note that if the $Li_2O$—$Al_2O_3$—$SiO_2$-based crystallized glass sheet 2 is subjected to heat treatment at a temperature higher than the crystallization conditions for precipitating the β-quartz solid solution, a β-spodumene solid solution precipitates. The crystal grain size of β-spodumene solid solution tends to be larger than that of β-quartz solid solution, and thus, generally, precipitation of β-spodumene solid solution tends to result in a cloudy appearance of the crystallized glass. However, when the glass composition and firing conditions are suitably adjusted, a refractive index difference between the crystalline phase containing β-spodumene solid solution and the residual glass phase may be small, and in such a case, the crystallized glass is less cloudy. In the $Li_2O$—$Al_2O_3$—$SiO_2$-based crystallized glass sheet 2, crystals such as β-spodumene solid solution may be contained as long as there is no adverse effect on coloration and the like.

The $Li_2O$—$Al_2O_3$—$SiO_2$-based crystallized glass sheet 2 preferably has a thermal expansion coefficient at from 30 to 380° C. of $30 \times 10^{-7}/°$ C. or less, $25 \times 10^{-7}/°$ C. or less, $20 \times 10^{-7}/°$ C. or less, $18 \times 10^{-7}/°$ C. or less, $16 \times 10^{-7}/°$ C. or less, $14 \times 10^{-7}/°$ C. or less, $13 \times 10^{-7}/°$ C. or less, $12 \times 10^{-7}/°$ C. or less, $11 \times 10^{-7}/°$ C. or less, $10 \times 10^{-7}/°$ C. or less, $9 \times 10^{-7}/°$ C. or less, $8 \times 10^{-7}/°$ C. or less, $7 \times 10^{-7}/°$ C. or less, $6 \times 10^{-7}/°$ C. or less, $5 \times 10^{-7}/°$ C. or less, $4 \times 10^{-7}/°$ C. or less, $3 \times 10^{-7}/°$ C. or less, and in particular, $2 \times 10^{-7}/°$ C. or less. Note that if dimensional stability and/or thermal shock resistance are particularly desired, the thermal expansion coefficient is preferably from $-5 \times 10^{-7}/°$ C. to $5 \times 10^{-7}/°$ C., from $-3 \times 10^{-7}/°$ C. to $3 \times 10^{-7}/°$ C., from $-2.5 \times 10^{-7}/°$ C. to $2.5 \times 10^{-7}/°$ C., from $-2 \times 10^{-7}/°$ C. to $2 \times 10^{-7}/°$ C., from $-1.5 \times 10^{-7}/°$ C. to $1.5 \times 10^{-7}/°$ C., from $-1 \times 10^{-7}/°$ C. to $1 \times 10^{-7}/°$ C., and in particular, from $-0.5 \times 10^{-7}/°$ C. to $0.5 \times 10^{-7}/°$ C.

The $Li_2O$—$Al_2O_3$—$SiO_2$-based crystallized glass sheet 2 preferably has a thermal expansion coefficient at from 30 to 750° C. of $30 \times 10^{-7}/°$ C. or less, $25 \times 10^{-7}/°$ C. or less, $20 \times 10^{-7}/°$ C. or less, $18 \times 10^{-7}/°$ C. or less, $16 \times 10^{-7}/°$ C. or less, $14 \times 10^{-7}/°$ C. or less, $13 \times 10^{-7}/°$ C. or less, $12 \times 10^{-7}/°$ C. or less, $11 \times 10^{-7}/°$ C. or less, $10 \times 10^{-7}/°$ C. or less, $9 \times 10^{-7}/°$ C. or less, $8 \times 10^{-7}/°$ C. or less, $7 \times 10^{-7}/°$ C. or less, $6 \times 10^{-7}/°$ C. or less, $5 \times 10^{-7}/°$ C. or less, $4 \times 10^{-7}/°$ C. or less, and in particular, $3 \times 10^{-7}/°$ C. or less. Note that if dimensional stability and/or thermal shock resistance are particularly desired, the thermal expansion coefficient is preferably from $-15 \times 10^{-7}/°$ C. to $15 \times 10^{-7}/°$ C., from $-12 \times 10^{-7}/°$ C. to $12 \times 10^{-7}/°$ C., from $-10 \times 10^{-7}/°$ C. to $10 \times 10^{-7}/°$ C., from $-8 \times 10^{-7}/°$ C. to $8 \times 10^{-7}/°$ C., from $-6 \times 10^{-7}/°$ C. to $6 \times 10^{-7}/°$ C., from $-5 \times 10^{-7}/°$ C. to $5 \times 10^{-7}/°$ C., from $-4.5 \times 10^{-7}/°$ C.

to $4.5 \times 10^{-7}/°$ C., from $-4 \times 10^{-7}/°$ C. to $4 \times 10^{-7}/°$ C., from $-3.5 \times 10^{-7}/°$ C. to $3.5 \times 10^{-7}/°$ C., from $-3 \times 10^{-7}/°$ C. to $3 \times 10^{-7}/°$ C., from $-2.5 \times 10^{-7}/°$ C. to $2.5 \times 10^{-7}/°$ C., from $-2 \times 10^{-7}/°$ C. to $2 \times 10^{-7}/°$ C., from $-1.5 \times 10^{-7}/°$ C. to $1.5 \times 10^{-7}/°$ C., from $-1 \times 10^{-7}/°$ C. to $1 \times 10^{-7}/°$ C., and in particular, from $-0.5 \times 10^{-1}/°$ C. to $0.5 \times 10^{-7}/°$ C.

The $Li_2O$—$Al_2O_3$—$SiO_2$-based crystallized glass sheet 2 preferably has a Young's modulus of from 60 to 120 GPa, from 70 to 110 GPa, from 75 to 110 GPa, from 75 to 105 GPa, from 80 to 105 GPa, and in particular, from 80 to 100 GPa. If the Young's modulus is excessively low or high, the mechanical strength of the glass article 1 is likely to decrease.

The $Li_2O$—$Al_2O_3$—$SiO_2$-based crystallized glass sheet 2 preferably has a modulus of rigidity of from 25 to 50 GPa, from 27 to 48 GPa, from 29 to 46 GPa, and in particular, from 30 to 45 GPa. If the modulus of rigidity is excessively low or high, the mechanical strength of the glass article 1 is likely to decrease.

The $Li_2O$—$Al_2O_3$—$SiO_2$-based crystallized glass sheet 2 preferably has a Poisson's ratio of 0.35 or less, 0.32 or less, 0.3 or less, 0.28 or less, 0.26 or less, and in particular, 0.25 or less. If the Poisson's ratio is excessively large, the mechanical strength of the glass article 1 is likely to decrease.

The crystallizable glass before crystallization of the $Li_2O$—$Al_2O_3$—$SiO_2$-based crystallized glass sheet 2 preferably has a density of from 2.30 to 2.60 $g/cm^3$, from 2.32 to 2.58 $g/cm^3$, from 2.34 to 2.56 $g/cm^3$, from 2.36 to 2.54 $g/cm^3$, from 2.38 to 2.52 $g/cm^3$, from 2.39 to 2.51 $g/cm^3$, and in particular, from 2.40 to 2.50 $g/cm^3$. If the density of the crystallizable glass is excessively small, the gas permeability before crystallization deteriorates, and the glass may be contaminated during storage. On the other hand, if the density of the crystallizable glass is excessively large, the weight per unit area increases, and this makes it difficult to handle such glass.

The $Li_2O$—$Al_2O_3$—$SiO_2$-based crystallized glass sheet 2 (after crystallization) preferably has a density of from 2.40 to 2.80 $g/cm^3$, from 2.42 to 2.78 $g/cm^3$, from 2.44 to 2.76 $g/cm^3$, from 2.46 to 2.74 $g/cm^3$, and in particular, from 2.47 to 2.73 $g/cm^3$. If the density of crystallized glass is excessively small, the gas permeability of the crystallized glass may deteriorate and the colored layer may be contaminated. On the other hand, if the density of the crystallized glass is excessively large, the weight per unit area increases, which makes it difficult to handle the crystallized glass. The density of crystallized glass (after crystallization) is an index for determining whether the glass is sufficiently crystallized. Specifically, if the same glasses are compared, a higher density (larger difference in density between raw glass and the crystallized glass) indicates that crystallization is further advanced.

A rate of density change of the $Li_2O$—$Al_2O_3$—$SiO_2$-based crystallized glass sheet 2 is defined by {(density after crystallization $(g/cm^3)$–density before crystallization $(g/cm^3)$)/density before crystallization $(g/cm^3)$}×100(%), where the density before crystallization is a density obtained after holding a melted glass at 700° C. for 30 minutes and cooling the glass to room temperature at 3° C./min, and the density after crystallization is a density obtained after crystallization treatment under a predetermined condition. The rate of density change is preferably from 0.01 to 10%, from 0.05 to 8%, from 0.1 to 8%, from 0.3 to 8%, from 0.5 to 8%, from 0.9 to 8%, from 1 to 7.8%, from 1 to 7.4%, from 1 to 7%, from 1.2 to 7%, from 1.6 to 7%, from 2 to 7%, from 2 to 6.8%, from 2 to 6.5%, from 2 to 6.3%, from 2 to 6.2%, from 2 to 6.1%, from 2 to 6%, from 2.5 to 5%, from 2.6 to 4.5%, and from 2.8 to 3.8%. If the rate of density change before and after crystallization is reduced, it is possible to reduce a breakage rate after crystallization, and it is possible to reduce scattering of glass and a glass matrix, and as a result it is possible to obtain crystallized glass with high transmittance. In particular, in a region where the content of $TiO_2$ is less than 2.0% (in particular, less than 0.5%), in order to reduce a coloration factor other than absorption of $TiO_2$ and the like, it is possible to significantly reduce scattering and possible to contribute to improving the transmittance.

The $Li_2O$—$Al_2O_3$—$SiO_2$-based crystallized glass sheet 2 may be subject to chemical strengthening and the like. As a treatment condition of the chemical strengthening treatment, an appropriate treatment time and an appropriate treatment temperature may be chosen in consideration of the glass composition, the crystallinity, the type of the molten salt, and the like. For example, in order to facilitate chemical strengthening after crystallization, a glass composition containing a large amount of $Na_2O$ that may be contained in the residual glass may be selected, and the crystallinity may be intentionally lowered. A molten salt may include an alkali metal such as Li, Na, K alone or in combination thereof. In addition, instead of normal one-step strengthening, multi-step chemical strengthening may be selected. Besides, if the $Li_2O$—$Al_2O_3$—$SiO_2$-based crystallized glass sheet 2 is subject to chemical strengthening and the like before crystallization, it is possible to reduce the content of $Li_2O$ on a surface of a sample compared to the content of $LiO_2$ inside the sample. When such glass is crystallized, the crystallinity of the surface of the sample is lower than that inside the sample and the thermal expansion coefficient of the surface of the sample is relatively high, it is possible to introduce compressive stress resulting from a difference in thermal expansion into the surface of the sample. If the crystallinity of the surface of the sample is low, the glass phase increases at the surface, and depending on the selection of glass composition, it is possible to improve chemical resistance and gas barrier properties.

Next, a method of manufacturing the $Li_2O$—$Al_2O_3$—$SiO_2$-based crystallized glass sheet 2 will be described.

Firstly, a raw material batch prepared to be glass having the composition described above is charged into a glass melting furnace, melted at from 1500 to 1750° C., and then, formed. Note that a flame melting method using a burner and the like, an electric melting method by electric heating, and the like may be used during the glass melting. In addition, melting by laser irradiation and melting by plasma may also be used.

Next, the obtained crystallizable glass (glass that can be crystallized but not yet crystallized) is heat-treated to crystallize. As the crystallization condition, firstly, nucleation is performed at from 700 to 950° C. (preferably from 750 to 900° C.) for 0.1 to 100 hours (preferably from 1 to 60 hours), and subsequently, crystal growth is performed at from 800 to 1050° C. (preferably from 800 to 1000° C.) for 0.1 to 50 hours (preferably from 0.2 to 10 hours). As a result, it is possible to obtain transparent $Li_2O$—$Al_2O_3$—$SiO_2$-based crystallized glass (thickness: 1 to 10 mm) in which β-quartz solid solution crystals were precipitated as main crystals. Note that heat treatment may be performed only at a certain temperature, stepwise heat treatment including holding the glass at two or more temperature levels may be performed, and heating may be performed while providing a temperature gradient.

A sound wave or electromagnetic wave may be applied to promote the crystallization. Further, the crystallized glass at a high-temperature may be cooled at a rate according to a certain temperature gradient, or may be cooled according to a temperature gradient of two or more levels. If it is preferable to obtain sufficient thermal shock resistance, it is desired to sufficiently relax the structure of the residual glass phase by controlling the cooling rate. In an inner portion of the crystallized glass in the thickness direction, which is farthest from the surface, an average cooling rate from 800° C. to 25° C. is preferably 3000° C./min, 1000° C./min or less, 500° C./min or less, 400° C./min or less, 300° C./min or less, 200° C./min or less, 100° C./min or less, 50° C./min or less, 25° C./min or less, 10° C./min or less, and in particular, 5° C./min or less. If it is desired to obtain a long-term dimensional stability, the average cooling rate is further preferably 2.5° C./min or less, 1° C./min or less, 0.5° C./min or less, 0.1° C./min or less, 0.05° C./min or less, 0.01° C./min or less, 0.005° C./min or less, 0.001° C./min or less, 0.0005° C./min or less, and in particular, 0.0001° C./min or less. Except for a case of physical strengthening treatment by air cooling, water cooling, and the like, as to the cooling rate of the crystallized glass, it is desirable to minimize a difference between the cooling rate at the surface of the glass and the cooling rate in the inner portion in the thickness direction, which is furthest from the surface of the glass. A value obtained by dividing the cooling rate in the inner portion in the thickness direction, which is furthest from the surface, by the cooling rate at the surface is preferably from 0.0001 to 1, from 0.001 to 1, from 0.01 to 1, from 0.1 to 1, from 0.5 to 1, from 0.8 to 1, from 0.9 to 1, and in particular, 1. When the value is close to 1, in all positions of the crystallized glass sample, residual strain is difficult to occur, and it is easy to obtain a long-term dimensional stability. Note that it is possible to estimate the cooling rate at the surface by using a contact temperature measurement or a radiation thermometer. The internal temperature can be estimated by placing the crystallized glass at a high temperature in a cooling medium, measuring a heat quantity and a heat quantity change rate of the cooling medium, estimating the internal temperature based on numerical data obtained in the measurement, specific heat and thermal conductivity of the crystallized glass and the cooling medium, and the like.

Colored Layer 3

The colored layer 3 preferably contains a silicone resin, a color pigment, and an extender pigment. From the perspective of dispersibility, heat resistance, in the colored layer 3, the content ratio of the color pigment to the extender pigment (color pigment/extender pigment) is preferably from 1 to 6, in particular from 1.5 to 5.

The silicone resin contained in the colored layer 3 preferably has high heat resistance. For example, the silicone resin contained in the colored layer 3 is preferably a silicone resin in which a functional group directly bonded to a silicon atom is at least one of a methyl group and a phenyl group. In these cases, the color change of the colored layer 3 is easily suppressed when the glass article 1 reaches a high temperature.

The content of the silicone resin in the colored layer 3 is preferably from 20 to 70 mass %, in particular from 30 mass to 60 mass %. If the content of the silicone resin is excessively small, the heat resistance and the impact resistance of the glass article 1 are likely to decrease. On the other hand, if the content of the silicone resin is excessively large, the mechanical strength of the glass article 1 is likely to decrease. Note that the content of the silicone resin is a content relative to the total amount of all materials included in the colored layer 3, which corresponds to 100 mass %.

The color pigment contained in the colored layer 3 is not particularly limited as long as a colored inorganic material is used. Examples of the color pigments include, but are not limited to, a white pigment powder such as a $TiO_2$ powder, a $ZrO_2$ powder and a $ZrSiO_4$ powder, a blue inorganic pigment powder containing Co, a green inorganic pigment powder containing Co, a Ti—Sb—Cr-based or Ti—Ni-based yellow inorganic pigment powder, a Co—Si-based red inorganic pigment powder, a brown inorganic pigment powder containing Fe, and a black inorganic pigment powder containing Cu.

Specific examples of the blue inorganic pigment powder containing Co may include, but are not limited to, a Co—Al or Co—Al—Ti based inorganic pigment powder. Specific examples of the Co—Al-based inorganic pigment powder include, but are not limited to, a $CoAl_2O_4$ powder. Specific examples of the Co—Al—Ti-based inorganic pigment powders include, but are not limited to, a $CoAl_2O_4$—$TiO_2$—$Li_2O$ powder.

Specific examples of the green inorganic pigment powder containing Co include, but are not limited to, a Co—Al—Cr-based or Co—Ni—Ti—Zn-based inorganic pigment powder. Specific examples of the Co—Al—Cr-based inorganic pigment powder include, but are not limited to, a $Co(Al,Cr)_2O_4$ powder. Specific examples of the Co—Ni—Ti—Zn-based inorganic pigment powder include, but are not limited to, a $(Co,Ni,Zn)_2TiO_4$ powder.

Specific examples of the brown inorganic pigment powder containing Fe include, but are not limited to, a Fe—Zn-based inorganic pigment powder. Specific examples of the Fe—Zn-based inorganic pigment powder include, but are not limited to, a $(Zn,Fe)Fe_2O_4$ powder.

Specific examples of the black inorganic pigment powder containing Cu include, but are not limited to, a Cu—Cr-based inorganic pigment powder and a Cu—Fe-based inorganic pigment powder. Specific examples of the Cu—Cr-based inorganic pigment powder include, but are not limited to, a $Cu(Cr,Mn)_2O_4$ powder and a Cu—Cr—Mn powder. Specific examples of the Cu—Fe-based inorganic pigment powder include, but are not limited to, a Cu—Fe—Mn powder.

Such color pigments may be used alone or as a combination of one or more types thereof.

The content of the color pigment in the colored layer 3 is preferably from 10 to 60 mass %, in particular, from 15 to 50 mass %. If the content of the color pigment is excessively small, the light shielding property and the design property of the glass article 1 are likely to be impaired. On the other hand, if the content of the color pigment is excessively large, the heat resistance and the impact resistance of the glass article 1 are likely to decrease. Note that the content of the color pigment is a content relative to the total amount of all materials included in the colored layer 3, which corresponds to 100 mass %.

An average particle size of the color pigment is preferably from 0.05 to 0.4 μm or greater, in particular, from 0.1 to 0.3 μm. If the average particle size of the color pigment is excessively small, a paste tends to have a high viscosity in a manufacturing method described below, and the printability tends to deteriorate. On the other hand, if the average particle size of the color pigment is excessively large, the heat resistance and the impact resistance are likely to deteriorate. Note that the average particle size refers to an average particle size calculated based on a volume base distribution determined by using laser diffraction.

An extender pigment contained in the colored layer 3 is an inorganic pigment powder different from the color pigment. The extender pigment is not particularly limited, but examples thereof may include talc and mica.

Such extender pigments may be used alone or as a combination of one or more types thereof.

The content of the extender pigment in the colored layer 3 is preferably from 5 to 60 mass %, and in particular from 10 to 40 mass %. If the content of the extender pigment is excessively small, the mechanical strength of the glass article 1 is likely to be deteriorate. On the other hand, if the content of the extender pigment is excessively large, the heat resistance and the impact resistance of the glass article 1 are likely to deteriorate. Note that the content of the extender pigment is a content relative to the total amount of all materials included in the colored layer 3, which corresponds to 100 mass %.

An average particle size of the extender pigment is preferably from 5 to 50 μm, and in particular from 10 to 45 μm. If the average particle size of the extender pigment is excessively small, a paste tends to have a high viscosity in a manufacturing method described below, and the printability is likely to deteriorate. On the other hand, if the average particle size of the extender pigment is excessively large, the heat resistance and the impact resistance are likely to deteriorate.

The total content of the color pigment and the extender pigment in the colored layer 3 is preferably from 15 to 70 mass %, and in particular from 25 to 60 mass %. If the total content of the color pigment and the extender pigment is excessively small, the design property and the mechanical strength of the glass article 1 are likely to deteriorate. On the other hand, if the total content of the color pigment and the extender pigment is excessively large, the heat resistance and the impact resistance of the glass article 1 are likely to deteriorate. Note that the total content of the color pigment and the extender pigment is a content relative to the total amount of all materials included in the colored layer 3, which corresponds to 100 mass %.

A thickness of the colored layer 3 is not particularly limited. The thickness of the colored layer 3 may be appropriately set depending on the light transmittance of the colored layer 3 or the like. The thickness of the colored layer 3 may be, for example, from 1 to 15 μm.

Manufacturing Method of Glass Article 1

The glass article 1 may be manufactured, for example, by the following manufacturing method.

Firstly, paste containing a silicone resin, a color pigment powder, and an extender pigment powder is prepared. The paste is prepared such that the content ratio of the color pigment powder to the extender pigment powder (color pigment/extender pigment) in the paste is greater than 1 to 6. Next, the prepared paste is directly applied on the back surface 2b of the $Li_2O$—$Al_2O_3$—$SiO_2$-based crystallized glass sheet 2 and dried. As a result, it is possible to manufacture the glass article 1. Note that depending on the composition of the colored layer 3, the glass article 1 may be obtained by performing firing after the drying.

Note that the glass article 1 may include an image display portion, a video display portion, a stereoscopic image display portion, a stereoscopic video display portion, a radio wave reception portion, a radio wave transmission portion, and a sound wave generation portion.

The glass article 1 as described above is suitable for a top plate.

Example 1

The present invention will now be described based on Examples below, but the present invention is not limited to Examples. Tables 1 to 30 list Examples of the present invention (Sample Nos. 1 to 98) and Comparative Example (Sample No. 99).

TABLE 1

| | | No. 1 | No. 2 | No. 3 | No. 4 | No. 5 |
|---|---|---|---|---|---|---|
| Composition [wt %] | $SiO_2$ | 65.9 | 64.7 | 65.6 | 65.6 | 65.1 |
| | $Al_2O_3$ | 22.3 | 21.9 | 22.2 | 22.2 | 22.0 |
| | $B_2O_3$ | 0.00 | 0.00 | 0.00 | 0.00 | 0.01 |
| | $P_2O_5$ | 1.40 | 1.38 | 1.38 | 1.38 | 1.38 |
| | $Li_2O$ | 3.71 | 3.64 | 3.70 | 3.70 | 4.10 |
| | $Na_2O$ | 0.40 | 0.39 | 0.39 | 0.39 | 0.39 |
| | $K_2O$ | 0.30 | 0.30 | 0.30 | 0.30 | 0.30 |
| | MgO | 0.70 | 0.69 | 0.20 | 0.20 | 0.40 |
| | CaO | 0.00 | 0.00 | 0.00 | 0.00 | 0.00 |
| | SrO | 0.00 | 0.00 | 0.00 | 0.00 | 0.00 |
| | BaO | 1.20 | 1.18 | 1.18 | 1.18 | 1.18 |
| | ZnO | 0.00 | 0.00 | 0.00 | 0.00 | 0.00 |
| | $TiO_2$ | 0.0023 | 0.0044 | 0.0009 | 0.0015 | 0.0030 |
| | $SnO_2$ | 0.69 | 1.81 | 1.40 | 1.40 | 1.40 |
| | $ZrO_2$ | 3.39 | 4.06 | 3.70 | 3.70 | 3.70 |
| | $Fe_2O_3$ | 0.0153 | 0.0149 | 0.0154 | 0.0152 | 0.0151 |
| | $Sb_2O_3$ | 0.00 | 0.00 | 0.00 | 0.00 | 0.00 |
| | $As_2O_3$ | 0.00 | 0.00 | 0.00 | 0.00 | 0.00 |
| Composition [ppm] | Pt | 0.03 | 0.03 | 0.03 | 0.03 | 0.03 |
| | Rh | 0.02 | 0.02 | 0.02 | 0.02 | 0.02 |
| | Pt + Rh | 0.05 | 0.05 | 0.05 | 0.05 | 0.05 |
| | Sn/(P + B + Zr + Ti + Sn) | 0.126 | 0.249 | 0.216 | 0.216 | 0.216 |
| | Al/(Zr + Sn) | 5.46 | 3.72 | 4.35 | 4.35 | 4.31 |
| | (Mg + Zn)/Li | 0.189 | 0.189 | 0.054 | 0.054 | 0.098 |
| | Sn/(Zr + Sn) | 0.17 | 0.31 | 0.27 | 0.27 | 0.27 |
| | (Si + Al)/Li | 23.76 | 23.76 | 23.73 | 23.73 | 21.24 |
| | (Si + Al)/Sn | 127.74 | 47.90 | 62.71 | 62.71 | 62.21 |
| | (Li + Na + K)/Zr | 1.30 | 1.07 | 1.19 | 1.19 | 1.29 |
| | Ti/Zr | 0.0007 | 0.0011 | 0.0002 | 0.0004 | 0.0008 |
| | Ti/(Ti + Fe) | 0.131 | 0.228 | 0.055 | 0.090 | 0.166 |
| | Na + K + Ca + Sr + Ba | 1.91 | 1.87 | 1.87 | 1.87 | 1.87 |
| | (Mg + Ca + Sr + Ba)/Zr | 0.56 | 0.46 | 0.37 | 0.37 | 0.43 |
| | (Mg + Ca + Sr + Ba)/(Li + Na + K) | 0.43 | 0.43 | 0.31 | 0.31 | 0.33 |
| | Sb + As | 0.00 | 0.00 | 0.00 | 0.00 | 0.00 |
| | | Before crystallization | | | | |
| Transmittance [%] 3 mm thickness | 200 nm | Not measured | 44.9 | 54.1 | 54.1 | 53.9 |
| | 250 nm | Not measured | 17.0 | 19.5 | 19.5 | 19.8 |
| | 300 nm | Not measured | 24.1 | 29.9 | 29.9 | 32.3 |
| | 325 nm | Not measured | 65.6 | 69.6 | 69.6 | 70.9 |
| | 350 nm | Not measured | 84.4 | 86.1 | 86.1 | 86.2 |
| | 380 nm | Not measured | 89.5 | 90.3 | 90.3 | 90.2 |
| | 800 nm | Not measured | 91.5 | 91.8 | 91.8 | 91.7 |
| | 1200 nm | Not measured | 91.7 | 91.9 | 91.9 | 91.7 |
| | L* | Not measured | 96.6 | 96.7 | 96.7 | 96.6 |
| | a* | Not measured | −0.1 | −0.1 | −0.1 | −0.1 |
| | b* | Not measured | 0.2 | 0.2 | 0.2 | 0.2 |
| Low temperature viscosity | Strain point [° C.] | Not measured | Not measured | Not measured | Not measured | Not measured |
| | Annealing point [° C.] | Not measured | Not measured | Not measured | Not measured | Not measured |
| | Glass transition point [° C.] | Not measured | Not measured | Not measured | Not measured | Not measured |
| High temperature viscosity | 10^4[° C.] | Not measured | Not measured | Not measured | Not measured | Not measured |
| | 10^3[° C.] | Not measured | Not measured | Not measured | Not measured | Not measured |
| | 10^2.5[° C.] | Not measured | Not measured | Not measured | Not measured | Not measured |
| | 10^2[° C.] | Not measured | Not measured | Not measured | Not measured | Not measured |
| | Liquidus temperature (° C.) | Not measured | Not measured | Not measured | Not measured | Not measured |
| | Liquidus viscosity [—] | Not measured | Not measured | Not measured | Not measured | Not measured |
| $\alpha[\times 10^{-7}/° C.]$ | 30-380° C. | Not measured | 39.6 | Not measured | Not measured | Not measured |
| | Density [g/cm3] | Not measured | Not measured | Not measured | Not measured | Not measured |
| | β-OH[/mm] | 0.12 | 0.12 | 0.12 | 0.12 | 0.12 |

TABLE 2

| | | No. 1 | No. 2 | No. 3 | No. 4 | No. 5 |
|---|---|---|---|---|---|---|
| | | After crystallization | | | | |
| | Crystallization condition | 810° C.-60 h 920° C.-3 h | 810° C.-60 h 920° C.-3 h | 810° C.-10 h 920° C.-3 h | 810° C.-20 h 920° C.-3 h | 810° C.-20 h 920° C.-3 h |
| Transmittance [%] 3 mm | 200 nm | 26.0 | 27.0 | 29.9 | 35.0 | 27.0 |
| | 250 nm | 26.0 | 14.0 | 17.3 | 20.0 | 14.0 |
| | 300 nm | 36.5 | 15.9 | 20.8 | 22.8 | 17.1 |

TABLE 2-continued

| | | No. 1 | No. 2 | No. 3 | No. 4 | No. 5 |
|---|---|---|---|---|---|---|
| thickness | 325 nm | 55.1 | 53.5 | 62.0 | 63.7 | 58.3 |
| | 350 nm | 55.1 | 77.6 | 80.6 | 81.7 | 78.3 |
| | 380 nm | 69.7 | 84.4 | 85.7 | 86.4 | 84.2 |
| | 800 nm | 89.0 | 91.1 | 91.3 | 91.4 | 91.1 |
| | 1200 nm | 90.9 | 91.1 | 91.6 | 91.4 | 91.2 |
| L* | | 94.4 | 95.8 | 95.8 | 96.1 | 95.8 |
| a* | | −0.1 | −0.1 | −0.1 | 0.0 | −0.1 |
| b* | | 3.4 | 1.3 | 1.4 | 1.0 | 1.3 |
| Precipitated crystal | | β-Q | β-Q | β-Q | β-Q | β-Q |
| Average crystallite size [nm] | | Not measured | Not measured | Not measured | 45 | Not measured |
| $\alpha[\times 10^{-7}/°C.]$ 30-380° C. | | −0.9 | −0.4 | Not measured | Not measured | Not measured |
| $\alpha[\times 10^{-7}/°C.]$ 30-750° C. | | 0.9 | 0.9 | Not measured | Not measured | Not measured |
| Density [g/cm3] | | Not measured | Not measured | Not measured | Not measured | Not measured |
| Young's Modulus [GPa] | | 92 | 93 | Not measured | Not measured | Not measured |
| Modulus of rigidity [GPa] | | 37 | 38 | Not measured | Not measured | Not measured |
| Poisson's ratio | | 0.23 | 0.22 | Not measured | Not measured | Not measured |
| Appearance | | Colorless and transparent | Colorless and transparent | Colorless and transparent | Colorless and transparent | Colorless and transparent |
| Rate of change before and after crystallization [%] | | | | | | |
| 200 nm | | Not measured | 39.8 | 44.7 | 35.4 | 49.9 |
| 250 nm | | Not measured | 17.6 | 11.3 | −3.0 | 29.4 |
| 300 nm | | Not measured | 34.2 | 30.3 | 23.7 | 47.1 |
| 325 nm | | Not measured | 18.6 | 11.0 | 8.4 | 17.8 |
| 350 nm | | Not measured | 8.0 | 6.3 | 5.1 | 9.2 |
| 380 nm | | Not measured | 5.8 | 5.0 | 4.2 | 6.6 |
| 800 nm | | Not measured | 0.4 | 0.5 | 0.4 | 0.6 |
| 1200 nm | | Not measured | 0.4 | 0.5 | 0.4 | 0.6 |

TABLE 3

| | | No. 6 | No. 7 | No. 8 | No. 9 | No. 10 | No. 11 | No. 12 |
|---|---|---|---|---|---|---|---|---|
| Composition [wt %] | $SiO_2$ | 66.0 | 66.1 | 66.2 | 66.7 | 63.5 | 66.6 | 66.8 |
| | $Al_2O_3$ | 22.4 | 22.4 | 22.4 | 22.2 | 23.5 | 22.3 | 21.8 |
| | $B_2O_3$ | 0.00 | 0.00 | 0.00 | 0.82 | 0.00 | 0.00 | 0.00 |
| | $P_2O_5$ | 1.42 | 1.42 | 1.39 | 0.00 | 2.51 | 1.40 | 1.37 |
| | $Li_2O$ | 3.73 | 3.73 | 3.74 | 2.20 | 2.92 | 3.74 | 3.54 |
| | $Na_2O$ | 0.08 | 0.36 | 0.38 | 0.01 | 0.80 | 0.00 | 0.39 |
| | $K_2O$ | 0.30 | 0.00 | 0.00 | 0.01 | 0.05 | 0.00 | 0.00 |
| | MgO | 0.69 | 0.69 | 0.69 | 0.00 | 1.14 | 0.69 | 0.77 |
| | CaO | 0.01 | 0.01 | 0.00 | 0.02 | 0.01 | 0.01 | 0.01 |
| | SrO | 0.00 | 0.00 | 0.01 | 0.34 | 0.00 | 0.00 | 0.00 |
| | BaO | 0.00 | 0.00 | 0.00 | 0.48 | 0.12 | 0.01 | 0.00 |
| | ZnO | 0.00 | 0.00 | 0.00 | 1.66 | 0.00 | 0.01 | 0.00 |
| | $TiO_2$ | 0.0065 | 0.0042 | 0.0031 | 0.0000 | 0.1990 | 0.0055 | 0.0049 |
| | $SnO_2$ | 1.42 | 1.43 | 1.34 | 1.63 | 1.75 | 1.40 | 1.27 |
| | $ZrO_2$ | 3.85 | 3.83 | 3.84 | 3.90 | 3.72 | 3.81 | 2.96 |
| | $Fe_2O_3$ | 0.0068 | 0.0087 | 0.0099 | 0.0284 | 0.0081 | 0.0084 | 0.0075 |
| | $Sb_2O_3$ | 0.00 | 0.00 | 0.00 | 0.00 | 0.00 | 0.00 | 0.00 |
| | $As_2O_3$ | 0.00 | 0.00 | 0.00 | 0.00 | 0.00 | 0.00 | 0.00 |
| Composition [ppm] | Pt | 1.5 | 1.5 | 1.5 | Not measured | 1.5 | 1.5 | 1.5 |
| | Rh | 0.02 | 0.02 | 0.02 | Not measured | 0.02 | 0.02 | 0.02 |
| | Pt + Rh | 1.52 | 1.52 | 1.52 | Not measured | 1.52 | 1.52 | 1.52 |
| Sn/(P + B + Zr + Ti + Sn) | | 0.212 | 0.214 | 0.204 | 0.257 | 0.214 | 0.212 | 0.227 |

TABLE 3-continued

| | | No. 6 | No. 7 | No. 8 | No. 9 | No. 10 | No. 11 | No. 12 |
|---|---|---|---|---|---|---|---|---|
| | Al/(Zr + Sn) | 4.25 | 4.26 | 4.32 | 4.01 | 4.30 | 4.28 | 5.15 |
| | (Mg + Zn)/Li | 0.185 | 0.185 | 0.184 | 0.755 | 0.390 | 0.187 | 0.218 |
| | Sn/(Zr + Sn) | 0.27 | 0.27 | 0.26 | 0.29 | 0.32 | 0.27 | 0.30 |
| | (Si + Al)/Li | 23.70 | 23.73 | 23.69 | 40.41 | 29.79 | 23.77 | 25.03 |
| | (Si + Al)/Sn | 62.25 | 61.89 | 66.12 | 54.54 | 49.71 | 63.50 | 69.76 |
| | (Li + Na + K)/Zr | 1.07 | 1.07 | 1.07 | 0.57 | 1.01 | 0.98 | 1.33 |
| | Ti/Zr | 0.0017 | 0.0011 | 0.0008 | 0.0000 | 0.0535 | 0.0014 | 0.0017 |
| | Ti/(Ti + Fe) | 0.489 | 0.326 | 0.238 | 0.000 | 0.961 | 0.396 | 0.395 |
| | Na + K + Ca + Sr + Ba | 0.39 | 0.37 | 0.39 | 0.86 | 0.98 | 0.02 | 0.40 |
| | (Mg + Ca + Sr + Ba)/Zr | 0.18 | 0.18 | 0.18 | 0.21 | 0.34 | 0.19 | 0.26 |
| | (Mg + Ca + Sr + Ba)/(Li + Na + K) | 0.17 | 0.17 | 0.17 | 0.38 | 0.34 | 0.19 | 0.20 |
| | Sb + As | 0.00 | 0.00 | 0.00 | 0.00 | 0.00 | 0.00 | 0.00 |
| | | | | Before crystallization | | | | |
| Transmittance [%] 3 mm thickness | 200 nm | 65.9 | 67.4 | 65.7 | Not measured | Not measured | 77.2 | 80.7 |
| | 250 nm | 21.2 | 21.3 | 21.3 | Not measured | Not measured | 22.3 | 22.8 |
| | 300 nm | 30.4 | 30.1 | 30.3 | Not measured | Not measured | 29.1 | 32.0 |
| | 325 nm | 69.0 | 68.8 | 69.0 | Not measured | Not measured | 67.8 | 69.2 |
| | 350 nm | 85.4 | 85.2 | 85.3 | Not measured | Not measured | 85.0 | 85.2 |
| | 380 nm | 89.8 | 89.7 | 89.8 | Not measured | Not measured | 89.7 | 89.8 |
| | 800 nm | 91.6 | 91.6 | 91.6 | Not measured | Not measured | 91.6 | 91.6 |
| | 1200 nm | 91.6 | 91.6 | 91.6 | Not measured | Not measured | 91.5 | 91.6 |
| | L* | 96.6 | 96.6 | 96.6 | Not measured | Not measured | 96.6 | 96.7 |
| | a* | −0.1 | −0.1 | −0.1 | Not measured | Not measured | −0.1 | −0.1 |
| | b* | 0.3 | 0.3 | 0.3 | Not measured | Not measured | 0.3 | 0.4 |
| Low temperature viscosity | Strain point [° C.] | 687 | 683 | 684 | Not measured | Not measured | Not measured | Not measured |
| | Annealing point [° C.] | 745 | 741 | 742 | Not measured | Not measured | Not measured | Not measured |
| | Glass transition point [° C.] | 728 | 730 | 728 | Not measured | Not measured | 745 | 740 |
| High temperature viscosity | 10^4[° C.] | 1353 | 1351 | 1352 | Not measured | Not measured | 1358 | 1368 |
| | 10^3[° C.] | 1530 | 1528 | 1531 | Not measured | Not measured | 1537 | 1549 |
| | 10^2.5[° C.] | 1643 | 1641 | 1644 | Not measured | Not measured | 1650 | 1662 |
| | 10^2[° C.] | 1780 | 1777 | 1780 | Not measured | Not measured | 1786 | 1795 |
| | Liquidus temperature (° C.) | 1489 | 1486 | 1489 | Not measured | Not measured | Not measured | Not measured |
| | Liquidus viscosity [—] | 3.20 | 3.21 | 3.21 | Not measured | Not measured | Not measured | Not measured |
| α[×10^−7/° C.] | 30-380° C. | 38.2 | 38.7 | 38.6 | Not measured | Not measured | 36.4 | 37.5 |
| | Density [g/cm3] | 2.442 | 2.442 | 2.441 | Not measured | Not measured | 2.441 | 2.444 |
| | β-OH[/mm] | 0.15 | 0.15 | 0.15 | 0.15 | 015 | 0.15 | 0.15 |

TABLE 4

| | | No. 6 | No. 7 | No. 8 | No. 9 | No. 10 | No. 11 | No. 12 |
|---|---|---|---|---|---|---|---|---|
| | | After crystallization | | | | | | |
| Crystallization condition | | 840° C.-3 h 890° C.-1 h | 840° C.-3 h 890° C.-1 h | 840° C.-3 h 890° C.-1 h | 810° C.-30 h 890° C.-3 h | 825° C.-30 h 905° C.-3 h | 840° C.-3 h 890° C.-1 h | 810° C.-3 h 920° C.-1 h |
| Transmittance [%] 3 mm thickness | 200 nm | 26.8 | 25.4 | 22.7 | Not measured | Not measured | 26.5 | 35.3 |
| | 250 nm | 12.1 | 11.5 | 11.7 | Not measured | Not measured | 12.1 | 16.1 |
| | 300 nm | 26.8 | 25.4 | 22.7 | Not measured | Not measured | 26.5 | 35.3 |
| | 325 nm | 56.4 | 54.1 | 55.7 | Not measured | Not measured | 52.7 | 59.2 |
| | 350 nm | 77.2 | 75.5 | 76.7 | Not measured | Not measured | 75.3 | 74.4 |
| | 380 nm | 83.2 | 81.8 | 82.9 | Not measured | Not measured | 82.1 | 79.6 |
| | 800 nm | 90.7 | 90.5 | 90.6 | Not measured | Not measured | 90.5 | 89.9 |
| | 1200 nm | 90.8 | 90.7 | 90.9 | Not measured | Not measured | 90.6 | 90.7 |
| L* | | 95.5 | 95.2 | 95.4 | Not measured | Not measured | 95.3 | 94.7 |
| a* | | 0.1 | 0.1 | 0.1 | Not measured | Not measured | 0.1 | 0.1 |
| b* | | 1.6 | 1.9 | 1.7 | Not measured | Not measured | 1.7 | 2.3 |
| Precipitated crystal | | β-Q | β-Q | β-Q | β-Q | β-Q | β-Q | β-Q |
| Average crystallite size [nm] | | Not measured | Not measured | 45 | Not measured | Not measured | Not measured | Not measured |
| $\alpha[\times10^{-7}/°$ C.] | 30-380° C. | −5.2 | −5.1 | −5.0 | Not measured | Not measured | −4.0 | −2.5 |
| $\alpha[\times10^{-7}/°$ C.] | 30-750° C. | −3.7 | −3.6 | −3.6 | Not measured | Not measured | −3.7 | −1.7 |
| Density [g/cm3] | | 2.531 | 2.534 | 2.534 | Not measured | Not measured | 2.542 | 2.535 |
| Young's Modulus [GPa] | | Not measured | Not measured | Not measured | Not measured | Not measured | Not measured | Not measured |
| Modulus of rigidity [GPa] | | Not measured | Not measured | Not measured | Not measured | Not measured | Not measured | Not measured |
| Poisson's ratio | | Not measured | Not measured | Not measured | Not measured | Not measured | Not measured | Not measured |
| Appearance | | Colorless and transparent | Colorless and transparent | Colorless and transparent | Colorless and transparent | Colorless and transparent | Colorless and transparent | Colorless and transparent |
| Rate of change before and after crystallization [%] | | | | | | | | |
| 200 nm | | 59.3 | 62.3 | 65.5 | Not measured | Not measured | 65.7 | 56.2 |
| 250 nm | | 43.0 | 46.1 | 44.8 | Not measured | Not measured | 45.5 | 29.4 |
| 300 nm | | 11.7 | 15.7 | 25.1 | Not measured | Not measured | 8.9 | −10.5 |
| 325 nm | | 18.3 | 21.3 | 19.3 | Not measured | Not measured | 22.3 | 14.4 |
| 350 nm | | 9.6 | 11.4 | 10.0 | Not measured | Not measured | 11.3 | 12.6 |
| 380 nm | | 7.3 | 8.8 | 7.7 | Not measured | Not measured | 8.5 | 11.4 |
| 800 nm | | 1.0 | 1.2 | 1.1 | Not measured | Not measured | 1.2 | 1.9 |
| 1200 nm | | 0.9 | 1.0 | 0.7 | Not measured | Not measured | 0.9 | 1.0 |

TABLE 5

| | | No. 13 | No. 14 | No. 15 | No. 16 | No. 17 | No. 18 | No. 19 |
|---|---|---|---|---|---|---|---|---|
| Composition [wt %] | $SiO_2$ | 65.7 | 65.9 | 67.2 | 65.5 | 65.5 | 66.0 | 65.8 |
| | $Al_2O_3$ | 21.7 | 22.2 | 21.6 | 22.0 | 22.0 | 22.3 | 22.1 |
| | $B_2O_3$ | 0.001 | 0.00 | 0.00 | 0.00 | 0.00 | 0.00 | 0.00 |
| | $P_2O_5$ | 1.37 | 1.40 | 1.41 | 1.39 | 1.42 | 1.42 | 1.38 |
| | $Li_2O$ | 3.63 | 4.02 | 3.30 | 3.67 | 3.67 | 3.70 | 3.70 |
| | $Na_2O$ | 0.87 | 0.37 | 0.37 | 0.01 | 0.37 | 0.39 | 0.09 |
| | $K_2O$ | 0.10 | 0.00 | 0.00 | 0.30 | 0.00 | 0.30 | 0.001 |
| | $MgO$ | 0.68 | 1.52 | 1.23 | 0.65 | 0.68 | 0.68 | 0.68 |

TABLE 5-continued

| | | No. 13 | No. 14 | No. 15 | No. 16 | No. 17 | No. 18 | No. 19 |
|---|---|---|---|---|---|---|---|---|
| | CaO | 0.00 | 0.35 | 0.00 | 0.01 | 0.01 | 0.01 | 0.01 |
| | SrO | 0.01 | 0.001 | 0.00 | 0.00 | 0.00 | 0.00 | 0.00 |
| | BaO | 1.18 | 0.00 | 0.30 | 1.18 | 1.18 | 0.001 | 1.17 |
| | ZnO | 0.00 | 0.01 | 0.01 | 0.001 | 0.00 | 0.00 | 0.00 |
| | $TiO_2$ | 0.0175 | 0.0080 | 0.1560 | 0.0782 | 0.0095 | 0.0014 | 0.0147 |
| | $SnO_2$ | 1.17 | 0.45 | 1.18 | 1.39 | 1.39 | 1.41 | 1.31 |
| | $ZrO_2$ | 2.93 | 3.90 | 1.89 | 3.75 | 3.73 | 3.80 | 3.77 |
| | $Fe_2O_3$ | 0.0045 | 0.0033 | 0.0021 | 0.0005 | 0.0072 | 0.0085 | 0.0093 |
| | $Sb_2O_3$ | 0.00 | 0.00 | 0.00 | 0.00 | 0.00 | 0.00 | 0.00 |
| | $As_2O_3$ | 0.00 | 0.00 | 0.00 | 0.00 | 0.00 | 0.00 | 0.00 |
| Composition [ppm] | Pt | 1.4 | 0.2 | 1.4 | 1.5 | 1.5 | 1.5 | 1.5 |
| | Rh | 0.03 | 0.03 | 0.03 | 0.02 | 0.02 | 0.02 | 0.02 |
| | Pt + Rh | 1.43 | 0.23 | 1.43 | 1.52 | 1.52 | 1.52 | 1.52 |
| | Sn/(P + B + Zr + Ti + Sn) | 0.213 | 0.078 | 0.255 | 0.210 | 0.212 | 0.213 | 0.202 |
| | Al/(Zr + Sn) | 5.29 | 5.10 | 7.04 | 4.28 | 4.30 | 4.28 | 4.35 |
| | (Mg + Zn)/Li | 0.187 | 0.381 | 0.377 | 0.177 | 0.185 | 0.184 | 0.184 |
| | Sn/(Zr + Sn) | 0.29 | 0.10 | 0.38 | 0.27 | 0.27 | 0.27 | 0.26 |
| | (Si + Al)/Li | 24.08 | 21.92 | 26.91 | 23.84 | 23.84 | 23.86 | 23.76 |
| | (Si + Al)/Sn | 74.70 | 195.78 | 75.25 | 62.95 | 62.95 | 62.62 | 67.10 |
| | (Li + Na + K)/Zr | 1.57 | 1.13 | 1.94 | 1.06 | 1.08 | 1.16 | 1.01 |
| | Ti/Zr | 0.0060 | 0.0021 | 0.0825 | 0.0209 | 0.0025 | 0.0004 | 0.0039 |
| | Ti/(Ti + Fe) | 0.795 | 0.708 | 0.987 | 0.994 | 0.569 | 0.141 | 0.613 |
| | Na + K + Ca + Sr + Ba | 2.16 | 0.72 | 0.67 | 1.50 | 1.56 | 0.70 | 1.27 |
| | (Mg + Ca + Sr + Ba)/Zr | 0.64 | 0.48 | 0.81 | 0.49 | 0.50 | 0.18 | 0.49 |
| | (Mg + Ca + Sr + Ba)/(Li + Na + K) | 0.41 | 0.43 | 0.42 | 0.46 | 0.46 | 0.16 | 0.49 |
| | Sb + As | 0.00 | 0.00 | 0.00 | 0.00 | 0.00 | 0.00 | 0.00 |
| | | | | Before crystallization | | | | |
| Transmittance [%] 3 mm thickness | 200 nm | 79.6 | Not measured | Not measured | 62.3 | 61.1 | 62.8 | 69.0 |
| | 250 nm | 22.3 | Not measured | Not measured | 20.7 | 20.6 | 20.9 | 21.7 |
| | 300 nm | 33.5 | Not measured | Not measured | 30.7 | 30.0 | 30.3 | 30.4 |
| | 325 nm | 71.2 | Not measured | Not measured | 68.9 | 68.7 | 69.2 | 67.9 |
| | 350 nm | 86.1 | Not measured | Not measured | 85.0 | 85.1 | 85.4 | 84.5 |
| | 380 nm | 90.2 | Not measured | Not measured | 89.5 | 89.6 | 89.8 | 89.3 |
| | 800 nm | 91.7 | Not measured | Not measured | 91.6 | 91.5 | 91.5 | 91.5 |
| | 1200 nm | 91.7 | Not measured | Not measured | 91.6 | 91.5 | 91.6 | 91.6 |
| | L* | 96.7 | Not measured | Not measured | 96.6 | 96.6 | 96.6 | 96.5 |
| | a* | −0.1 | Not measured | Not measured | −0.1 | −0.1 | −0.1 | −0.1 |
| | b* | 0.3 | Not measured | Not measured | 0.4 | 0.4 | 0.3 | 0.4 |
| Low temperature viscosity | Strain point [° C.] | Not measured | Not measured | Not measured | 679 | 682 | 682 | 687 |
| | Annealing point [° C.] | Not measured | Not measured | Not measured | 738 | 741 | 740 | 745 |
| | Glass transition point [° C.] | Not measured | Not measured | Not measured | 727 | 728 | 726 | 730 |
| High temperature viscosity | 10^4[° C.] | Not measured | Not measured | Not measured | 1350 | 1348 | 1351 | 1350 |
| | 10^3[° C.] | Not measured | Not measured | Not measured | 1528 | 1525 | 1531 | 1527 |
| | 10^2.5[° C.] | Not measured | Not measured | Not measured | 1639 | 1636 | 1642 | 1640 |
| | 10^2[° C.] | Not measured | Not measured | Not measured | 1772 | 1769 | 1773 | 1774 |
| | Liquidus temperature (° C.) | Not measured | Not measured | 1378 | 1492 | 1488 | 1491 | 1479 |
| | Liquidus viscosity [—] | Not measured | Not measured | Not measured | 3.18 | 3.19 | 3.20 | 3.24 |
| $\alpha[\times 10^{-7}/° C.]$ | 30-380° C. | Not measured | Not measured | Not measured | 39.2 | 39.7 | 39.4 | 38.4 |

TABLE 5-continued

|  | No. 13 | No. 14 | No. 15 | No. 16 | No. 17 | No. 18 | No. 19 |
|---|---|---|---|---|---|---|---|
| Density [g/cm3] | 2.443 | Not measured | Not measured | 2.462 | 2.461 | 2.440 | 2.461 |
| β-OH[/mm] | 0.13 | 0.13 | 0.13 | 0.13 | 0.13 | 0.13 | 0.13 |

TABLE 6

|  |  | No. 13 | No. 14 | No. 15 | No. 16 | No. 17 | No. 18 | No. 19 |
|---|---|---|---|---|---|---|---|---|
| | | | | After crystallization | | | | |
| Crystallization condition | | 780° C.-3 h 905° C.-1 h | 780° C.-3 h 890° C.-1 h | 780° C.-12 h 890° C.-1 h | 855° C.-3 h 920° C.-1 h | 840° C.-3 h 890° C.-1 h | 855° C.-3 h 920° C.-1 h | 840° C.-3 h 890° C.-1 h |
| Transmittance [%] 3 mm thickness | 200 nm | 37.2 | Not measured | Not measured | 28.9 | 23.5 | 30.0 | 26.1 |
| | 250 nm | 19.0 | Not measured | Not measured | 15.2 | 13.8 | 15.3 | 13.9 |
| | 300 nm | 37.2 | Not measured | Not measured | 28.9 | 23.5 | 30.0 | 26.1 |
| | 325 nm | 64.4 | Not measured | Not measured | 59.8 | 58.1 | 49.8 | 53.3 |
| | 350 nm | 80.2 | Not measured | Not measured | 77.0 | 76.8 | 67.1 | 74.3 |
| | 380 nm | 85.1 | Not measured | Not measured | 82.3 | 82.5 | 74.3 | 80.8 |
| | 800 nm | 90.9 | Not measured | Not measured | 90.4 | 90.5 | 90.2 | 90.2 |
| | 1200 nm | 91.2 | Not measured | Not measured | 90.6 | 90.9 | 90.8 | 90.6 |
| L* | | 95.8 | Not measured | Not measured | 95.3 | 95.3 | 95.3 | 95.4 |
| a* | | 0.0 | Not measured | Not measured | 0.1 | 0.1 | 0.1 | 0.0 |
| b* | | 1.2 | Not measured | Not measured | 1.8 | 1.8 | 1.8 | 1.9 |
| Precipitated crystal | | β-Q | β-Q | β-Q | β-Q | β-Q | β-Q | β-Q |
| Average crystallite size [nm] | | Not measured | Not measured | Not measured | Not measured | Not measured | Not measured | Not measured |
| α[×10$^{-7}$/° C.] 30-380° C. | | −3.0 | −1.3 | −0.8 | −3.4 | −3.5 | −3.7 | −5.0 |
| α[×10$^{-7}$/° C.] 30-750° C. | | −2.7 | −0.8 | −0.5 | −1.8 | −1.9 | −2.0 | −3.5 |
| Density [g/cm3] | | 2.530 | Not measured | 2.521 | 2.544 | 2.544 | 2.521 | 2.551 |
| Young's Modulus [GPa] | | Not measured | Not measured | Not measured | Not measured | Not measured | Not measured | Not measured |
| Modulus of rigidity [GPa] | | Not measured | Not measured | Not measured | Not measured | Not measured | Not measured | Not measured |
| Poisson's ratio | | Not measured | Not measured | Not measured | Not measured | Not measured | Not measured | Not measured |
| Appearance | | Colorless and transparent | Colorless and transparent | Colorless and transparent | Colorless and transparent | Colorless and transparent | Colorless and transparent | Colorless and transparent |
| | | | | Rate of change before and after crystallization [%] | | | | |
| 200 nm | | 53.2 | Not measured | Not measured | 53.7 | 61.5 | 52.2 | 62.2 |
| 250 nm | | 16.8 | Not measured | Not measured | 26.7 | 33.3 | 26.4 | 36.0 |
| 300 nm | | −11.2 | Not measured | Not measured | 6.1 | 21.5 | 0.8 | 14.3 |
| 325 nm | | 9.5 | Not measured | Not measured | 13.3 | 15.4 | 28.0 | 21.5 |
| 350 nm | | 6.9 | Not measured | Not measured | 9.5 | 9.7 | 21.4 | 12.0 |
| 380 nm | | 5.6 | Not measured | Not measured | 8.1 | 8.0 | 17.3 | 9.5 |
| 800 nm | | 0.8 | Not measured | Not measured | 1.3 | 1.1 | 1.5 | 1.3 |
| 1200 nm | | 0.6 | Not measured | Not measured | 1.1 | 0.7 | 0.8 | 1.0 |

TABLE 7

| | | No. 20 | No. 21 | No. 22 | No. 23 | No. 24 | No. 25 | No. 26 |
|---|---|---|---|---|---|---|---|---|
| Composition [wt %] | $SiO_2$ | 66.6 | 65.0 | 66.1 | 67.1 | 68.0 | 65.7 | 67.0 |
| | $Al_2O_3$ | 21.9 | 22.0 | 21.7 | 22.2 | 22.6 | 21.9 | 22.1 |
| | $B_2O_3$ | 0.00 | 0.00 | 0.00 | 0.00 | 0.00 | 0.60 | 0.00 |
| | $P_2O_5$ | 1.39 | 1.38 | 1.36 | 1.41 | 0.00 | 2.55 | 1.40 |
| | $Li_2O$ | 3.66 | 3.67 | 3.63 | 3.69 | 3.74 | 3.64 | 3.62 |
| | $Na_2O$ | 0.40 | 0.40 | 0.41 | 0.07 | 0.09 | 0.07 | 0.37 |
| | $K_2O$ | 0.00 | 0.30 | 0.02 | 0.00 | 0.00 | 0.00 | 0.00 |
| | MgO | 0.68 | 0.69 | 0.68 | 1.23 | 0.40 | 1.23 | 1.23 |
| | CaO | 0.01 | 0.00 | 0.03 | 0.01 | 0.02 | 0.01 | 0.00 |
| | SrO | 0.00 | 0.00 | 0.43 | 0.00 | 0.00 | 0.00 | 0.01 |
| | BaO | 1.17 | 1.19 | 1.16 | 0.00 | 0.00 | 0.00 | 0.00 |
| | ZnO | 0.00 | 0.00 | 0.00 | 0.00 | 0.90 | 0.00 | 0.00 |
| | $TiO_2$ | 0.0210 | 0.3630 | 0.0235 | 0.0001 | 0.0141 | 0.0385 | 0.0720 |
| | $SnO_2$ | 1.23 | 1.36 | 1.21 | 1.41 | 1.22 | 1.25 | 1.29 |
| | $ZrO_2$ | 2.81 | 3.71 | 3.01 | 3.02 | 3.06 | 3.06 | 3.01 |
| | $Fe_2O_3$ | 0.0039 | 0.0000 | 0.0131 | 0.0088 | 0.0003 | 0.0091 | 0.0029 |
| | $Sb_2O_3$ | 0.00 | 0.00 | 0.00 | 0.00 | 0.00 | 0.00 | 0.00 |
| | $As_2O_3$ | 0.00 | 0.00 | 0.00 | 0.00 | 0.00 | 0.00 | 0.00 |
| Composition [ppm] | Pt | 1.5 | 0.01 | 1.5 | 1.4 | 1.4 | 1.4 | 1.4 |
| | Rh | 0.02 | 0.01 | 0.02 | 0.02 | 0.03 | 0.03 | 0.03 |
| | Pt + Rh | 1.52 | 0.02 | 1.52 | 1.42 | 1.43 | 1.43 | 1.43 |
| Sn/(P + B + Zr + Ti + Sn) | | 0.226 | 0.200 | 0.216 | 0.24 | 0.284 | 0.167 | 0.223 |
| Al/(Zr + Sn) | | 5.42 | 4.33 | 5.14 | 5.0 | 5.28 | 5.08 | 5.14 |
| (Mg + Zn)/Li | | 0.186 | 0.188 | 0.187 | 0.333 | 0.348 | 0.338 | 0.340 |
| Sn/(Zr + Sn) | | 0.30 | 0.27 | 0.29 | 0.32 | 0.29 | 0.29 | 0.30 |
| (Si + Al)/Li | | 24.18 | 23.69 | 24.19 | 24.20 | 24.22 | 24.07 | 24.61 |
| (Si + Al)/Sn | | 71.95 | 63.93 | 72.56 | 63.33 | 74.26 | 70.08 | 69.07 |
| (Li + Na + K)/Zr | | 1.44 | 1.18 | 1.35 | 1.25 | 1.25 | 1.21 | 1.33 |
| Ti/Zr | | 0.0075 | 0.0978 | 0.0078 | 0.0000 | 0.0046 | 0.0126 | 0.0239 |
| Ti/(Ti + Fe) | | 0.843 | 1.000 | 0.642 | 0.011 | 0.979 | 0.809 | 0.961 |
| Na + K + Ca + Sr + Ba | | 4.75 | 4.76 | 5.18 | 5.00 | 4.25 | 4.95 | 5.23 |
| (Mg + Ca + Sr + Ba)/Zr | | 0.66 | 0.51 | 0.76 | 0.41 | 0.14 | 0.41 | 0.41 |
| (Mg + Ca + Sr + Ba)/(Li + Na + K) | | 0.46 | 0.43 | 0.57 | 0.33 | 0.11 | 0.34 | 0.31 |
| Sb + As | | 0.00 | 0.00 | 0.00 | 0.00 | 0.00 | 0.00 | 0.00 |
| | | | | Before crystallization | | | | |
| Transmittance [%] 3 mm thickness | 200 nm | 80 | Not measured | 70 | 81 | 78 | 80 | 82 |
| | 250 nm | 23 | Not measured | 19 | 24 | 23 | 24 | 24 |
| | 300 nm | 35 | Not measured | 19 | 34 | 33 | 30 | 34 |
| | 325 nm | 71 | Not measured | 56 | 72 | 71 | 67 | 71 |
| | 350 nm | 86 | Not measured | 80 | 86 | 86 | 85 | 86 |
| | 380 nm | 90 | Not measured | 88 | 90 | 90 | 90 | 90 |
| | 800 nm | 92 | Not measured | 91 | 92 | 92 | 91 | 92 |
| | 1200 nm | 92 | Not measured | 91 | 92 | 92 | 92 | 92 |
| | L* | 96.7 | Not measured | 96.6 | 96.7 | 96.7 | 96.6 | 96.6 |
| | a* | −0.1 | Not measured | −0.1 | 0.0 | 0.0 | 0.0 | 0.0 |
| | b* | 0.3 | Not measured | 0.4 | 0.3 | 0.3 | 0.3 | 0.3 |
| Low temperature viscosity | Strain point [° C.] | 683 | Not measured | 683 | Not measured | Not measured | Not measured | Not measured |
| | Annealing point [° C.] | 742 | Not measured | 742 | Not measured | Not measured | Not measured | Not measured |
| | Glass transition point [° C.] | 737 | Not measured | 731 | 738 | 743 | 731 | Not measured |
| High temperature viscosity | 10^4[° C.] | 1362 | Not measured | 1362 | 1356 | 1352 | 1357 | 1358 |
| | 10^3[° C.] | 1544 | Not measured | 1544 | 1537 | 1532 | 1538 | 1538 |
| | 10^2.5[° C.] | 1658 | Not measured | 1656 | 1649 | 1645 | 1650 | 1653 |
| | 10^2[° C.] | 1793 | Not measured | 1789 | 1778 | 1778 | 1780 | 1790 |

TABLE 7-continued

| | No. 20 | No. 21 | No. 22 | No. 23 | No. 24 | No. 25 | No. 26 |
|---|---|---|---|---|---|---|---|
| Liquidus temperature (° C.) | 1423 | Not measured | 1442 | Not measured | Not measured | Not measured | Not measured |
| Liquidus viscosity [—] | 3.63 | Not measured | 3.53 | Not measured | Not measured | Not measured | Not measured |
| $\alpha[\times 10^{-7}/°\text{C.}]$ 30-380° C. | 39.2 | Not measured | 39.3 | 36.6 | 36.9 | 36.5 | 36.9 |
| Density [g/cm3] | 2.441 | Not measured | 2.445 | 2.431 | 2.438 | 2.420 | 2.430 |
| β-OH[/mm] | 0.18 | 0.18 | 0.18 | 0.18 | 0.18 | 0.18 | 0.18 |

TABLE 8

| | | No. 20 | No. 21 | No. 22 | No. 23 | No. 24 | No. 25 | No. 26 |
|---|---|---|---|---|---|---|---|---|
| | | | | After crystallization | | | | |
| Crystallization condition | | 840° C.-3 h 890° C.-1 h | 810° C.-20 h 920° C.-3 h | 810° C.-3 h 920° C.-1 h | 780° C.-3 h 890° C.-1 h | 780° C.-3 h 890° C.-1 h | 780° C.-3 h 890° C.-1 h | 780° C.-3 h 890° C.-1 h |
| Transmittance [%] 3 mm thickness | 200 nm | 41 | Not measured | 34 | 30 | 26 | 29 | 33 |
| | 250 nm | 17 | Not measured | 10 | 14 | 13 | 11 | 13 |
| | 300 nm | 41 | Not measured | 34 | 30 | 26 | 29 | 33 |
| | 325 nm | 54 | Not measured | 44 | 56 | 55 | 55 | 61 |
| | 350 nm | 69 | Not measured | 66 | 76 | 75 | 76 | 79 |
| | 380 nm | 74 | 70 | 76 | 82 | 81 | 83 | 84 |
| | 800 nm | 90 | 91 | 90 | 91 | 91 | 91 | 91 |
| | 1200 nm | 91 | Not measured | 90 | 91 | 91 | 91 | 91 |
| L* | | 93.9 | Not measured | 94.8 | 95.4 | 95.3 | 95.6 | 95.6 |
| a* | | 0.2 | Not measured | 0.0 | 0.1 | 0.0 | 0.0 | 0.1 |
| b* | | 3.4 | Not measured | 2.7 | 1.7 | 1.9 | 1.5 | 1.4 |
| Precipitated crystal | | β-Q | β-Q | β-Q | β-Q | β-Q | β-Q | β-Q |
| Average crystallite size [nm] | | Not measured | Not measured | Not measured | Not measured | Not measured | Not measured | Not measured |
| $\alpha[\times 10^{-7}/°\text{C.}]$ 30-380° C. | | -5.4 | -0.2 | -5.0 | -2.8 | -2.5 | -2.4 | -1.1 |
| $\alpha[\times 10^{-7}/°\text{C.}]$ 30-750° C. | | -4.0 | -0.9 | -3.4 | -2.6 | -1.9 | -2.5 | -0.8 |
| Density [g/cm3] | | 2.520 | Not measured | 2.529 | 2.529 | 2.534 | 2.527 | 2.523 |
| Young's Modulus [GPa] | | Not measured | Not measured | Not measured | Not measured | Not measured | Not measured | Not measured |
| Modulus of rigidity [GPa] | | Not measured | Not measured | Not measured | Not measured | Not measured | Not measured | Not measured |
| Poisson's ratio | | Not measured | Not measured | Not measured | Not measured | Not measured | Not measured | Not measured |
| Appearance | | Colorless and transparent | Colorless and transparent | Colorless and transparent | Colorless and transparent | Colorless and transparent | Colorless and transparent | Colorless and transparent |
| | | | Rate of change before and after crystallization [%] | | | | | |
| 200 nm | | 49.3 | Not measured | 51.1 | 62.8 | 66.5 | 64.5 | 59.8 |
| 250 nm | | 24.3 | Not measured | 47.7 | 41.5 | 42.8 | 54.3 | 43.9 |
| 300 nm | | -16.4 | Not measured | -76.5 | 12.6 | 21.0 | 4.2 | 2.2 |
| 325 nm | | 23.8 | Not measured | 22.2 | 21.6 | 22.4 | 19.0 | 13.6 |
| 350 nm | | 20.1 | Not measured | 18.1 | 12.0 | 12.8 | 9.6 | 8.2 |
| 380 nm | | 17.3 | Not measured | 13.7 | 8.9 | 9.6 | 7.1 | 6.6 |
| 800 nm | | 2.1 | Not measured | 1.3 | 1.3 | 1.1 | 0.8 | 1.0 |
| 1200 nm | | 1.0 | Not measured | 1.4 | 0.9 | 0.9 | 0.6 | 0.9 |

TABLE 9

| | | No. 27 | No. 28 | No. 29 | No. 30 | No. 31 | No. 32 | No. 33 |
|---|---|---|---|---|---|---|---|---|
| Composition [wt %] | $SiO_2$ | 66.5 | | | 67.4 | | | |
| | $Al_2O_3$ | 21.8 | | | 22.3 | | | |
| | $B_2O_3$ | 0.00 | | | 0.00 | | | |
| | $P_2O_5$ | 1.40 | | | 1.33 | | | |
| | $Li_2O$ | 3.63 | | | 3.68 | | | |
| | $Na_2O$ | 0.41 | | | 0.37 | | | |
| | $K_2O$ | 0.00 | | | 0.00 | | | |
| | MgO | 0.69 | | | 1.24 | | | |
| | CaO | 0.00 | | | 0.00 | | | |
| | SrO | 0.00 | | | 0.00 | | | |
| | BaO | 1.18 | | | 0.00 | | | |
| | ZnO | 0.01 | | | 0.00 | | | |
| | $TiO_2$ | 0.0182 | | | 0.0145 | | | |
| | $SnO_2$ | 1.36 | | | 1.13 | | | |
| | $ZrO_2$ | 2.95 | | | 2.62 | | | |
| | $Fe_2O_3$ | 0.0018 | | | 0.0064 | | | |
| | $Sb_2O_3$ | 0.00 | 0.00 | 0.00 | 0.00 | 0.00 | 0.00 | 0.00 |
| | $As_2O_3$ | 0.00 | 0.00 | 0.00 | 0.00 | 0.00 | 0.00 | 0.00 |
| Composition [ppm] | Pt | 0 | 0.03 | 0.16 | 0.30 | 0.49 | 0.71 | 0.03 |
| | Rh | 0 | 0.02 | 0.09 | 0.06 | 0.07 | 0.10 | 0.22 |
| | Pt + Rh | 0 | 0.05 | 0.25 | 0.36 | 0.56 | 0.81 | 0.25 |
| Sn/(P + B + Zr + Ti + Sn) | | 0.237 | | | 0.222 | | | |
| Al/(Zr + Sn) | | 5.06 | | | 5.95 | | | |
| (Mg + Zn)/Li | | 0.194 | | | 0.337 | | | |
| Sn/(Zr + Sn) | | 0.32 | | | 0.30 | | | |
| (Si + Al)/Li | | 24.33 | | | 24.38 | | | |
| (Si + Al)/Sn | | 64.93 | | | 79.38 | | | |
| (Li + Na + K)/Zr | | 1.37 | | | 1.55 | | | |
| Ti/Zr | | 0.0062 | | | 0.0055 | | | |
| Ti/(Ti + Fe) | | 0.910 | | | 0.694 | | | |
| Na + K + Ca + Sr + Ba | | 4.73 | | | 5.29 | | | |
| (Mg + Ca + Sr + Ba)/Zr | | 0.64 | | | 0.47 | | | |
| (Mg + Ca + Sr + Ba)/(Li + Na + K) | | 0.47 | | | 0.31 | | | |
| Sb + As | | 0.00 | | | 0.00 | | | |
| Before crystallization | | | | | | | | |
| Transmittance [%] 3 mm thickness | 200 nm | 72.0 | 83.4 | Not measured | Not measured | Not measured | Not measured | Not measured |
| | 250 nm | 22.1 | 24.6 | Not measured | Not measured | Not measured | Not measured | Not measured |
| | 300 nm | 35.3 | 45.9 | Not measured | Not measured | Not measured | Not measured | Not measured |
| | 325 nm | 72.6 | 76.6 | Not measured | Not measured | Not measured | Not measured | Not measured |
| | 350 nm | 86.8 | 87.5 | Not measured | Not measured | Not measured | Not measured | Not measured |
| | 380 nm | 90.4 | 90.3 | Not measured | Not measured | Not measured | Not measured | Not measured |
| | 800 nm | 91.6 | 91.7 | Not measured | Not measured | Not measured | Not measured | Not measured |
| | 1200 mm | 91.6 | 91.7 | Not measured | Not measured | Not measured | Not measured | Not measured |
| | L* | 96.7 | 96.6 | Not measured | Not measured | Not measured | Not measured | Not measured |
| | a* | 0.0 | −0.1 | Not measured | Not measured | Not measured | Not measured | Not measured |
| | b* | 0.2 | 0.4 | Not measured | Not measured | Not measured | Not measured | Not measured |
| Low temperature viscosity | Strain point [° C.] | 683 | Not measured | Not measured | Not measured | Not measured | Not measured | Not measured |
| | Annealing point [° C.] | 742 | Not measured | Not measured | Not measured | Not measured | Not measured | Not measured |
| | Glass transition point [° C.] | 731 | 737 | Not measured | Not measured | Not measured | Not measured | Not measured |
| High temperature viscosity | $10^4$[° C.] | 1362 | 1362 | Not measured | Not measured | Not measured | Not measured | Not measured |
| | $10^3$[° C.] | 1544 | 1542 | Not measured | Not measured | Not measured | Not measured | Not measured |
| | $10^{2.5}$[° C.] | 1656 | 1655 | Not measured | Not measured | Not measured | Not measured | Not measured |
| | $10^2$[° C.] | 1789 | 1789 | Not measured | Not measured | Not measured | Not measured | Not measured |

TABLE 9-continued

|  | No. 27 | No. 28 | No. 29 | No. 30 | No. 31 | No. 32 | No. 33 |
|---|---|---|---|---|---|---|---|
| Liquidus temperature (° C.) | 1442 | 1401 | Not measured | Not measured | Not measured | Not measured | Not measured |
| Liquidus viscosity [—] | 3.53 | 3.72 | Not measured | Not measured | Not measured | Not measured | Not measured |
| $\alpha[\times10^{-7}/°C.]$ 30-380° C. | 39.3 | 37.8 | Not measured | Not measured | Not measured | Not measured | Not measured |
| Density [g/cm3] | 2.444 | 2.422 | Not measured | Not measured | Not measured | Not measured | Not measured |
| β-OH[/mm] | 0.12 | 0.12 | 0.12 | 0.12 | 0.12 | 0.12 | 0.12 |

TABLE 10

|  |  | No. 27 | No. 28 | No. 29 | No. 30 | No. 31 | No. 32 | No. 33 |
|---|---|---|---|---|---|---|---|---|
| After crystallization |  |  |  |  |  |  |  |  |
| Crystallization condition |  | 780° C.-3 h 905° C.-1 h | 780° C.-3 h 890° C.-1 h | 780° C.-3 h 890° C.-1 h | 780° C.-3 h 890° C.-1 h | 780° C.-3 h 890° C.-1 h | 780° C.-3 h 890° C.-1 h | 780° C.-3 h 890° C.-1 h |
| Transmittance [%] 3 mm thickness | 200 nm | 34.9 | 30.6 | 37.5 | 36.7 | 36.7 | 35.9 | 30.6 |
|  | 250 nm | 17.0 | 12.1 | 18.9 | 19.0 | 18.9 | 18.7 | 12.1 |
|  | 300 nm | 34.9 | 30.6 | 20.6 | 23.0 | 22.9 | 23.1 | 30.6 |
|  | 325 nm | 69.9 | 61.9 | 59.7 | 62.2 | 60.7 | 60.5 | 61.9 |
|  | 350 nm | 85.3 | 81.7 | 78.7 | 79.7 | 77.6 | 77.2 | 81.7 |
|  | 380 nm | 88.9 | 87.0 | 91.1 | 91.1 | 90.8 | 90.7 | 87.0 |
|  | 800 nm | 91.4 | 91.4 | 91.1 | 91.1 | 90.8 | 90.7 | 91.4 |
|  | 1200 nm | 91.2 | 91.3 | 91.0 | 90.9 | 90.8 | 90.8 | 91.3 |
|  | L* | 96.3 | 96.2 | 95.9 | 95.9 | 95.6 | 95.5 | 96.2 |
|  | a* | 0.1 | 0.0 | −0.1 | −0.1 | −0.1 | −0.1 | 0.0 |
|  | b* | 0.4 | 0.7 | 1.2 | 1.1 | 1.5 | 1.6 | Not measured |
| Diffuse transmittance [%] 3 mm thickness | 600 nm | Not measured | 0.10 | Not measured | Not measured | Not measured | 0.53 | Not measured |
|  | 800 nm | Not measured | 0.04 | Not measured | Not measured | Not measured | 0.23 | Not measured |
|  | 1200 nm | Not measured | 0.03 | Not measured | Not measured | Not measured | 0.06 | Not measured |
| Precipitated crystal |  | β-Q | β-Q | β-Q | β-Q | β-Q | β-Q | β-Q |
| Average crystallite size [nm] |  | 38 | Not measured | Not measured | Not measured | Not measured | Not measured | Not measured |
| $\alpha[\times10^{-7}/°C.]$ 30-380° C. |  | −5.0 | −2.7 | Not measured | Not measured | Not measured | Not measured | Not measured |
| $\alpha[\times10^{-7}/°C.]$ 30-750° C. |  | −3.4 | −1.7 | Not measured | Not measured | Not measured | Not measured | Not measured |
| Density [g/cm3] |  | 2.530 | 2.515 | Not measured | Not measured | Not measured | Not measured | Not measured |
| Young's Modulus [GPa] |  | Not measured | Not measured | Not measured | Not measured | Not measured | Not measured | Not measured |
| Modulus of rigidity [GPa] |  | Not measured | Not measured | Not measured | Not measured | Not measured | Not measured | Not measured |
| Poisson's ratio |  | Not measured | Not measured | Not measured | Not measured | Not measured | Not measured | Not measured |
| Appearance |  | Colorless and transparent | Colorless and transparent | Colorless and transparent | Colorless and transparent | Colorless and transparent | Colorless and transparent | Colorless and transparent |
| Rate of change before and after crystallization [%] |  |  |  |  |  |  |  |  |
| 200 nm |  | 51.5 | 63.3 | Not measured | Not measured | Not measured | Not measured | Not measured |
| 250 nm |  | 22.9 | 50.6 | Not measured | Not measured | Not measured | Not measured | Not measured |
| 300 nm |  | 1.1 | 33.3 | Not measured | Not measured | Not measured | Not measured | Not measured |
| 325 nm |  | 3.8 | 19.3 | Not measured | Not measured | Not measured | Not measured | Not measured |
| 350 nm |  | 1.7 | 6.6 | Not measured | Not measured | Not measured | Not measured | Not measured |
| 380 nm |  | 1.7 | 3.6 | Not measured | Not measured | Not measured | Not measured | Not measured |
| 800 nm |  | 0.2 | 0.3 | Not measured | Not measured | Not measured | Not measured | Not measured |
| 1200 nm |  | 0.4 | 0.5 | Not measured | Not measured | Not measured | Not measured | Not measured |

TABLE 11

| | | No. 34 | No. 35 | No. 36 | No. 37 | No. 38 | No. 39 | No. 40 | No. 41 | No. 42 | No. 43 |
|---|---|---|---|---|---|---|---|---|---|---|---|
| Composition [wt %] | $SiO_2$ | | | 66.5 | | | | | 66.2 | | |
| | $Al_2O_3$ | | | 22.0 | | | | | 22.2 | | |
| | $B_2O_3$ | | | 0.00 | | | | | 0.00 | | |
| | $P_2O_5$ | | | 1.42 | | | | | 1.40 | | |
| | $Li_2O$ | | | 3.50 | | | | | 2.35 | | |
| | $Na_2O$ | | | 0.40 | | | | | 0.40 | | |
| | $K_2O$ | | | 0.00 | | | | | 0.30 | | |
| | $MgO$ | | | 1.20 | | | | | 1.20 | | |
| | $CaO$ | | | 0.00 | | | | | 0.00 | | |
| | $SrO$ | | | 0.01 | | | | | 0.00 | | |
| | $BaO$ | | | 0.00 | | | | | 1.20 | | |
| | $ZnO$ | | | 0.00 | | | | | 0.00 | | |
| | $TiO_2$ | | | 0.0058 | | | | | 0.0072 | | |
| | $SnO_2$ | | | 1.33 | | | | | 1.30 | | |
| | $ZrO_2$ | | | 3.00 | | | | | 2.99 | | |
| | $Fe_2O_3$ | | | 0.0057 | | | | | 0.0066 | | |
| | $Sb_2O_3$ | | | 0.00 | | | | | 0.00 | | |
| | $As_2O_3$ | | | 0.00 | | | | | 0.00 | | |
| Composition [ppm] | Pt | 0.01 | | | | | 0.00 | | 1.90 | | |
| | Rh | 0.03 | | | | | 0.00 | | 0.05 | | |
| | Pt + Rh | 0.04 | | | | | 0.00 | | 1.95 | | |
| Sn/(P + B + Zr + Ti + Sn) | | | | 0.231 | | | | | 0.228 | | |
| Al/(Zr + Sn) | | | | 5.08 | | | | | 5.17 | | |
| (Mg + Zn)/Li | | | | 0.343 | | | | | 0.511 | | |
| Sn/(Zr + Sn) | | | | 0.31 | | | | | 0.30 | | |
| (Si + Al)/Li | | | | 25.29 | | | | | 37.62 | | |
| (Si + Al)/Sn | | | | 66.54 | | | | | 68.00 | | |
| (Li + Na + K)/Zr | | | | 1.30 | | | | | 1.02 | | |
| Ti/Zr | | | | 0.0019 | | | | | 0.0024 | | |
| Ti/(Ti + Fe) | | | | 0.504 | | | | | 0.522 | | |
| Na + K + Ca + Sr + Ba | | | | 0.41 | | | | | 1.90 | | |
| (Mg + Ca + Sr + Ba)/Zr | | | | 0.40 | | | | | 0.80 | | |
| (Mg + Ca + Sr + Ba)/(Li + Na + K) | | | | 0.31 | | | | | 0.79 | | |
| Sb + As | | | | 0.00 | | | | | 0.00 | | |
| | | | | Before crystallization | | | | | | | |
| Transmittance [%] 3 mm thickness | 200 nm | | | 82.2 | | | Not measured | | 81.5 | | |
| | 250 nm | | | 25.0 | | | Not measured | | 23.7 | | |
| | 300 nm | | | 36.2 | | | Not measured | | 30.6 | | |
| | 325 nm | | | 72.5 | | | Not measured | | 68.1 | | |
| | 350 nm | | | 86.3 | | | Not measured | | 85.0 | | |
| | 380 nm | | | 90.0 | | | Not measured | | 89.9 | | |
| | 800 nm | | | 91.6 | | | Not measured | | 91.6 | | |
| | 1200 nm | | | 91.7 | | | Not measured | | 91.6 | | |
| | L* | | | 96.6 | | | Not measured | | 96.6 | | |
| | a* | | | 0.0 | | | Not measured | | −0.1 | | |
| | b* | | | 0.3 | | | Not measured | | 0.4 | | |
| Low temperature viscosity | Strain point [° C.] | | | Not measured | | | Not measured | | 695 | | |
| | Annealing point [° C.] | | | Not measured | | | Not measured | | 754 | | |
| | Glass transition point [° C.] | | | 742 | | | Not measured | | Not measured | | |
| High temperature viscosity | 10^4[° C.] | | | Not measured | | | Not measured | | 1364 | | |
| | 10^3[° C.] | | | Not measured | | | Not measured | | 1542 | | |
| | 10^2.5[° C.] | | | Not measured | | | Not measured | | 1658 | | |
| | 10^2[° C.] | | | Not measured | | | Not measured | | Not measured | | |

TABLE 11-continued

| | No. 34 | No. 35 | No. 36 | No. 37 | No. 38 | No. 39 | No. 40 | No. 41 | No. 42 | No. 43 |
|---|---|---|---|---|---|---|---|---|---|---|
| Liquidus temperature (° C.) | | | Not measured | | | Not measured | | 1440 | | |
| Liquidus viscosity [—] | | | Not measured | | | Not measured | | 3.53 | | |
| α[×10⁻⁷/° C.] 30-380° C. | | | | 37.1 | | | | | Not measured | |
| Density [g/cm3] | | | | 2.431 | | | | | 2.460 | |
| β-OH[/mm] | | | | 0.19 | | | | | 0.19 | |

TABLE 12

| | | No. 34 | No. 35 | No. 36 | No. 37 | No. 38 | No. 39 | No. 40 | No. 41 | No. 42 | No. 43 |
|---|---|---|---|---|---|---|---|---|---|---|---|
| | | | | | | After crystallization | | | | | |
| Crystallization condition | | 780° C.-3 h 890° C.-1 h | 780° C.-3 h 920° C.-1 h | 810° C.-0.75 h 920° C.-0.25 h | 810° C.-0.75 h 935° C.-0.25 h | 825° C.-0.75 h 935° C.-0.25 h | 825° C.-0.75 h 935° C.-0.25 h | 810° C.-1.5 h 920° C.-1 h | 810° C.-1.5 h 935° C.-1 h | 810° C.-1.5 h 950° C.-1 h | 840° C.-1.5 h 920° C.-1 h |
| Transmittance [%] 3 mm thickness | 200 nm | 35.5 | 30.2 | 32.9 | 31.4 | 38.1 | Not measured | Not measured | Not measured | Not measured | Not measured |
| | 250 nm | 15.8 | 14.5 | 15.9 | 16.0 | 18.9 | Not measured | Not measured | Not measured | Not measured | Not measured |
| | 300 nm | 35.5 | 22.0 | 23.4 | 23.9 | 23.2 | 23.2 | 23.2 | 24.3 | 23.5 | 20.2 |
| | 325 nm | 67.7 | 66.5 | 64.4 | 65.4 | 60.8 | Not measured | 60.8 | 47.1 | 50.1 | 45.7 |
| | 350 nm | 84.5 | 83.8 | 81.5 | 81.9 | 78.2 | Not measured | 78.2 | 59.5 | 64.0 | 60.7 |
| | 380 nm | 88.6 | 88.1 | 86.6 | 86.9 | 84.4 | Not measured | Not measured | Not measured | Not measured | Not measured |
| | 800 nm | 91.4 | 91.4 | 91.4 | 91.4 | 91.3 | Not measured | Not measured | Not measured | Not measured | Not measured |
| | 1200 nm | 91.3 | 91.3 | 91.3 | 91.3 | 91.5 | Not measured | Not measured | Not measured | Not measured | Not measured |
| | L* | 96.3 | 96.3 | 96.2 | 96.2 | 96.0 | Not measured | Not measured | Not measured | Not measured | Not measured |
| | a* | 0.0 | 0.0 | 0.0 | 0.0 | −0.1 | Not measured | Not measured | Not measured | Not measured | Not measured |
| | b* | 0.5 | 0.6 | 0.8 | 0.8 | 1.2 | Not measured | Not measured | Not measured | Not measured | Not measured |
| Precipitated crystal | | β-Q | β-Q | β-Q | β-Q | β-Q | β-Q | β-Q | β-Q | β-Q | β-Q |
| Average crystallite size [nm] | | 41 | Not measured | Not measured | Not measured | Not measured | Not measured | Not measured | Not measured | Not measured | Not measured |
| α[×10⁻⁷/° C.] 30-380° C. | | −1.7 | −1.6 | −1.7 | Not measured | Not measured | Not measured | 12.2 | 13.6 | 15.4 | 12.0 |
| α[×10⁻⁷/° C.] 30-750° C. | | −1.1 | −1.0 | −1.1 | Not measured | Not measured | Not measured | Not measured | Not measured | Not measured | Not measured |
| Density [g/cm3] | | 2.521 | Not measured | Not measured | Not measured | 2.521 | 2.514 | Not measured | Not measured | Not measured | Not measured |
| Young's Modulus [GPa] | | Not measured | Not measured | Not measured | Not measured | Not measured | Not measured | Not measured | Not measured | Not measured | Not measured |
| Modulus of rigidity [GPa] | | Not measured | Not measured | Not measured | Not measured | Not measured | Not measured | Not measured | Not measured | Not measured | Not measured |
| Poisson's ratio | | Not measured | Not measured | Not measured | Not measured | Not measured | Not measured | Not measured | Not measured | Not measured | Not measured |
| Appearance | | | | | Colorless and transparent | | | | | Colorless and transparent | |
| | | | | Rate of change before and after crystallization [%] | | | | | | | |
| Transmittance 3 mm thickness | 200 nm | 56.8 | 63.3 | 59.9 | 61.8 | 53.6 | 53.6 | Not measured | Not measured | Not measured | Not measured |
| | 250 nm | 36.7 | 42.1 | 36.6 | 36.1 | 24.6 | 24.6 | Not measured | Not measured | Not measured | Not measured |
| | 300 nm | 2.0 | 39.1 | 35.4 | 33.9 | 35.8 | 35.8 | 7.3 | 6.3 | 7.1 | 10.3 |
| | 325 nm | 6.6 | 8.3 | 11.1 | 9.8 | 16.1 | 16.1 | 7.3 | 21.0 | 18.0 | 22.4 |
| | 350 nm | 2.1 | 3.0 | 5.6 | 5.1 | 9.4 | 9.4 | 6.8 | 25.5 | 21.1 | 24.4 |
| | 380 nm | 1.5 | 2.1 | 3.8 | 3.5 | 6.2 | 6.2 | Not measured | Not measured | Not measured | Not measured |
| | 800 nm | 0.1 | 0.2 | 0.1 | 0.2 | 0.2 | 0.2 | Not measured | Not measured | Not measured | Not measured |

TABLE 12-continued

| | No. 34 | No. 35 | No. 36 | No. 37 | No. 38 | No. 39 | No. 40 | No. 41 | No. 42 | No. 43 |
|---|---|---|---|---|---|---|---|---|---|---|
| 1200 nm | 0.5 | 0.5 | 0.5 | 0.5 | 0.2 | 0.2 | Not measured | Not measured | Not measured | Not measured |

TABLE 13

| | | No. 44 | No. 45 | No. 46 | No. 47 | No. 48 | No. 49 | No. 50 |
|---|---|---|---|---|---|---|---|---|
| Composition [wt %] | $SiO_2$ | 66.60 | 64.4 | 67.0 | 66.9 | 66.9 | 66.7 | 67.0 |
| | $Al_2O_3$ | 22.3 | 24.0 | 22.3 | 22.4 | 22.5 | 22.2 | 22.3 |
| | $B_2O_3$ | 0.00 | 0.00 | 0.02 | 0.00 | 0.00 | 0.00 | 0.00 |
| | $P_2O_5$ | 1.42 | 1.61 | 1.33 | 1.34 | 1.34 | 1.41 | 1.36 |
| | $Li_2O$ | 3.65 | 3.85 | 3.59 | 3.64 | 3.61 | 3.60 | 3.68 |
| | $Na_2O$ | 0.65 | 0.62 | 0.39 | 0.40 | 0.39 | 0.38 | 0.39 |
| | $K_2O$ | 0.01 | 0.01 | 0.005 | 0.007 | 0.001 | 0.0001 | 0.0032 |
| | MgO | 1.05 | 1.38 | 1.26 | 1.31 | 1.32 | 1.32 | 1.17 |
| | CaO | 0.00 | 0.00 | 0.002 | 0.01 | 0.00 | 0.0007 | 0.00 |
| | SrO | 0.00 | 0.00 | 0.00 | 0.0012 | 0.01 | 0.00 | 0.00 |
| | BaO | 0.45 | 0.00 | 0.03 | 0.00 | 0.01 | 0.01 | 0.0008 |
| | ZnO | 0.0000 | 0.00 | 0.00 | 0.00 | 0.02 | 0.0001 | 0.00 |
| | $TiO_2$ | 0.0181 | 0.0147 | 0.0044 | 0.0048 | 0.0132 | 0.0222 | 0.0058 |
| | $SnO_2$ | 1.19 | 1.20 | 1.20 | 1.18 | 1.15 | 1.28 | 1.19 |
| | $ZrO_2$ | 2.57 | 2.69 | 2.57 | 2.61 | 2.62 | 2.94 | 2.73 |
| | $Fe_2O_3$ | 0.0132 | 0.0112 | 0.0085 | 0.0093 | 0.0095 | 0.0110 | 0.0082 |
| | $Sb_2O_3$ | 0.00 | 0.00 | 0.00 | 0.00 | 0.00 | 0.00 | 0.00 |
| | $As_2O_3$ | 0.00 | 0.00 | 0.00 | 0.00 | 0.00 | 0.00 | 0.00 |
| Composition [ppm] | Pt | 0.01 | 0.00 | 0.15 | 0.15 | 0.15 | 0.15 | 0.15 |
| | RF | 0.02 | 0.01 | 0.05 | 0.05 | 0.05 | 0.05 | 0.05 |
| | Pt + Rh | 0.03 | 0.01 | 0.20 | 0.20 | 0.20 | 0.20 | 0.20 |
| | Sn/(P + B + Zr + Ti + Sn) | 0.229 | 0.218 | 0.234 | 0.230 | 0.224 | 0.226 | 0.225 |
| | Al/(Zr + Sn) | 5.93 | 6.17 | 5.92 | 5.91 | 5.97 | 5.26 | 5.69 |
| | (Mg + Zn)/Li | 0.288 | 0.358 | 0.351 | 0.360 | 0.372 | 0.367 | 0.318 |
| | Sn/(Zr + Sn) | 0.32 | 0.31 | 0.32 | 0.31 | 0.31 | 0.30 | 0.30 |
| | (Si + Al)/Li | 24.36 | 22.96 | 24.87 | 24.53 | 24.76 | 24.69 | 24.27 |
| | (Si + Al)/Sn | 74.71 | 73.67 | 74.42 | 75.68 | 77.74 | 69.45 | 75.04 |
| | (Li + Na + K)/Zr | 1.68 | 1.67 | 1.55 | 1.55 | 1.53 | 1.35 | 1.49 |
| | Ti/Zr | 0.0070 | 0.0055 | 0.0017 | 0.0018 | 0.0050 | 0.0076 | 0.0021 |
| | Ti/(Ti + Fe) | 0.578 | 0.568 | 0.341 | 0.340 | 0.581 | 0.669 | 0.414 |
| | Na + K + Ca + Sr + Ba | 1.11 | 0.63 | 0.43 | 0.42 | 0.41 | 0.39 | 0.39 |
| | (Mg + Ca + Sr + Ba)/Zr | 0.58 | 0.51 | 0.50 | 0.51 | 0.51 | 0.45 | 0.43 |
| | (Mg + Ca + Sr + Ba)/(Li + Na + K) | 0.35 | 0.31 | 0.32 | 0.33 | 0.33 | 0.33 | 0.29 |
| | Sb + As | 0.00 | 0.00 | 0.00 | 0.00 | 0.00 | 0.00 | 0.00 |
| | | | | | Before crystallization | | | |
| Transmittance [%] 3 mm thickness | 200 nm | Not measured | Not measured | Not measured | Not measured | Not measured | Not measured | Not measured |
| | 250 nm | Not measured | Not measured | Not measured | Not measured | Not measured | Not measured | Not measured |
| | 300 nm | Not measured | Not measured | Not measured | Not measured | Not measured | Not measured | Not measured |
| | 325 nm | Not measured | Not measured | Not measured | Not measured | Not measured | Not measured | Not measured |
| | 350 nm | Not measured | Not measured | Not measured | Not measured | Not measured | Not measured | Not measured |
| | 380 nm | Not measured | Not measured | Not measured | Not measured | Not measured | Not measured | Not measured |
| | 800 nm | Not measured | Not measured | Not measured | Not measured | Not measured | Not measured | Not measured |
| | 1200 nm | Not measured | Not measured | Not measured | Not measured | Not measured | Not measured | Not measured |
| | L* | Not measured | Not measured | Not measured | Not measured | Not measured | Not measured | Not measured |
| | a* | Not measured | Not measured | Not measured | Not measured | Not measured | Not measured | Not measured |
| | b* | Not measured | Not measured | Not measured | Not measured | Not measured | Not measured | Not measured |
| Low temperature viscosity | Strain point [° C.] | Not measured | Not measured | Not measured | Not measured | Not measured | Not measured | Not measured |
| | Annealing point [° C.] | Not measured | Not measured | Not measured | Not measured | Not measured | Not measured | Not measured |
| | Glass | Not | Not | Not | Not | Not | Not | Not |

TABLE 13-continued

| | | No. 44 | No. 45 | No. 46 | No. 47 | No. 48 | No. 49 | No. 50 |
|---|---|---|---|---|---|---|---|---|
| | transition point [° C.] | measured | measured | measured | measured | measured | measured | measured |
| High temperature viscosity | 10^4[° C.] | Not measured | Not measured | Not measured | Not measured | Not measured | Not measured | Not measured |
| | 10^3[° C.] | Not measured | Not measured | Not measured | Not measured | Not measured | Not measured | Not measured |
| | 10^2.5[° C.] | Not measured | Not measured | Not measured | Not measured | Not measured | Not measured | Not measured |
| | 10^2[° C.] | Not measured | Not measured | Not measured | Not measured | Not measured | Not measured | Not measured |
| | Liquidus temperature (° C.) | Not measured | Not measured | Not measured | Not measured | Not measured | Not measured | Not measured |
| | Liquidus viscosity [—] | Not measured | Not measured | Not measured | Not measured | Not measured | Not measured | Not measured |
| $\alpha[\times 10^{-7}/° C.]$ | 30-380° C. | Not measured | Not measured | Not measured | Not measured | Not measured | Not measured | Not measured |
| | Density [g/cm3] | Not measured | Not measured | 2.427 | 2.4275 | 2.429 | 2.435 | Not measured |
| | β-OH[/mm] | 0.11 | 0.11 | 0.11 | 0.11 | 0.11 | 0.11 | 0.11 |

TABLE 14

| | | No. 44 | No. 45 | No. 46 | No. 47 | No. 48 | No. 49 | No. 50 |
|---|---|---|---|---|---|---|---|---|
| | | After crystallization | | | | | | |
| | Crystallization condition | 795° C.-3 h 890° C.-1 h | 795° C.-3 h 890° C.-1 h | 780° C.-3 h 890° C.-1 h | 780° C.-3 h 890° C.-1 h | 780° C.-3 h 890° C.-1 h | 780° C.-3 h 890° C.-1 h | 780° C.-3 h 890° C.-1 h |
| Transmittance [%] 3 mm thickness | 200 nm | Not measured | Not measured | Not measured | Not measured | Not measured | Not measured | Not measured |
| | 250 nm | Not measured | Not measured | Not measured | Not measured | Not measured | Not measured | Not measured |
| | 300 nm | Not measured | Not measured | Not measured | Not measured | Not measured | Not measured | Not measured |
| | 325 nm | Not measured | Not measured | Not measured | Not measured | Not measured | Not measured | Not measured |
| | 350 nm | Not measured | Not measured | Not measured | Not measured | Not measured | Not measured | Not measured |
| | 380 nm | Not measured | Not measured | Not measured | Not measured | Not measured | Not measured | Not measured |
| | 800 nm | Not measured | Not measured | Not measured | Not measured | Not measured | Not measured | Not measured |
| | 1200 nm | Not measured | Not measured | Not measured | Not measured | Not measured | Not measured | Not measured |
| | L* | Not measured | Not measured | Not measured | Not measured | Not measured | Not measured | Not measured |
| | a* | Not measured | Not measured | Not measured | Not measured | Not measured | Not measured | Not measured |
| | b* | Not measured | Not measured | Not measured | Not measured | Not measured | Not measured | Not measured |
| | Precipitated crystal | β-Q | β-Q | β-Q | β-Q | β-Q | β-Q | β-Q |
| | Average crystallite size [nm] | Not measured | Not measured | Not measured | Not measured | Not measured | Not measured | Not measured |
| $\alpha[\times 10^{-7}/° C.]$ | 30-380° C. | Not measured | Not measured | −1.5 | −2.1 | −1.0 | −0.7 | Not measured |
| $\alpha[\times 10^{-7}/° C.]$ | 30-750° C. | Not measured | Not measured | −0.8 | −0.9 | −0.1 | 0.1 | Not measured |
| | Density [g/cm3] | Not measured | Not measured | 2.514 | 2.513 | 2.513 | 2.527 | Not measured |
| | Young's Modulus [GPa] | Not measured | Not measured | Not measured | Not measured | Not measured | Not measured | 93 |
| | Modulus of rigidity [GPa] | Not measured | Not measured | Not measured | Not measured | Not measured | Not measured | 38 |

TABLE 14-continued

| | No. 44 | No. 45 | No. 46 | No. 47 | No. 48 | No. 49 | No. 50 |
|---|---|---|---|---|---|---|---|
| Poisson's ratio | Not measured | Not measured | Not measured | Not measured | Not measured | Not measured | 0.22 |
| Appearance | Colorless and transparent | Colorless and transparent | Colorless and transparent | Colorless and transparent | Colorless and transparent | Colorless and transparent | Colorless and transparent |
| | | | Rate of change before and after crystallization [%] | | | | |
| 200 nm | Not measured | Not measured | Not measured | Not measured | Not measured | Not measured | Not measured |
| 250 nm | Not measured | Not measured | Not measured | Not measured | Not measured | Not measured | Not measured |
| 300 nm | Not measured | Not measured | Not measured | Not measured | Not measured | Not measured | Not measured |
| 325 nm | Not measured | Not measured | Not measured | Not measured | Not measured | Not measured | Not measured |
| 350 nm | Not measured | Not measured | Not measured | Not measured | Not measured | Not measured | Not measured |
| 380 nm | Not measured | Not measured | Not measured | Not measured | Not measured | Not measured | Not measured |
| 800 nm | Not measured | Not measured | Not measured | Not measured | Not measured | Not measured | Not measured |
| 1200 nm | Not measured | Not measured | Not measured | Not measured | Not measured | Not measured | Not measured |

TABLE 15

| | | No. 51 | No. 52 | No. 53 | No. 54 | No. 55 | No. 56 | No. 57 |
|---|---|---|---|---|---|---|---|---|
| Composition [wt %] | $SiO_2$ | 65.20 | 65.0 | 65.3 | 64.6 | 65.8 | 65.1 | 64.8 |
| | $Al_2O_3$ | 21.8 | 21.8 | 21.9 | 21.5 | 22.1 | 21.8 | 21.7 |
| | $B_2O_3$ | 0.00 | 0.00 | 0.00 | 0.00 | 0.00 | 0.00 | 0.00 |
| | $P_2O_5$ | 1.38 | 1.38 | 1.39 | 1.37 | 1.41 | 1.39 | 1.38 |
| | $Li_2O$ | 3.66 | 3.65 | 3.66 | 3.63 | 3.70 | 3.66 | 3.64 |
| | $Na_2O$ | 0.85 | 0.39 | 0.39 | 0.40 | 0.40 | 0.39 | 0.39 |
| | $K_2O$ | 0.30 | 0.99 | 0.28 | 0.29 | 0.00 | 0.30 | 0.30 |
| | $MgO$ | 0.68 | 0.68 | 0.95 | 0.65 | 1.23 | 0.68 | 0.67 |
| | $CaO$ | 0.001 | 0.001 | 0.001 | 0.001 | 0.001 | 0.001 | 0.001 |
| | $SrO$ | 0.00 | 0.00 | 0.00 | 0.00 | 0.002 | 0.002 | 0.002 |
| | $BaO$ | 1.16 | 1.15 | 1.19 | 2.64 | 1.23 | 1.21 | 1.2300 |
| | $ZnO$ | 0.001 | 0.001 | 0.001 | 0.001 | 0.00 | 0.00 | 0.00 |
| | $TiO_2$ | 0.0092 | 0.0113 | 0.0321 | 0.0140 | 0.0029 | 0.0201 | 0.0140 |
| | $SnO_2$ | 1.36 | 1.39 | 1.36 | 1.37 | 1.27 | 1.85 | 2.24 |
| | $ZrO_2$ | 3.70 | 3.64 | 3.71 | 3.64 | 2.98 | 3.68 | 3.71 |
| | $Fe_2O_3$ | 0.0080 | 0.0075 | 0.0083 | 0.0081 | 0.0082 | 0.0078 | 0.0084 |
| | $Sb_2O_3$ | 0.00 | 0.00 | 0.00 | 0.00 | 0.00 | 0.00 | 0.00 |
| | $As_2O_3$ | 0.00 | 0.00 | 0.00 | 0.00 | 0.00 | 0.00 | 0.00 |
| Composition [ppm] | Pt | 0.41 | 0.01 | 0.20 | 0.11 | 0.05 | 0.09 | 0.07 |
| | RF | 0.00 | 0.01 | 0.02 | 0.02 | 0.02 | 0.02 | 0.02 |
| | Pt + Rh | 0.41 | 0.02 | 0.22 | 0.13 | 0.07 | 0.11 | 0.09 |
| | Sn/(P + B + Zr + Ti + Sn) | 0.211 | 0.216 | 0.210 | 0.214 | 0.224 | 0.267 | 0.305 |
| | Al/(Zr + Sn) | 4.31 | 4.33 | 4.31 | 4.29 | 5.20 | 3.94 | 3.65 |
| | (Mg + Zn)/Li | 0.186 | 0.187 | 0.260 | 0.179 | 0.332 | 0.186 | 0.184 |
| | Sn/(Zr + Sn) | 0.27 | 0.28 | 0.27 | 0.27 | 0.30 | 0.33 | 0.38 |
| | (Si + Al)/Li | 23.77 | 23.78 | 23.83 | 23.72 | 23.76 | 23.74 | 23.76 |
| | (Si + Al)/Sn | 63.97 | 62.45 | 63.98 | 62.85 | 69.21 | 46.97 | 38.62 |
| | (Li + Na + K)/Zr | 1.30 | 1.38 | 1.17 | 1.19 | 1.38 | 1.18 | 1.17 |
| | Ti/Zr | 0.0025 | 0.0031 | 0.0086 | 0.0038 | 0.0010 | 0.0055 | 0.0038 |
| | Ti/(Ti + Fe) | 0.535 | 0.501 | 0.795 | 0.633 | 0.261 | 0.720 | 0.625 |
| | Na + K + Ca + Sr + Ba | 2.31 | 2.53 | 1.86 | 3.33 | 1.63 | 1.90 | 1.92 |
| | (Mg + Ca + Sr + Ba)/Zr | 0.50 | 0.50 | 0.58 | 0.90 | 0.83 | 0.51 | 0.51 |
| | (Mg + Ca + Sr + Ba)/(Li + Na + K) | 0.38 | 0.36 | 0.49 | 0.76 | 0.50 | 0.44 | 0.44 |
| | Sb + As | 0.00 | 0.00 | 0.00 | 0.00 | 0.00 | 0.00 | 0.00 |
| | | | | Before crystallization | | | | |
| Transmittance [%] 3 mm thickness | 200 nm | Not measured | 69.1 | 73.0 | 72.4 | 78.3 | 65.1 | 59.6 |
| | 250 nm | Not measured | 20.7 | 21.8 | 21.1 | 23.3 | 20.2 | 18.8 |
| | 300 nm | Not measured | 27.9 | 32.3 | 27.9 | 30.6 | 22.8 | 17.7 |

TABLE 15-continued

| | | No. 51 | No. 52 | No. 53 | No. 54 | No. 55 | No. 56 | No. 57 |
|---|---|---|---|---|---|---|---|---|
| | 325 nm | Not measured | 65.9 | 70.3 | 65.9 | 68.0 | 62.9 | 58.6 |
| | 350 nm | Not measured | 83.9 | 85.6 | 84.0 | 84.8 | 83.2 | 82.0 |
| | 380 nm | Not measured | 89.3 | 89.8 | 89.4 | 89.7 | 89.0 | 88.6 |
| | 800 nm | Not measured | 91.4 | 91.6 | 91.5 | 91.5 | 91.4 | 91.3 |
| | 1200 nm | Not measured | 91.2 | 91.6 | 91.4 | 91.8 | 91.7 | 91.7 |
| | L* | Not measured | 96.6 | 96.6 | 96.6 | 96.6 | 96.5 | 96.5 |
| | a* | Not measured | −0.1 | −0.1 | −0.1 | 0.0 | −0.1 | −0.1 |
| | b* | Not measured | 0.4 | 0.3 | 0.4 | 0.3 | 0.4 | 0.5 |
| Low temperature viscosity | Strain point [° C.] | 674 | 674 | 678 | 680 | Not measured | Not measured | Not measured |
| | Annealing point [° C.] | 733 | 733 | 736 | 739 | Not measured | Not measured | Not measured |
| | Glass transition point [° C.] | 733 | 730 | 732 | 733 | 724 | 726 | 728 |
| High temperature viscosity | $10^4$[° C.] | 1346 | 1346 | 1341 | 1345 | 1343 | 1348 | 1345 |
| | $10^3$[° C.] | 1526 | 1524 | 1518 | 1523 | 1523 | 1527 | 1524 |
| | $10^{2.5}$[° C.] | 1641 | 1639 | 1630 | 1630 | 1636 | 1639 | 1638 |
| | $10^2$[° C.] | 1778 | 1777 | 1762 | 1762 | 1768 | 1769 | 1773 |
| | Liquidus temperature (° C.) | Not measured | Not measured | 1493 | Not measured | Not measured | Not measured | Not measured |
| | Liquidus viscosity [—] | Not measured | Not measured | 3.1 | Not measured | Not measured | Not measured | Not measured |
| $\alpha$[×$10^{-7}$/° C.] | 30-380° C. | 42.2 | 42.4 | 40.7 | 41.7 | 39.6 | 39.4 | 39.7 |
| | Density [g/cm3] | 2.463 | 2.462 | 2.465 | 2.484 | 2.450 | 2.463 | 2.469 |
| | β-OH[/mm] | 0.14 | 0.14 | 0.14 | 0.14 | 0.14 | 0.14 | 0.14 |

TABLE 16

| | | No. 51 | No. 52 | No. 53 | No. 54 | No. 55 | No. 56 | No. 57 |
|---|---|---|---|---|---|---|---|---|
| | | After crystallization | | | | | | |
| | Crystallization condition | 855° C.-3 h 920° C.-1 h | 855° C.-3 h 920° C.-1 h | 840° C.-3 h 920° C.-1 h | 840° C.-3 h 920° C.-1 h | 765° C.-3 h 890° C.-1 h | 810° C.-3 h 920° C.-1 h | 810° C.-3 h 920° C.-1 h |
| Transmittance [%] 3 mm thickness | 200 nm | Not measured | Not measured | Not measured | Not measured | Not measured | 36.9 | 37.7 |
| | 250 nm | Not measured | 20.1 | 14.5 | 16.1 | Not measured | 14.6 | 13.2 |
| | 300 nm | Not measured | 18.1 | 17.7 | 17.9 | 20.4 | 14.4 | 11.2 |
| | 325 nm | Not measured | 41.4 | 54.9 | 52.6 | 58.8 | 52.5 | 49.6 |
| | 350 nm | Not measured | Not measured | Not measured | Not measured | 75.8 | 72.8 | 73.8 |
| | 380 nm | Not measured | Not measured | Not measured | Not measured | 81.5 | 79.3 | 80.8 |
| | 800 nm | Not measured | Not measured | Not measured | Not measured | 90.4 | 90.4 | 90.4 |
| | 1200 nm | Not measured | Not measured | Not measured | Not measured | 90.9 | 90.9 | 91.1 |
| | L* | Not measured | Not measured | Not measured | Not measured | 95.2 | 94.9 | 95.1 |
| | a* | Not measured | Not measured | Not measured | Not measured | 0.1 | 0.1 | 0.1 |
| | b* | Not measured | Not measured | Not measured | Not measured | 1.8 | 2.4 | 2.1 |
| | Precipitated crystal | β-Q | β-Q | β-Q | β-Q | β-Q | β-Q | β-Q |
| | Average crystallite size [nm] | 47 | Not measured | Not measured | Not measured | Not measured | Not measured | Not measured |

TABLE 16-continued

| | | No. 51 | No. 52 | No. 53 | No. 54 | No. 55 | No. 56 | No. 57 |
|---|---|---|---|---|---|---|---|---|
| $\alpha[\times10^{-7}/°\text{ C.}]$ | 30-380° C. | 1.4 | 2.5 | 0.9 | 1.4 | 1.1 | −0.9 | −1.0 |
| $\alpha[\times10^{-7}/°\text{ C.}]$ | 30-750° C. | 3.4 | 4.7 | 2.5 | 3.2 | 1.9 | 0.6 | 0.5 |
| Density [g/cm3] | | 2.525 | 2.519 | 2.539 | 2.549 | 2.534 | 2.542 | 2.548 |
| Young's Modulus [GPa] | | Not measured | Not measured | Not measured | Not measured | Not measured | Not measured | Not measured |
| Modulus of rigidity [GPa] | | Not measured | Not measured | Not measured | Not measured | Not measured | Not measured | Not measured |
| Poisson's ratio | | Not measured | Not measured | Not measured | Not measured | Not measured | Not measured | Not measured |
| Appearance | | Colorless and transparent | Colorless and transparent | Colorless and transparent | Colorless and transparent | Colorless and transparent | Colorless and transparent | Colorless and transparent |
| | | Rate of change before and after crystallization [%] | | | | | | |
| 200 nm | | Not measured | Not measured | Not measured | Not measured | Not measured | 43.3 | 36.8 |
| 250 nm | | Not measured | 2.7 | 33.6 | 23.9 | Not measured | 27.7 | 29.9 |
| 300 nm | | Not measured | 35.0 | 45.2 | 35.9 | 33.4 | 36.8 | 36.6 |
| 325 nm | | Not measured | 37.1 | 21.9 | 20.2 | 13.6 | 16.6 | 15.3 |
| 350 nm | | Not measured | Not measured | Not measured | Not measured | 10.6 | 12.4 | 10.0 |
| 380 nm | | Not measured | Not measured | Not measured | Not measured | 9.1 | 11.0 | 8.8 |
| 800 nm | | Not measured | Not measured | Not measured | Not measured | 1.2 | 1.2 | 1.0 |
| 1200 nm | | Not measured | Not measured | Not measured | Not measured | 1.0 | 0.9 | 0.6 |

TABLE 17

| | | No. 58 | No. 59 | No. 60 | No. 61 |
|---|---|---|---|---|---|
| Composition [wt %] | $SiO_2$ | 65.20 | 64.9 | 64.5 | 64.6 |
| | $Al_2O_3$ | 22.5 | 22.4 | 22.5 | 22.6 |
| | $B_2O_3$ | 0.00 | 0.00 | 0.00 | 0.00 |
| | $P_2O_5$ | 1.38 | 1.38 | 1.89 | 1.37 |
| | $Li_2O$ | 3.66 | 3.81 | 3.66 | 3.63 |
| | $Na_2O$ | 0.85 | 0.39 | 0.49 | 0.40 |
| | $K_2O$ | 0.35 | 0.79 | 0.28 | 0.29 |
| | MgO | 1.08 | 0.68 | 0.85 | 0.85 |
| | CaO | 0.001 | 0.001 | 0.001 | 0.001 |
| | SrO | 0.00 | 0.00 | 0.00 | 0.00 |
| | BaO | 1.16 | 1.15 | 1.19 | 2.60 |
| | ZnO | 0.001 | 0.82 | 0.50 | 0.001 |
| | $TiO_2$ | 0.0092 | 0.0113 | 0.0321 | 0.0140 |
| | $SnO_2$ | 1.13 | 1.11 | 1.52 | 1.10 |
| | $ZrO_2$ | 2.58 | 2.55 | 2.49 | 2.57 |
| | $Fe_2O_3$ | 0.0080 | 0.0075 | 0.0083 | 0.0081 |
| | $Sb_2O_3$ | 0.00 | 0.00 | 0.00 | 0.00 |
| | $As_2O_3$ | 0.00 | 0.00 | 0.00 | 0.00 |
| Composition [ppm] | Pt | 0.09 | 0.01 | 0.07 | 0.05 |
| | Rh | 0.02 | 0.01 | 0.02 | 0.02 |
| | Pt + Rh | 0.11 | 0.02 | 0.09 | 0.07 |
| | Sn/(P + B + Zr + Ti + Sn) | 0.222 | 0.220 | 0.256 | 0.218 |
| | Al/(Zr + S) | 6.06 | 6.12 | 5.61 | 6.16 |
| | (Mg + Zn)/Li | 0.295 | 0.394 | 0.369 | 0.234 |
| | Sn/(Zr + Sn) | 0.30 | 0.30 | 0.38 | 0.30 |
| | (Si + Al)/Li | 23.96 | 22.91 | 23.77 | 24.02 |
| | (Si + Al)/Sn | 77.61 | 78.65 | 57.24 | 79.27 |
| | (Li + Na + K)/Zr | 1.88 | 1.96 | 1.78 | 1.68 |
| | Ti/Zr | 0.0036 | 0.0044 | 0.0129 | 0.0054 |
| | Ti/(Ti + Fe) | 0.536 | 0.601 | 0.795 | 0.633 |
| | Na + K + Ca + Sr + Ba | 2.36 | 2.33 | 1.96 | 3.29 |
| | (Mg + Ca + Sr + Ba)/Zr | 0.87 | 0.72 | 0.82 | 1.34 |
| | (Mg + Ca + Sr + Ba)/(Li + Na + K) | 0.46 | 0.37 | 0.46 | 0.80 |
| | Sb + As | 0.00 | 0.00 | 0.00 | 0.00 |

TABLE 17-continued

|  |  | No. 58 | No. 59 | No. 60 | No. 61 |
|---|---|---|---|---|---|
|  |  | Before crystallization |  |  |  |
| Transmittance [%] | 200 nm | Not measured | Not measured | Not measured | Not measured |
| 3 mm thickness | 250 nm | Not measured | Not measured | Not measured | Not measured |
|  | 300 nm | Not measured | Not measured | Not measured | Not measured |
|  | 325 nm | Not measured | Not measured | Not measured | Not measured |
|  | 350 nm | Not measured | Not measured | Not measured | Not measured |
|  | 380 nm | Not measured | Not measured | Not measured | Not measured |
|  | 800 nm | Not measured | Not measured | Not measured | Not measured |
|  | 1200 nm | Not measured | Not measured | Not measured | Not measured |
|  | L* | Not measured | Not measured | Not measured | Not measured |
|  | a* | Not measured | Not measured | Not measured | Not measured |
|  | b* | Not measured | Not measured | Not measured | Not measured |
| Low temperature | Strain point [° C.] | 671 | 673 | 672 | 678 |
| viscosity | Annealing point [° C.] | 730 | 732 | 734 | 735 |
|  | Glass transition point [° C.] | Not measured | Not measured | Not measured | Not measured |
| High temperature | 10^4[° C.] | Not measured | Not measured | Not measured | Not measured |
| viscosity | 10^3[° C.] | Not measured | Not measured | Not measured | Not measured |
|  | 10^2.5[° C.] | Not measured | Not measured | Not measured | Not measured |
|  | 10^2[° C.] | Not measured | Not measured | Not measured | Not measured |
| Liquidus temperature (° C.) |  | 1399 | 1390 | 1379 | 1402 |
| Liquidus viscosity [—] |  | Not measured | Not measured | Not measured | Not measured |
| $\alpha[\times 10^{-7}/° C.]$ | 30-380° C. | 43.0 | 43.3 | 42.4 | 41.7 |
| Density [g/cm3] |  | Not measured | Not measured | Not measured | Not measured |
| β-OH[/mm] |  | 0.13 | 0.13 | 0.13 | 0.13 |

TABLE 18

|  |  | No. 58 | No. 59 | No. 60 | No. 61 |
|---|---|---|---|---|---|
|  |  | After crystallization |  |  |  |
| Crystallization condition |  | 840° C.-5 h 920° C.-1 h | 855° C.-7 h 920° C.-1 h | 840° C.-3 h 920° C.-1.5 h | 840° C.-8 h 920° C.-1 h |
| Transmittance [%] | 200 nm | Not measured | Not measured | Not measured | Not measured |
| 3 mm thickness | 250 nm | Not measured | Not measured | Not measured | Not measured |
|  | 300 nm | Not measured | Not measured | Not measured | Not measured |
|  | 325 nm | Not measured | Not measured | Not measured | Not measured |
|  | 350 nm | Not measured | Not measured | Not measured | Not measured |
|  | 380 nm | Not measured | Not measured | Not measured | Not measured |
|  | 800 nm | Not measured | Not measured | Not measured | Not measured |
|  | 1200 nm | Not measured | Not measured | Not measured | Not measured |
|  | L* | Not measured | Not measured | Not measured | Not measured |
|  | a* | Not measured | Not measured | Not measured | Not measured |
|  | b* | Not measured | Not measured | Not measured | Not measured |
| Precipitated crystal |  | β-Q | β-Q | β-Q | β-Q |
| Average crystallite size [nm] |  | Not measured | Not measured | Not measured | Not measured |
| $\alpha[\times 10^{-7}/° C.]$ | 30-380° C. | Not measured | Not measured | Not measured | Not measured |
| $\alpha[\times 10^{-7}/° C.]$ | 30-750° C. | Not measured | Not measured | Not measured | Not measured |
| Density [g/cm3] |  | Not measured | Not measured | Not measured | Not measured |
| Young's Modulus [GPa] |  | Not measured | Not measured | Not measured | Not measured |
| Modulus of rigidity [GPa] |  | Not measured | Not measured | Not measured | Not measured |
| Poisson's ratio |  | Not measured | Not measured | Not measured | Not measured |
| Appearance |  | Colorless and transparent | Colorless and transparent | Colorless and transparent | Colorless and transparent |
| Rate of change before and after crystallization [%] |  |  |  |  |  |
| 200 nm |  | Not measured | Not measured | Not measured | Not measured |
| 250 nm |  | Not measured | Not measured | Not measured | Not measured |
| 300 nm |  | Not measured | Not measured | Not measured | Not measured |
| 325 nm |  | Not measured | Not measured | Not measured | Not measured |
| 350 nm |  | Not measured | Not measured | Not measured | Not measured |
| 380 nm |  | Not measured | Not measured | Not measured | Not measured |
| 800 nm |  | Not measured | Not measured | Not measured | Not measured |
| 1200 nm |  | Not measured | Not measured | Not measured | Not measured |

TABLE 19

| | | No. 62 | No. 63 | No. 64 | No. 65 | No 66 | No. 67 | No. 68 |
|---|---|---|---|---|---|---|---|---|
| Composition [wt %] | $SiO_2$ | 64.50 | 67.4 | 67.3 | 67.0 | 64.5 | 64.4 | 64.5 |
| | $Al_2O_3$ | 24.2 | 22.1 | 22.3 | 22.2 | 25.1 | 23.7 | 23.7 |
| | $B_2O_3$ | 0.00 | 0.00 | 0.00 | 0.00 | 0.00 | 0.00 | 0.00 |
| | $P_2O_5$ | 1.44 | 1.31 | 1.30 | 1.29 | 1.31 | 2.22 | 2.22 |
| | $Li_2O$ | 4.02 | 3.68 | 3.70 | 3.68 | 3.68 | 3.68 | 3.68 |
| | $Na_2O$ | 0.38 | 0.50 | 0.50 | 0.35 | 0.33 | 0.90 | 0.35 |
| | $K_2O$ | 0.00 | 0.00 | 0.00 | 0.00 | 0.00 | 0.00 | 0.00 |
| | $MgO$ | 1.34 | 1.23 | 1.14 | 1.22 | 1.22 | 1.22 | 1.22 |
| | $CaO$ | 0.018 | 0.017 | 0.018 | 0.014 | 0.015 | 0.014 | 0.014 |
| | $SrO$ | 0.00 | 0.00 | 0.00 | 0.00 | 0.00 | 0.00 | 0.00 |
| | $BaO$ | 0.00 | 0.00 | 0.00 | 0.58 | 0.00 | 0.00 | 0.58 |
| | $ZnO$ | 0.00 | 0.00 | 0.00 | 0.00 | 0.00 | 0.00 | 0.00 |
| | $TiO_2$ | 0.0100 | 0.0100 | 0.0100 | 0.0100 | 0.0100 | 0.0100 | 0.0100 |
| | $SnO_2$ | 1.23 | 1.12 | 1.08 | 1.07 | 1.13 | 1.14 | 1.13 |
| | $ZrO_2$ | 2.88 | 2.65 | 2.66 | 2.60 | 2.62 | 2.62 | 2.61 |
| | $Fe_2O_3$ | 0.0060 | 0.0060 | 0.0060 | 0.0040 | 0.0060 | 0.0060 | 0.0040 |
| | $Sb_2O_3$ | 0.00 | 0.00 | 0.00 | 0.00 | 0.00 | 0.00 | 0.00 |
| | $As_2O_3$ | 0.00 | 0.00 | 0.00 | 0.00 | 0.00 | 0.00 | 0.00 |
| Composition [ppm] | Pt | 1.50 | 1.50 | 1.50 | 1.50 | 1.50 | 1.50 | 1.50 |
| | RF | 0.02 | 0.02 | 0.02 | 0.02 | 0.02 | 0.02 | 0.02 |
| | Pt + Rh | 1.52 | 1.52 | 1.52 | 1.52 | 1.52 | 1.52 | 1.52 |
| Sn/(P + B + Zr + Ti + Sn) | | 0.221 | 0.220 | 0.214 | 0.215 | 0.223 | 0.190 | 0.189 |
| Al/(Zr + Sn) | | 5.89 | 5.86 | 5.96 | 6.05 | 6.69 | 6.30 | 6.34 |
| (Mg + Zn)/Li | | 0.333 | 0.334 | 0.308 | 0.332 | 0.332 | 0.332 | 0.332 |
| Sn/(Zr + Sn) | | 0.30 | 0.30 | 0.29 | 0.29 | 0.30 | 0.30 | 0.30 |
| (Si + Al)/Li | | 22.06 | 24.32 | 24.22 | 24.24 | 24.35 | 23.94 | 23.97 |
| (Si + Al)/Sn | | 72.11 | 79.91 | 82.96 | 83.36 | 79.29 | 77.28 | 78.05 |
| (Li + Na + K)/Zr | | 1.53 | 1.58 | 1.58 | 1.55 | 1.53 | 1.75 | 1.54 |
| Ti/Zr | | 0.0035 | 0.0038 | 0.0038 | 0.0038 | 0.0038 | 0.0038 | 0.0038 |
| Ti/(Ti + Fe) | | 0.625 | 0.625 | 0.625 | 0.714 | 0.625 | 0.625 | 0.714 |
| Na + K + Ca + Sr + Ba | | 1.74 | 1.75 | 1.66 | 2.16 | 1.57 | 2.13 | 2.16 |
| (Mg + Ca + Sr + Ba)/Zr | | 0.47 | 0.47 | 0.44 | 0.70 | 0.47 | 0.47 | 0.70 |
| (Mg + Ca + Sr + Ba)/(Li + Na + K) | | 0.31 | 0.30 | 0.28 | 0.45 | 0.31 | 0.27 | 0.45 |
| Sb + As | | 0.00 | 0.00 | 0.00 | 0.00 | 0.00 | 0.00 | 0.00 |
| | | | | Before crystallization | | | | |
| Transmittance [%] 3 mm thickness | 200 nm | Not measured | Not measured | Not measured | 78.7 | 78.7 | 77.2 | 81.2 |
| | 250 nm | Not measured | Not measured | Not measured | 23.6 | 23.0 | 23.0 | 23.9 |
| | 300 nm | Not measured | Not measured | Not measured | 38.7 | 33.6 | 35.8 | 37.1 |
| | 325 nm | Not measured | Not measured | Not measured | 72.5 | 69.1 | 71.0 | 72.9 |
| | 350 nm | Not measured | Not measured | Not measured | 85.1 | 83.9 | 84.9 | 85.7 |
| | 380 nm | Not measured | Not measured | Not measured | 89.0 | 88.6 | 89.2 | 89.4 |
| | 800 nm | Not measured | Not measured | Not measured | 91.4 | 91.1 | 91.4 | 91.5 |
| | 1200 nm | Not measured | Not measured | Not measured | 91.6 | 91.1 | 91.3 | 91.6 |
| | L* | 96.6 | 96.6 | 96.7 | 96.4 | 96.3 | 96.5 | 96.5 |
| | a* | 0.0 | 0.0 | 0.0 | 0.0 | 0.0 | 0.0 | 0.0 |
| | b* | 0.4 | 0.3 | 0.3 | 0.5 | 0.5 | 0.4 | 0.4 |
| Low temperature viscosity | Strain point [° C.] | Not measured | Not measured | Not measured | Not measured | Not measured | Not measured | Not measured |
| | Annealing point [° C.] | Not measured | Not measured | Not measured | Not measured | Not measured | Not measured | Not measured |
| | Glass transition point [° C.] | Not measured | Not measured | Not measured | 741 | 738 | 732 | 736 |
| High temperature viscosity | 10^4[° C.] | Not measured | Not measured | Not measured | 1352 | 1325 | 1330 | 1334 |
| | 10^3[° C.] | Not measured | Not measured | Not measured | 1534 | 1500 | 1508 | 1512 |
| | 10^2.5[° C.] | Not measured | Not measured | Not measured | 1650 | 1611 | 1619 | 1622 |
| | 10^2[° C.] | Not measured | Not measured | Not measured | 1793 | 1743 | 1749 | 1751 |
| | Liquidus temperature (° C.) | Not measured | Not measured | Not measured | Not measured | Not measured | Not measured | Not measured |

TABLE 19-continued

|  |  | No. 62 | No. 63 | No. 64 | No. 65 | No 66 | No. 67 | No. 68 |
|---|---|---|---|---|---|---|---|---|
| Liquidus viscosity [—] |  | Not measured | Not measured | Not measured | Not measured | Not measured | Not measured | Not measured |
| $\alpha[\times10^{-7}/^{\circ}$ C.] | 30-380° C. | Not measured | Not measured | Not measured | 38.8 | 38.0 | 40.9 | 38.3 |
| Density [g/cm3] |  | 2.447 | 2.425 | 2.425 | 2.437 | 2.447 | 2.438 | 2.446 |
| β-OH[/mm] |  | 0.13 | 0.17 | 0.09 | 0.11 | 0.12 | 0.12 | 0.21 |

TABLE 20

|  |  | No. 62 | No. 63 | No. 64 | No. 65 | No. 66 | No. 67 | No. 68 |
|---|---|---|---|---|---|---|---|---|
|  |  | After crystallization | | | | | | |
| Crystallization condition |  | 780° C.- 3 h 890° C.- 1 h | 780° C.- 3 h 890° C.- 1 h | 780° C.- 3 h 920° C.- 1 h | 780° C.- 3 h 890° C.- 1 h | 810° C.- 3 h 890° C.- 1 h | 780° C.- 3 h 920° C.- 1 h | 780° C.- 3 h 920° C.- 1 h |
| Transmittance [%] 3 mm thickness | 200 nm | Not measured | Not measured | Not measured | Not measured | Not measured | 49.8 | Not measured |
|  | 250 nm | Not measured | Not measured | Not measured | Not measured | Not measured | 20.8 | Not measured |
|  | 300 nm | Not measured | Not measured | Not measured | Not measured | Not measured | 19.6 | Not measured |
|  | 325 nm | Not measured | Not measured | Not measured | Not measured | Not measured | 40.5 | Not measured |
|  | 350 nm | Not measured | Not measured | Not measured | Not measured | Not measured | 52.8 | Not measured |
|  | 380 nm | Not measured | Not measured | Not measured | Not measured | Not measured | 60.6 | Not measured |
|  | 800 nm | Not measured | Not measured | Not measured | Not measured | Not measured | 88.3 | Not measured |
|  | 1200 nm | Not measured | Not measured | Not measured | Not measured | Not measured | 90.4 | Not measured |
| L* |  | Not measured | Not measured | Not measured | Not measured | Not measured | 94.5 | Not measured |
| a* |  | Not measured | Not measured | Not measured | Not measured | Not measured | 0.4 | Not measured |
| b* |  | Not measured | Not measured | Not measured | Not measured | Not measured | 6.8 | Not measured |
| Precipitated crystal |  | β-Q | β-Q | β-Q | β-Q | β-Q | β-Q | β-Q |
| Average crystallite size [nm] |  | Not measured | Not measured | Not measured | Not measured | Not measured | Not measured | Not measured |
| $\alpha[\times10^{-7}/^{\circ}$ C.] | 30-380° C. | −1.5 | −1.1 | −2.1 | Not measured | Not measured | Not measured | Not measured |
| $\alpha[\times10^{-7}/^{\circ}$ C.] | 30-750° C. | −0.3 | −0.3 | −1.4 | Not measured | Not measured | Not measured | Not measured |
| Density [g/cm3] |  | 2.514 | 2.507 | 2.508 | 2.519 | 2.514 | 2.499 | 2.520 |
| Young's Modulus [GPa] |  | Not measured | Not measured | Not measured | Not measured | Not measured | Not measured | Not measured |
| Modulus of rigidity [GPa] |  | Not measured | Not measured | Not measured | Not measured | Not measured | Not measured | Not measured |
| Poisson's ratio |  | Not measured | Not measured | Not measured | Not measured | Not measured | Not measured | Not measured |
| Appearance |  | Colorless and transparent | Colorless and transparent | Colorless and transparent | Colorless and transparent | Colorless and transparent | Colorless and transparent | Colorless and transparent |
|  |  | Rate of change before and after crystallization [%] | | | | | | |
| 200 nm |  | Not measured | Not measured | Not measured | Not measured | Not measured | 35.4 | Not measured |
| 250 nm |  | Not measured | Not measured | Not measured | Not measured | Not measured | 9.4 | Not measured |
| 300 nm |  | Not measured | Not measured | Not measured | Not measured | Not measured | 45.2 | Not measured |
| 325 nm |  | Not measured | Not measured | Not measured | Not measured | Not measured | 43.0 | Not measured |
| 350 nm |  | Not measured | Not measured | Not measured | Not measured | Not measured | 37.8 | Not measured |

TABLE 20-continued

|         | No. 62 | No. 63 | No. 64 | No. 65 | No. 66 | No. 67 | No. 68 |
|---------|--------|--------|--------|--------|--------|--------|--------|
| 380 nm  | Not measured | Not measured | Not measured | Not measured | Not measured | 32.1 | Not measured |
| 800 nm  | Not measured | Not measured | Not measured | Not measured | Not measured | 3.3 | Not measured |
| 1200 nm | Not measured | Not measured | Not measured | Not measured | Not measured | 1.1 | Not measured |

TABLE 21

|  |  | No. 69 | No. 70 | No. 71 | No. 72 | No. 73 | No. 74 | No. 75 |
|---|---|--------|--------|--------|--------|--------|--------|--------|
| Composition [wt %] | $SiO_2$ | 64.50 | 64.6 | 64.5 | 65.9 | 67.2 | 67.5 | 64.7 |
|  | $Al_2O_3$ | 23.7 | 24.6 | 24.6 | 22.2 | 22.2 | 22.2 | 23.6 |
|  | $B_2O_3$ | 0.00 | 0.00 | 0.00 | 0.00 | 0.00 | 0.00 | 0.00 |
|  | $P_2O_5$ | 2.23 | 1.91 | 2.84 | 1.31 | 0.00 | 0.00 | 1.31 |
|  | $Li_2O$ | 3.68 | 3.68 | 3.68 | 3.68 | 3.68 | 3.68 | 3.68 |
|  | $Na_2O$ | 0.34 | 0.35 | 0.35 | 0.33 | 0.33 | 0.07 | 0.08 |
|  | $K_2O$ | 0.58 | 0.00 | 0.00 | 0.00 | 0.00 | 0.00 | 0.00 |
|  | MgO | 1.23 | 1.22 | 0.37 | 2.83 | 2.83 | 2.83 | 2.84 |
|  | CaO | 0.014 | 0.014 | 0.009 | 0.024 | 0.023 | 0.023 | 0.024 |
|  | SrO | 0.00 | 0.00 | 0.00 | 0.00 | 0.00 | 0.00 | 0.00 |
|  | BaO | 0.00 | 0.00 | 0.00 | 0.00 | 0.00 | 0.00 | 0.00 |
|  | ZnO | 0.00 | 0.00 | 0.00 | 0.00 | 0.00 | 0.00 | 0.00 |
|  | $TiO_2$ | 0.0100 | 0.0100 | 0.0100 | 0.0100 | 0.0100 | 0.0100 | 0.0100 |
|  | $SnO_2$ | 1.17 | 1.13 | 1.15 | 1.17 | 1.17 | 1.15 | 1.17 |
|  | $ZrO_2$ | 2.59 | 2.60 | 2.61 | 2.60 | 2.60 | 2.59 | 2.61 |
|  | $Fe_2O_3$ | 0.0040 | 0.0050 | 0.0050 | 0.0050 | 0.0050 | 0.0050 | 0.0050 |
|  | $Sb_2O_3$ | 0.00 | 0.00 | 0.00 | 0.00 | 0.00 | 0.00 | 0.00 |
|  | $As_2O_3$ | 0.00 | 0.00 | 0.00 | 0.00 | 0.00 | 0.00 | 0.00 |
| Composition [ppm] | Pt | 1.50 | 1.50 | 1.50 | 1.50 | 1.50 | 1.50 | 1.50 |
|  | RF | 0.02 | 0.02 | 0.02 | 0.02 | 0.02 | 0.02 | 0.02 |
|  | Pt + Rh | 1.52 | 1.52 | 1.52 | 1.52 | 1.52 | 1.52 | 1.52 |
|  | Sn/(P + B + Zr + Ti + Sn) | 0.195 | 0.200 | 0.17 | 0.230 | 0.310 | 0.307 | 0.229 |
|  | Al/(Zr + Sn) | 6.30 | 6.60 | 6.54 | 5.89 | 5.89 | 5.94 | 6.24 |
|  | (Mg + Zn)/Li | 0.334 | 0.332 | 0.101 | 0.769 | 0.769 | 0.769 | 0.772 |
|  | Sn/(Zr + Sn) | 0.31 | 0.30 | 0.31 | 0.31 | 0.31 | 0.31 | 0.31 |
|  | (Si + Al)/Li | 23.97 | 24.24 | 24.21 | 23.94 | 24.29 | 24.38 | 23.99 |
|  | (Si + Al)/Sn | 75.38 | 78.94 | 77.48 | 75.30 | 76.41 | 78.00 | 75.47 |
|  | (Li + Na + K)/Zr | 1.78 | 1.55 | 1.54 | 1.54 | 1.54 | 1.45 | 1.44 |
|  | Ti/Zr | 0.0039 | 0.0038 | 0.0038 | 0.0038 | 0.0038 | 0.0039 | 0.0038 |
|  | Ti/(Ti + Fe) | 0.714 | 0.667 | 0.667 | 0.667 | 0.667 | 0.667 | 0.667 |
|  | Na + K + Ca + Sr + Ba | 2.16 | 1.58 | 0.73 | 3.18 | 3.18 | 2.92 | 2.94 |
|  | (Mg + Ca + Sr + Ba)/Zr | 0.48 | 0.47 | 0.15 | 1.10 | 1.10 | 1.10 | 1.10 |
|  | (Mg + Ca + Sr + Ba)/(Li + Na + K) | 0.27 | 0.31 | 0.09 | 0.71 | 0.71 | 0.76 | 0.76 |
|  | Sb + As | 0.00 | 0.00 | 0.00 | 0.00 | 0.00 | 0.00 | 0.00 |
|  | | | | Before crystallization | | | | |
| Transmittance [%] 3 mm thickness | 200 nm | 72.4 | 73.9 | 82.2 | 76.4 | 75.4 | 77.1 | 76.6 |
|  | 250 nm | 23.1 | 23.5 | 24.1 | 23.7 | 23.4 | 24.0 | 23.8 |
|  | 300 nm | 38.6 | 37.1 | 34.5 | 37.2 | 35.7 | 34.5 | 36.2 |
|  | 325 nm | 73.8 | 73.5 | 71.9 | 72.0 | 70.7 | 70.1 | 71.0 |
|  | 350 nm | 86.5 | 86.6 | 86.1 | 85.2 | 84.8 | 84.5 | 84.6 |
|  | 380 nm | 90.0 | 90.1 | 89.9 | 89.1 | 89.2 | 88.7 | 88.7 |
|  | 800 nm | 91.6 | 91.7 | 91.7 | 91.1 | 91.3 | 90.9 | 90.9 |
|  | 1200 nm | 91.8 | 91.7 | 91.8 | 91.4 | 91.4 | 91.2 | 91.1 |
|  | L* | 96.6 | 96.7 | 96.6 | 96.3 | 96.5 | 96.3 | 96.2 |
|  | a* | 0.0 | 0.0 | 0.0 | 0.0 | −0.1 | 0.0 | 0.0 |
|  | b* | 0.3 | 0.3 | 0.3 | 0.4 | 0.4 | 0.5 | 0.5 |
| Low temperature viscosity | Strain point [° C.] | Not measured | Not measured | Not measured | Not measured | Not measured | Not measured | Not measured |
|  | Annealing point [° C.] | Not measured | Not measured | Not measured | Not measured | Not measured | Not measured | Not measured |
|  | Glass transition point [° C.] | 732 | 739 | 750 | Not measured | Not measured | Not measured | Not measured |
| High temperature viscosity | 10^4[° C.] | 1334 | 1327 | 1350 | Not measured | 1309 | Not measured | Not measured |
|  | 10^3[° C.] | 1512 | 1502 | 1528 | Not measured | 1488 | Not measured | Not measured |

TABLE 21-continued

|  | No. 69 | No. 70 | No. 71 | No. 72 | No. 73 | No. 74 | No. 75 |
|---|---|---|---|---|---|---|---|
| $10^{2.5}$[° C.] | 1624 | 1612 | 1639 | Not measured | 1602 | Not measured | Not measured |
| $10^2$[° C.] | 1756 | 1741 | 1770 | Not measured | 1739 | Not measured | Not measured |
| Liquidus temperature (° C.) | Not measured | Not measured | Not measured | Not measured | Not measured | Not measured | Not measured |
| Liquidus viscosity [—] | Not measured | Not measured | Not measured | Not measured | Not measured | Not measured | Not measured |
| $\alpha[\times10^{-7}/°$ C.] 30-380° C. | 40.5 | 38.2 | 37.4 | Not measured | Not measured | Not measured | Not measured |
| Density [g/cm3] | 2.437 | 2.442 | 2.423 | 2.450 | 2.451 | 2.450 | 2.458 |
| β-OH[/mm] | 0.23 | 0.29 | 0.05 | 0.18 | 0.40 | 0.71 | 0.94 |

TABLE 22

|  | No. 69 | No. 70 | No. 71 | No. 72 | No. 73 | No. 74 | No. 75 |
|---|---|---|---|---|---|---|---|
| After crystallization | | | | | | | |
| Crystallization condition | 780° C.-3 h 920° C.-1 h | 780° C.-3 h 920° C.-1 h | 810° C.-3 h 890° C.-1 h | 810° C.-3 h 890° C.-1 h | 780° C.-3 h 920° C.-1 h | 780° C.-3 h 860° C.-1 h | 810° C.-3 h 920° C.-1 h |
| Transmittance [%] 3 mm thickness 200 nm | 48.6 | Not measured | 73.0 | Not measured | Not measured | Not measured | Not measured |
| 250 nm | 20.1 | Not measured | 30.3 | Not measured | Not measured | Not measured | Not measured |
| 300 nm | 21.6 | Not measured | 20.1 | Not measured | Not measured | Not measured | Not measured |
| 325 nm | 45.6 | Not measured | 32.0 | Not measured | Not measured | Not measured | Not measured |
| 350 nm | 58.1 | Not measured | 42.3 | Not measured | Not measured | Not measured | Not measured |
| 380 nm | 65.2 | Not measured | 48.6 | Not measured | Not measured | Not measured | Not measured |
| 800 nm | 88.7 | Not measured | 76.6 | Not measured | Not measured | Not measured | Not measured |
| 1200 nm | 90.7 | Not measured | 86.6 | Not measured | Not measured | Not measured | Not measured |
| L* | 92.5 | Not measured | 83.3 | Not measured | Not measured | Not measured | Not measured |
| a* | −0.2 | Not measured | 1.4 | Not measured | Not measured | Not measured | Not measured |
| b* | 5.6 | Not measured | 7.1 | Not measured | Not measured | Not measured | Not measured |
| Precipitated crystal | β-Q | β-Q | β-Q | β-Q | β-Q | β-Q | β-Q |
| Average crystallite size [nm] | Not measured | Not measured | Not measured | Not measured | Not measured | Not measured | Not measured |
| $\alpha[\times10^{-7}/°$ C.] 30-380° C. | Not measured | Not measured | Not measured | Not measured | Not measured | Not measured | Not measured |
| $\alpha[\times10^{-7}/°$ C.] 30-750° C. | Not measured | Not measured | Not measured | Not measured | Not measured | Not measured | Not measured |
| Density [g/cm3] | 2.498 | 2.522 | 2.499 | 2.514 | 2.526 | 2.519 | 2.510 |
| Young's Modulus [GPa] | Not measured | Not measured | Not measured | Not measured | Not measured | Not measured | Not measured |
| Modulus of rigidity [GPa] | Not measured | Not measured | Not measured | Not measured | Not measured | Not measured | Not measured |
| Poisson's ratio | Not measured | Not measured | Not measured | Not measured | Not measured | Not measured | Not measured |
| Appearance | Colorless and transparent | Colorless and transparent | Colorless and transparent | Colorless and transparent | Colorless and transparent | Colorless and transparent | Colorless and transparent |
| Rate of change before and after crystallization [%] | | | | | | | |
| 200 nm | Not measured | Not measured | Not measured | Not measured | Not measured | 35.4 | Not measured |
| 250 nm | Not measured | Not measured | Not measured | Not measured | Not measured | 9.4 | Not measured |

TABLE 22-continued

| | No. 69 | No. 70 | No. 71 | No. 72 | No. 73 | No. 74 | No. 75 |
|---|---|---|---|---|---|---|---|
| 300 nm | Not measured | Not measured | Not measured | Not measured | Not measured | 45.2 | Not measured |
| 325 nm | Not measured | Not measured | Not measured | Not measured | Not measured | 43.0 | Not measured |
| 350 nm | Not measured | Not measured | Not measured | Not measured | Not measured | 37.8 | Not measured |
| 380 nm | Not measured | Not measured | Not measured | Not measured | Not measured | 32.1 | Not measured |
| 800 nm | Not measured | Not measured | Not measured | Not measured | Not measured | 3.3 | Not measured |
| 1200 nm | Not measured | Not measured | Not measured | Not measured | Not measured | 1.1 | Not measured |

TABLE 23

| | | No. 76 | No. 77 | No. 78 | No. 79 | No. 80 | No. 81 | No. 82 |
|---|---|---|---|---|---|---|---|---|
| Composition [wt %] | $SiO_2$ | 64.30 | 64.4 | 64.4 | 64.5 | 67.4 | 68.1 | 68.5 |
| | $Al_2O_3$ | 23.7 | 23.6 | 23.7 | 24.5 | 22.2 | 22.2 | 22.2 |
| | $B_2O_3$ | 0.00 | 0.00 | 0.00 | 0.00 | 0.00 | 0.00 | 0.00 |
| | $P_2O_5$ | 1.81 | 1.31 | 0.81 | 1.30 | 1.35 | 0.81 | 0.40 |
| | $Li_2O$ | 3.68 | 3.68 | 3.68 | 3.68 | 3.65 | 3.66 | 3.68 |
| | $Na_2O$ | 0.36 | 0.36 | 0.36 | 0.35 | 0.35 | 0.35 | 0.35 |
| | $K_2O$ | 0.00 | 0.00 | 0.00 | 0.00 | 0.00 | 0.00 | 0.00 |
| | MgO | 1.23 | 1.22 | 1.22 | 1.23 | 1.22 | 1.23 | 1.23 |
| | CaO | 0.014 | 0.014 | 0.014 | 0.020 | 0.019 | 0.020 | 0.020 |
| | SrO | 0.00 | 0.00 | 0.00 | 0.00 | 0.00 | 0.00 | 0.00 |
| | BaO | 0.98 | 1.46 | 1.95 | 0.00 | 0.00 | 0.00 | 0.00 |
| | ZnO | 0.000 | 0.000 | 0.000 | 0.000 | 0.00 | 0.00 | 0.00 |
| | $TiO_2$ | 0.0100 | 0.0100 | 0.0100 | 0.0100 | 0.0100 | 0.0100 | 0.0100 |
| | $SnO_2$ | 1.14 | 1.15 | 1.19 | 1.12 | 1.15 | 1.13 | 1.15 |
| | $ZrO_2$ | 2.61 | 2.62 | 2.60 | 2.61 | 2.76 | 2.58 | 2.56 |
| | $Fe_2O_3$ | 0.0050 | 0.0050 | 0.0040 | 0.0050 | 0.0040 | 0.0040 | 0.0050 |
| | $Sb_2O_3$ | 0.00 | 0.00 | 0.00 | 0.00 | 0.00 | 0.00 | 0.00 |
| | $As_2O_3$ | 0.00 | 0.00 | 0.00 | 0.00 | 0.00 | 0.00 | 0.00 |
| Composition [ppm] | Pt | 1.50 | 1.50 | 1.50 | 1.50 | 1.50 | 1.50 | 1.50 |
| | RF | 0.02 | 0.02 | 0.02 | 0.02 | 0.02 | 0.02 | 0.02 |
| | Pt + Rh | 1.52 | 1.52 | 1.52 | 1.52 | 1.52 | 1.52 | 1.52 |
| | Sn/(P + B + Zr + Ti + Sn) | 0.205 | 0.226 | 0.258 | 0.222 | 0.218 | 0.249 | 0.279 |
| | Al/(Zr + Sn) | 6.32 | 6.26 | 6.25 | 6.57 | 5.68 | 5.98 | 5.98 |
| | (Mg + Zn)/Li | 0.334 | 0.332 | 0.332 | 0.334 | 0.334 | 0.336 | 0.334 |
| | Sn/(Zr + Sn) | 0.30 | 0.31 | 0.31 | 0.30 | 0.29 | 0.30 | 0.31 |
| | (Si + Al)/Li | 23.91 | 23.91 | 23.94 | 24.18 | 24.55 | 24.67 | 24.65 |
| | (Si + Al)/Sn | 77.19 | 76.52 | 74.03 | 79.46 | 77.91 | 79.91 | 78.87 |
| | (Li + Na + K)/Zr | 1.55 | 1.54 | 1.55 | 1.54 | 1.45 | 1.55 | 1.57 |
| | Ti/Zr | 0.0038 | 0.0038 | 0.0038 | 0.0038 | 0.0036 | 0.0039 | 0.0039 |
| | Ti/(Ti + Fe) | 0.667 | 0.667 | 0.714 | 0.667 | 0.714 | 0.714 | 0.667 |
| | Na + K + Ca + Sr + Ba | 2.58 | 3.05 | 3.54 | 1.60 | 1.59 | 1.60 | 1.60 |
| | (Mg + Ca + Sr + Ba)/Zr | 0.85 | 1.03 | 1.22 | 0.48 | 0.45 | 0.48 | 0.49 |
| | (Mg + Ca + Sr + Ba)/(Li + Na + K) | 0.55 | 0.67 | 0.79 | 0.31 | 0.31 | 0.31 | 0.31 |
| | Sb + As | 0.00 | 0.00 | 0.00 | 0.00 | 0.00 | 0.00 | 0.00 |
| | | | | Before crystallization | | | | |
| Transmittance [%] 3 mm thickness | 200 nm | 80.8 | 74.6 | 74.7 | 84.9 | 83.4 | 83.7 | 81.2 |
| | 250 nm | 23.5 | 23.1 | 23.1 | 24.5 | 24.1 | 24.4 | 23.9 |
| | 300 nm | 38.5 | 37.3 | 35.9 | 37.2 | 36.2 | 37.0 | 34.6 |
| | 325 nm | 73.7 | 72.9 | 72.3 | 72.6 | 71.8 | 73.2 | 71.4 |
| | 350 nm | 86.4 | 86.1 | 85.9 | 85.7 | 85.5 | 86.4 | 85.7 |
| | 380 nm | 90.0 | 89.9 | 89.8 | 89.6 | 89.6 | 90.2 | 89.8 |
| | 800 nm | 91.7 | 91.7 | 91.6 | 91.5 | 91.7 | 91.8 | 91.6 |
| | 1200 nm | 91.6 | 91.7 | 91.6 | 91.5 | 91.6 | 91.7 | 91.6 |
| | L* | 96.5 | 96.6 | 96.5 | 96.5 | 96.6 | 96.7 | 96.6 |
| | a* | −0.1 | −0.1 | −0.1 | 0.0 | 0.0 | 0.0 | 0.0 |
| | b* | 0.3 | 0.4 | 0.4 | 0.4 | 0.4 | 0.3 | 0.3 |

TABLE 23-continued

| | | No. 76 | No. 77 | No. 78 | No. 79 | No. 80 | No. 81 | No. 82 |
|---|---|---|---|---|---|---|---|---|
| Low temperature viscosity | Strain point [° C.] | Not measured | Not measured | Not measured | Not measured | Not measured | Not measured | Not measured |
| | Annealing point [° C.] | Not measured | Not measured | Not measured | Not measured | Not measured | Not measured | Not measured |
| | Glass transition point [° C.] | Not measured | Not measured | Not measured | Not measured | 738 | Not measured | Not measured |
| High temperature viscosity | $10^4$[° C.] | Not measured | Not measured | Not measured | Not measured | 1354 | 1353 | Not measured |
| | $10^3$[° C.] | Not measured | Not measured | Not measured | Not measured | 1538 | 1536 | Not measured |
| | $10^{2.5}$[° C.] | Not measured | Not measured | Not measured | Not measured | 1652 | 1653 | Not measured |
| | $10^2$[° C.] | Not measured | Not measured | Not measured | Not measured | 1782 | 1792 | Not measured |
| | Liquidus temperature (° C.) | Not measured | Not measured | Not measured | Not measured | 1416 | 1399 | 1413 |
| | Liquidus viscosity [—] | Not measured | Not measured | Not measured | Not measured | 3.6 | 3.7 | Not measured |
| $\alpha[\times 10^{-7}/° C.]$ | 30-380° C. | Not measured | Not measured | Not measured | Not measured | 38.8 | Not measured | Not measured |
| | Density [g/cm3] | 2.455 | 2.464 | 2.476 | 2.454 | 2.428 | 2.427 | 2.427 |
| | β-OH[/mm] | 0.65 | 0.30 | 0.26 | 0.44 | 0.03 | 0.58 | 0.20 |

TABLE 24

| | | No. 76 | No. 77 | No. 78 | No. 79 | No. 80 | No. 81 | No. 82 |
|---|---|---|---|---|---|---|---|---|
| | | After crystallization | | | | | | |
| | Crystallization condition | 780° C.-3 h 860° C.-1 h | 810° C.-3 h 920° C.-1 h | 765° C.-3 h 860° C.-1 h | 780° C.-3 h 890° C.-1 h | 780° C.-3 h 890° C.-1 h | 780° C.-3 h 890° C.-1 h | 780° C.-3 h 890° C.-1 h |
| Transmittance [%] 3 mm thickness | 200 nm | Not measured | Not measured | Not measured | Not measured | Not measured | Not measured | Not measured |
| | 250 nm | Not measured | Not measured | Not measured | Not measured | Not measured | Not measured | Not measured |
| | 300 nm | Not measured | Not measured | Not measured | Not measured | Not measured | Not measured | Not measured |
| | 325 nm | Not measured | Not measured | Not measured | Not measured | Not measured | Not measured | Not measured |
| | 350 nm | Not measured | Not measured | Not measured | Not measured | Not measured | Not measured | Not measured |
| | 380 nm | Not measured | Not measured | Not measured | Not measured | Not measured | Not measured | Not measured |
| | 800 nm | Not measured | Not measured | Not measured | Not measured | Not measured | Not measured | Not measured |
| | 1200 nm | Not measured | Not measured | Not measured | Not measured | Not measured | Not measured | Not measured |
| | L* | Not measured | Not measured | Not measured | Not measured | Not measured | Not measured | Not measured |
| | a* | Not measured | Not measured | Not measured | Not measured | Not measured | Not measured | Not measured |
| | b* | Not measured | Not measured | Not measured | Not measured | Not measured | Not measured | Not measured |
| | Precipitated crystal | β-Q | β-Q | β-Q | β-Q | β-Q | β-Q | β-Q |
| | Average crystallite size [nm] | Not measured | Not measured | Not measured | Not measured | Not measured | Not measured | Not measured |
| $\alpha[\times 10^{-7}/° C.]$ | 30-380° C. | Not measured | Not measured | Not measured | Not measured | Not measured | Not measured | −2.5 |
| $\alpha[\times 10^{-7}/° C.]$ | 30-750° C. | Not measured | Not measured | Not measured | Not measured | Not measured | Not measured | −1.8 |
| | Density [g/cm3] | 2.519 | 2.510 | 2.530 | 2.530 | 2.536 | 2.520 | 2.515 |
| | Young's Modulus [GPa] | Not measured | Not measured | Not measured | Not measured | Not measured | Not measured | Not measured |

TABLE 24-continued

| | No. 76 | No. 77 | No. 78 | No. 79 | No. 80 | No. 81 | No. 82 |
|---|---|---|---|---|---|---|---|
| Modulus of rigidity [GPa] | Not measured | Not measured | Not measured | Not measured | Not measured | Not measured | Not measured |
| Poisson's ratio | Not measured | Not measured | Not measured | Not measured | Not measured | Not measured | Not measured |
| Appearance | Colorless and transparent | Colorless and transparent | Colorless and transparent | Colorless and transparent | Colorless and transparent | Colorless and transparent | Colorless and transparent |
| Rate of change before and after crystallization [%] | | | | | | | |
| 200 nm | Not measured | Not measured | Not measured | Not measured | Not measured | Not measured | Not measured |
| 250 nm | Not measured | Not measured | Not measured | Not measured | Not measured | Not measured | Not measured |
| 300 nm | Not measured | Not measured | Not measured | Not measured | Not measured | Not measured | Not measured |
| 325 nm | Not measured | Not measured | Not measured | Not measured | Not measured | Not measured | Not measured |
| 350 nm | Not measured | Not measured | Not measured | Not measured | Not measured | Not measured | Not measured |
| 380 nm | Not measured | Not measured | Not measured | Not measured | Not measured | Not measured | Not measured |
| 800 nm | Not measured | Not measured | Not measured | Not measured | Not measured | Not measured | Not measured |
| 1200 nm | Not measured | Not measured | Not measured | Not measured | Not measured | Not measured | Not measured |

TABLE 25

| | | No. 83 | No. 84 | No. 85 | No. 86 | No. 87 | No. 88 | No. 89 |
|---|---|---|---|---|---|---|---|---|
| Composition [wt %] | $SiO_2$ | 68.9 | 65.7 | 66.1 | 66.5 | 65.2 | 67.9 | 67.9 |
| | $Al_2O_3$ | 22.2 | 24.5 | 24.5 | 24.5 | 24.5 | 22.3 | 22.3 |
| | $B_2O_3$ | 0.00 | 0.00 | 0.00 | 0.00 | 0.00 | 0.00 | 0.00 |
| | $P_2O_5$ | 0.00 | 0.81 | 0.40 | 0.00 | 1.31 | 0.40 | 0.40 |
| | $Li_2O$ | 3.68 | 3.68 | 3.68 | 3.68 | 3.68 | 3.68 | 3.68 |
| | $Na_2O$ | 0.35 | 0.36 | 0.35 | 0.36 | 0.39 | 0.67 | 0.67 |
| | $K_2O$ | 0.00 | 0.00 | 0.00 | 0.00 | 0.00 | 0.01 | 0.01 |
| | MgO | 1.22 | 1.22 | 1.23 | 1.23 | 1.23 | 1.25 | 1.25 |
| | CaO | 0.020 | 0.020 | 0.020 | 0.020 | 0.020 | 0.024 | 0.024 |
| | SrO | 0.00 | 0.00 | 0.00 | 0.00 | 0.00 | 0.00 | 0.00 |
| | BaO | 0.00 | 0.00 | 0.00 | 0.00 | 0.00 | 0.00 | 0.00 |
| | ZnO | 0.00 | 0.00 | 0.00 | 0.00 | 0.00 | 0.00 | 0.00 |
| | $TiO_2$ | 0.0100 | 0.0100 | 0.0100 | 0.0100 | 0.0100 | 0.0080 | 0.0200 |
| | $SnO_2$ | 1.17 | 1.16 | 1.18 | 1.14 | 1.11 | 1.13 | 1.13 |
| | $ZrO_2$ | 2.56 | 2.59 | 2.59 | 2.58 | 2.59 | 2.62 | 2.62 |
| | $Fe_2O_3$ | 0.0050 | 0.0050 | 0.0050 | 0.0050 | 0.0050 | 0.0050 | 0.0090 |
| | $Sb_2O_3$ | 0.00 | 0.00 | 0.00 | 0.00 | 0.00 | 0.00 | 0.00 |
| | $As_2O_3$ | 0.00 | 0.00 | 0.00 | 0.00 | 0.00 | 0.00 | 0.00 |
| Composition [ppm] | Pt | 1.50 | 1.50 | 1.50 | 1.50 | 1.50 | 1.50 | 0.02 |
| | RF | 0.02 | 0.02 | 0.02 | 0.02 | 0.02 | 0.02 | 0.01 |
| | Pt + Rh | 1.52 | 1.52 | 1.52 | 1.52 | 1.52 | 1.52 | 0.03 |
| Sn/(P + B + Zr + Ti + Sn) | | 0.313 | 0.254 | 0.282 | 0.306 | 0.221 | 0.272 | 0.271 |
| Al/(Zr + Sn) | | 5.95 | 6.53 | 6.50 | 6.59 | 6.62 | 5.95 | 5.95 |
| (Mg + Zn)/Li | | 0.332 | 0.332 | 0.334 | 0.334 | 0.334 | 0.340 | 0.340 |
| Sn/(Zr + Sn) | | 0.31 | 0.31 | 0.31 | 0.31 | 0.30 | 0.30 | 0.30 |
| (Si + Al)/Li | | 24.76 | 24.51 | 24.62 | 24.73 | 24.38 | 24.51 | 24.51 |
| (Si + Al)/Sn | | 77.86 | 77.76 | 76.78 | 79.82 | 80.81 | 79.82 | 79.82 |
| (Li + Na + K)/Zr | | 1.57 | 1.56 | 1.56 | 1.57 | 1.57 | 1.66 | 1.66 |
| Ti/Zr | | 0.0039 | 0.0039 | 0.0039 | 0.0039 | 0.0039 | 0.0031 | 0.0076 |
| Ti/(Ti + Fe) | | 0.667 | 0.667 | 0.667 | 0.667 | 0.667 | 0.615 | 0.690 |
| Na + K + Ca + Sr + Ba | | 1.59 | 1.60 | 1.60 | 1.61 | 1.64 | 1.95 | 1.95 |
| (Mg + Ca + Sr + Ba)/Zr | | 0.48 | 0.48 | 0.48 | 0.48 | 0.48 | 0.49 | 0.49 |
| (Mg + Ca + Sr + Ba)/(Li + Na + K) | | 0.31 | 0.31 | 0.31 | 0.31 | 0.31 | 0.29 | 0.29 |
| Sb + As | | 0.00 | 0.00 | 0.00 | 0.00 | 0.00 | 0.00 | 0.00 |
| Before crystallization | | | | | | | | |
| Transmittance [%] 3 mm thickness | 200 nm | 76.7 | 77.3 | 77.4 | 76.6 | 79.5 | 83.6 | 71.9 |
| | 250 nm | 23.4 | 23.6 | 23.7 | 23.6 | 24.0 | 24.1 | 20.9 |
| | 300 nm | 34.1 | 35.2 | 35.5 | 35.8 | 37.5 | 37.6 | 28.5 |
| | 325 nm | 71.5 | 72.2 | 72.5 | 72.2 | 73.2 | 73.3 | 66.0 |

TABLE 25-continued

|  |  | No. 83 | No. 84 | No. 85 | No. 86 | No. 87 | No. 88 | No. 89 |
|---|---|---|---|---|---|---|---|---|
|  | 350 nm | 85.9 | 86.1 | 86.2 | 86.1 | 86.4 | 86.5 | 84.0 |
|  | 380 nm | 90.0 | 90.0 | 90.0 | 90.1 | 90.1 | 90.3 | 89.7 |
|  | 800 nm | 91.7 | 91.7 | 91.7 | 91.6 | 91.7 | 91.8 | 91.5 |
|  | 1200 nm | 91.6 | 91.6 | 91.6 | 91.6 | 91.6 | 91.9 | 91.3 |
|  | L* | 96.7 | 96.6 | 96.6 | 96.7 | 96.7 | 96.7 | 96.7 |
|  | a* | 0.0 | 0.0 | 0.0 | 0.0 | −0.1 | 0.0 | −0.1 |
|  | b* | 0.3 | 0.3 | 0.3 | 0.3 | 0.3 | 0.3 | 0.3 |
| Low temperature viscosity | Strain point [° C.] | Not measured | Not measured | Not measured | Not measured | Not measured | 678 | Not measured |
|  | Annealing point [° C.] | Not measured | Not measured | Not measured | Not measured | Not measured | 737 | Not measured |
|  | Glass transition point [° C.] | Not measured | Not measured | Not measured | Not measured | Not measured | 738 | Not measured |
| High temperature viscosity | $10^4$[° C.] | Not measured | Not measured | 1331 | Not measured | Not measured | 1354 | Not measured |
|  | $10^3$[° C.] | Not measured | Not measured | 1506 | Not measured | Not measured | 1538 | Not measured |
|  | $10^{2.5}$[° C.] | Not measured | Not measured | 1616 | Not measured | Not measured | 1654 | Not measured |
|  | $10^2$[° C.] | Not measured | Not measured | 1744 | Not measured | Not measured | 1793 | Not measured |
|  | Liquidus temperature (° C.) | 1419 | Not measured | Not measured | 1441 (mullite) | Not measured | 1407 | Not measured |
|  | Liquidus viscosity [—] | Not measured | Not measured | Not measured | Not measured | Not measured | 3.7 | Not measured |
| $\alpha[\times10^{-7}/° C.]$ | 30-380° C. | Not measured | Not measured | Not measured | Not measured | Not measured | 39.6 | Not measured |
|  | Density [g/cm3] | 2.428 | 2.442 | 2.443 | 2.444 | 2.441 | 2.429 | 2.429 |
|  | β-OH[/mm] | 0.83 | 0.07 | 0.15 | 0.18 | 0.22 | 0.12 | 0.54 |

TABLE 26

|  |  | No. 83 | No. 84 | No. 85 | No. 86 | No. 87 | No. 88 | No. 89 |
|---|---|---|---|---|---|---|---|---|
|  |  | After crystallization | | | | | | |
| Crystallization condition |  | 780° C.-3 h 890° C.-1 h | 780° C.-3 h 890° C.-1 h | 780° C.-3 h 890° C.-1 h | 780° C.-3 h 890° C.-1 h | 780° C.-3 h 890° C.-1 h | 780° C.-3 h 890° C.-1 h | 780° C.-3 h 890° C.-1 h |
| Transmittance [%] 3 mm thickness | 200 nm | Not measured | Not measured | Not measured | Not measured | Not measured | Not measured | Not measured |
|  | 250 nm | Not measured | Not measured | Not measured | Not measured | Not measured | Not measured | Not measured |
|  | 300 nm | Not measured | Not measured | Not measured | Not measured | Not measured | Not measured | Not measured |
|  | 325 nm | Not measured | Not measured | Not measured | Not measured | Not measured | Not measured | Not measured |
|  | 350 nm | Not measured | Not measured | Not measured | Not measured | Not measured | Not measured | Not measured |
|  | 380 nm | Not measured | Not measured | Not measured | Not measured | Not measured | Not measured | Not measured |
|  | 800 nm | Not measured | Not measured | Not measured | Not measured | Not measured | Not measured | Not measured |
|  | 1200 nm | Not measured | Not measured | Not measured | Not measured | Not measured | Not measured | Not measured |
|  | L* | Not measured | Not measured | Not measured | Not measured | Not measured | Not measured | Not measured |
|  | a* | Not measured | Not measured | Not measured | Not measured | Not measured | Not measured | Not measured |
|  | b* | Not measured | Not measured | Not measured | Not measured | Not measured | Not measured | Not measured |
|  | Precipitated crystal | β-Q | β-Q | β-Q | β-Q | β-Q | β-Q | β-Q |
|  | Average crystallite size [nm] | Not measured | Not measured | Not measured | Not measured | Not measured | Not measured | Not measured |
| $\alpha[\times10^{-7}/° C.]$ | 30-380° C. | −3.1 | Not measured | Not measured | Not measured | Not measured | Not measured | Not measured |
| $\alpha[\times10^{-7}/° C.]$ | 30-750° C. | −2.2 | Not measured | Not measured | Not measured | Not measured | Not measured | Not measured |

TABLE 26-continued

|  | No. 83 | No. 84 | No. 85 | No. 86 | No. 87 | No. 88 | No. 89 |
|---|---|---|---|---|---|---|---|
| Density [g/cm3] | 2.512 | 2.514 | 2.515 | 2.516 | 2.517 | 2.516 | 2.524 |
| Young's Modulus [GPa] | Not measured | Not measured | Not measured | Not measured | Not measured | Not measured | Not measured |
| Modulus of rigidity [GPa] | Not measured | Not measured | Not measured | Not measured | Not measured | Not measured | Not measured |
| Poisson's ratio | Not measured | Not measured | Not measured | Not measured | Not measured | Not measured | Not measured |
| Appearance | Colorless and transparent | Colorless and transparent | Colorless and transparent | Colorless and transparent | Colorless and transparent | Colorless and transparent | Colorless and transparent |
| Rate of change before and after crystallization [%] | | | | | | | |
| 200 nm | Not measured | Not measured | Not measured | Not measured | Not measured | Not measured | Not measured |
| 250 nm | Not measured | Not measured | Not measured | Not measured | Not measured | Not measured | Not measured |
| 300 nm | Not measured | Not measured | Not measured | Not measured | Not measured | Not measured | Not measured |
| 325 nm | Not measured | Not measured | Not measured | Not measured | Not measured | Not measured | Not measured |
| 350 nm | Not measured | Not measured | Not measured | Not measured | Not measured | Not measured | Not measured |
| 380 nm | Not measured | Not measured | Not measured | Not measured | Not measured | Not measured | Not measured |
| 800 nm | Not measured | Not measured | Not measured | Not measured | Not measured | Not measured | Not measured |
| 1200 nm | Not measured | Not measured | Not measured | Not measured | Not measured | Not measured | Not measured |

TABLE 27

|  |  | No. 90 | No. 91 | No. 92 | No. 93 | No. 94 | No. 95 |
|---|---|---|---|---|---|---|---|
| Composition [wt %] | $SiO_2$ | 67.90 | 67.9 | 67.9 | 67.8 | 68.5 | 68.2 |
|  | $Al_2O_3$ | 22.3 | 22.3 | 22.3 | 22.5 | 21.9 | 22.0 |
|  | $B_2O_3$ | 0.00 | 0.00 | 0.00 | 0.00 | 0.00 | 0.00 |
|  | $P_2O_5$ | 0.40 | 0.40 | 0.40 | 0.40 | 0.40 | 0.45 |
|  | $Li_2O$ | 3.68 | 3.68 | 3.68 | 3.68 | 3.68 | 3.68 |
|  | $Na_2O$ | 0.67 | 0.67 | 0.67 | 0.58 | 0.58 | 0.68 |
|  | $K_2O$ | 0.01 | 0.01 | 0.01 | 0.00 | 0.00 | 0.02 |
|  | MgO | 1.25 | 1.25 | 1.25 | 1.23 | 1.22 | 1.24 |
|  | CaO | 0.024 | 0.024 | 0.024 | 0.020 | 0.019 | 0.054 |
|  | SrO | 0.00 | 0.00 | 0.00 | 0.00 | 0.00 | 0.00 |
|  | BaO | 0.00 | 0.00 | 0.00 | 0.00 | 0.00 | 0.06 |
|  | ZnO | 0.00 | 0.00 | 0.00 | 0.00 | 0.00 | 0.00 |
|  | $TiO_2$ | 0.0200 | 0.0200 | 0.0200 | 0.0100 | 0.0100 | 0.1200 |
|  | $SnO_2$ | 1.13 | 1.13 | 1.13 | 1.18 | 1.18 | 1.04 |
|  | $ZrO_2$ | 2.62 | 2.62 | 2.62 | 2.60 | 2.58 | 2.51 |
|  | $Fe_2O_3$ | 0.0090 | 0.0090 | 0.0090 | 0.0050 | 0.0040 | 0.0140 |
|  | $Sb_2O_3$ | 0.00 | 0.00 | 0.00 | 0.00 | 0.00 | 0.00 |
|  | $As_2O_3$ | 0.00 | 0.00 | 0.00 | 0.00 | 0.00 | 0.00 |
| Composition [ppm] | Pt | 0.02 | 0.02 | 0.02 | 1.50 | 1.50 | 1.50 |
|  | RF | 0.01 | 0.01 | 0.01 | 0.02 | 0.02 | 0.02 |
|  | Pt + Rh | 0.03 | 0.03 | 0.03 | 1.52 | 1.52 | 1.52 |
| Sn/(P + B + Zr + Ti + Sn) |  | 0.271 | 0.271 | 0.271 | 0.282 | 0.283 | 0.252 |
| Al/(Zr + Sn) |  | 5.95 | 5.95 | 5.95 | 5.95 | 5.82 | 6.20 |
| (Mg + Zn)/Li |  | 0.340 | 0.340 | 0.340 | 0.334 | 0.332 | 0.337 |
| Sn/(Zr + Sn) |  | 0.30 | 0.30 | 0.30 | 0.31 | 0.31 | 0.29 |
| (Si + Al)/Li |  | 24.51 | 24.51 | 24.51 | 24.54 | 24.57 | 24.51 |
| (Si + Al)/Sn |  | 79.82 | 79.82 | 79.82 | 76.53 | 76.61 | 86.73 |
| (Li + Na + K)/Zr |  | 1.66 | 1.66 | 1.66 | 1.64 | 1.65 | 1.74 |
| Ti/Zr |  | 0.0076 | 0.0076 | 0.0076 | 0.0038 | 0.0039 | 0.0478 |
| Ti/(Ti + Fe) |  | 0.690 | 0.690 | 0.690 | 0.667 | 0.714 | 0.896 |
| Na + K + Ca + Sr + Ba |  | 1.95 | 1.95 | 1.95 | 1.83 | 1.82 | 2.05 |
| (Mg + Ca + Sr + Ba)/Zr |  | 0.49 | 0.49 | 0.49 | 0.48 | 0.48 | 0.54 |
| (Mg + Ca + Sr + Ba)/(Li + Na + K) |  | 0.29 | 0.29 | 0.29 | 0.29 | 0.29 | 0.31 |
| Sb + As |  | 0.00 | 0.00 | 0.00 | 0.00 | 0.00 | 0.00 |

TABLE 27-continued

| | | No. 90 | No. 91 | No. 92 | No. 93 | No. 94 | No. 95 |
|---|---|---|---|---|---|---|---|
| | | Before crystallization | | | | | |
| Transmittance [%] 3 mm thickness | 200 nm | 71.9 | 71.9 | 71.9 | 84.1 | 86.3 | Not measured |
| | 250 am | 20.9 | 20.9 | 20.9 | 24.2 | 24.4 | Not measured |
| | 300 nm | 28.5 | 28.5 | 28.5 | 36.5 | 37.4 | Not measured |
| | 325 nm | 66.0 | 66.0 | 66.0 | 72.7 | 73.6 | Not measured |
| | 350 nm | 84.0 | 84.0 | 84.0 | 86.2 | 86.7 | Not measured |
| | 380 nm | 89.7 | 89.7 | 89.7 | 90.2 | 90.3 | Not measured |
| | 800 nm | 91.5 | 91.5 | 91.5 | 91.6 | 91.8 | Not measured |
| | 1200 nm | 91.3 | 91.3 | 91.3 | 91.7 | 91.9 | Not measured |
| | L* | 96.7 | 96.7 | 96.7 | 96.7 | 96.7 | 96.6 |
| | a* | −0.1 | −0.1 | −0.1 | 0.0 | −0.1 | −0.1 |
| | b* | 0.3 | 0.3 | 0.3 | 0.3 | 0.3 | 0.4 |
| Low temperature viscosity | Strain point [° C.] | Not measured | Not measured | Not measured | Not measured | Not measured | Not measured |
| | Annealing point [° C.] | Not measured | Not measured | Not measured | Not measured | Not measured | Not measured |
| | Glass transition point [° C.] | Not measured | Not measured | Not measured | Not measured | Not measured | 733 |
| High temperature viscosity | $10^4$[° C.] | Not measured | Not measured | Not measured | Not measured | Not measured | 1357 |
| | $10^3$[° C.] | Not measured | Not measured | Not measured | Not measured | Not measured | 1542 |
| | $10^{2.5}$[° C.] | Not measured | Not measured | Not measured | Not measured | Not measured | 1656 |
| | $10^2$[° C.] | Not measured | Not measured | Not measured | Not measured | Not measured | 1788 |
| | Liquidus temperature (° C.) | Not measured | Not measured | Not measured | Not measured | Not measured | 1400 |
| | Liquidus viscosity [—] | Not measured | Not measured | Not measured | Not measured | Not measured | 3.8 |
| $\alpha[\times10^{-7}/°\ C.]$ | 30-380° C. | Not measured | Not measured | Not measured | Not measured | Not measured | 39.2 |
| | Density [g/cm3] | 2.429 | 2.429 | 2.429 | 2.432 | 2.428 | 2.425 |
| | β-OH[/mm] | 0.28 | 0.16 | 0.19 | 0.25 | 0.32 | 0.47 |

TABLE 28

| | | No. 90 | No. 91 | No. 92 | No. 93 | No. 94 | No. 95 |
|---|---|---|---|---|---|---|---|
| | | After crystallization | | | | | |
| Crystallization condition | | 780° C.-3 h 890° C.-1 h | 780° C.-3 h 890° C.-1 h | 780° C.-3 h 890° C.-0.25 h | 780° C.-1.5 h 920° C.-0.5 h | 810° C.-0.75 h 920° C.-0.25 h | 780° C.-3 h 890° C.-1 h |
| Transmittance [%] 3 mm thickness | 200 nm | 30.9 | 33 | 35.2 | 35 | 40 | 37.8 |
| | 250 nm | 14.8 | 11.9 | 13.1 | 12.8 | 13 | 15.1 |
| | 300 nm | 24.2 | 16.8 | 18.7 | 17.5 | 14.1 | 22.5 |
| | 325 nm | 63.5 | 59.4 | 59.4 | 54.8 | 51.7 | 61.2 |
| | 350 nm | 78.3 | 79 | 77.8 | 73 | 72.9 | 76.6 |
| | 380 nm | 83.4 | 86 | 85.1 | 81 | 82.3 | 82.0 |
| | 800 nm | 90.9 | 91 | 91.2 | 91 | 90.9 | 90.6 |
| | 1200 nm | 91.3 | 91 | 90.6 | 91 | 90.2 | 91.1 |
| | L* | 95.6 | 96.2 | 96.1 | 95.56 | 95.7 | 95.3 |
| | a* | 0.1 | 0.0 | −0.1 | −0.15 | 0.0 | 0.1 |
| | b* | 1.5 | 0.8 | 1.0 | 1.82 | 1.5 | 1.8 |
| Precipitated crystal | | β-Q | β-Q | β-Q | β-Q | β-Q | β-Q |
| Average crystallite size [nm] | | 41 | Not measured | Not measured | Not measured | Not measured | Not measured |

TABLE 28-continued

| | | No. 90 | No. 91 | No. 92 | No. 93 | No. 94 | No. 95 |
|---|---|---|---|---|---|---|---|
| $\alpha[\times10^{-7}/°$ C.] | 30-380° C. | −1.3 | Not measured | Not measured | Not measured | Not measured | Not measured |
| $\alpha[\times10^{-7}/°$ C.] | 30-750° C. | −0.2 | Not measured | Not measured | Not measured | Not measured | Not measured |
| Density [g/cm3] | | 2.508 | 2.508 | 2.504 | 2.505 | 2.511 | 2.508 |
| Young's Modulus [GPa] | | Not measured | Not measured | Not measured | Not measured | Not measured | Not measured |
| Modulus of rigidity [GPa] | | Not measured | Not measured | Not measured | Not measured | Not measured | Not measured |
| Poisson's ratio | | Not measured | Not measured | Not measured | Not measured | Not measured | Not measured |
| Appearance | | Colorless and transparent | Colorless and transparent | Colorless and transparent | Colorless and transparent | Colorless and transparent | Colorless and transparent |
| Rate of change before and after crystallization [%] | | | | | | | |
| 200 nm | | 63.1 | 53.9 | 51.0 | 51.5 | 43.7 | 55.1 |
| 250 nm | | 38.7 | 43.2 | 37.6 | 38.9 | 36.1 | 37.7 |
| 300 nm | | 35.6 | 40.9 | 34.3 | 38.4 | 50.4 | 38.2 |
| 325 nm | | 13.4 | 10.0 | 10.0 | 17.0 | 21.7 | 15.8 |
| 350 nm | | 9.4 | 6.2 | 7.4 | 13.2 | 13.3 | 11.2 |
| 380 nm | | 7.6 | 3.9 | 5.1 | 9.5 | 8.2 | 9.1 |
| 800 nm | | 0.9 | 0.2 | 0.3 | 0.7 | 0.6 | 1.1 |
| 1200 nm | | 0.6 | 0.5 | 0.7 | 0.7 | 1.2 | 0.7 |

TABLE 29

| | | No. 96 | No. 97 | No. 98 | No. 99 |
|---|---|---|---|---|---|
| Composition [wt %] | $SiO_2$ | 67.3 | 67.3 | 67.2 | 65.7 |
| | $Al_2O_3$ | 22.3 | 22.3 | 22.3 | 22.2 |
| | $B_2O_3$ | 0.00 | 0.00 | 0.00 | 0 |
| | $P_2O_3$ | 0.40 | 0.40 | 0.40 | 1.4 |
| | $Li_2O$ | 3.68 | 3.68 | 3.68 | 3.7 |
| | NaO | 0.67 | 0.67 | 0.67 | 0.4 |
| | $K_2O$ | 0.01 | 0.01 | 0.01 | 0.3 |
| | MgO | 1.25 | 1.25 | 1.25 | 0.7 |
| | CaO | 0.024 | 0.024 | 0.024 | 0 |
| | SrO | 0.00 | 0.00 | 0.00 | 0 |
| | BaO | 0.00 | 0.00 | 0.00 | 1.2 |
| | ZnO | 0.00 | 0.00 | 0.00 | 0 |
| | $TiO_2$ | 0.0080 | 0.0080 | 0.0080 | 2 |
| | $SnO_2$ | 1.13 | 1.13 | 1.13 | 0.2 |
| | $ZrO_2$ | 2.62 | 2.62 | 2.62 | 2.2 |
| | $Fe_2O_3$ | 0.0050 | 0.0050 | 0.0050 | 0.015 |
| | $Sb_2O_3$ | 0.65 | 0.00 | 0.30 | 0 |
| | $As_2O_3$ | 0.00 | 0.65 | 0.38 | 0 |
| Composition [ppm] | Pt | 1.50 | 1.50 | 1.50 | 0.05 |
| | Rh | 0.02 | 0.02 | 0.02 | 0.05 |
| | Pt + Rh | 1.52 | 1.52 | 1.52 | 0.1 |
| | Sn/(P + B + Zr + Ti + Sn) | 0.272 | 0.272 | 0.272 | 0.034 |
| | Al/(Zr + Sn) | 5.95 | 5.95 | 5.95 | 9.250 |
| | (Mg + Zn)/Li | 0.340 | 0.340 | 0.340 | 0.189 |
| | Sn/(Zr + Sn) | 0.30 | 0.30 | 0.30 | 0.08 |
| | (Si + Al)/Li | 24.33 | 24.33 | 24.33 | 23.76 |
| | (Si + Al)/Sn | 79.25 | 79.25 | 79.22 | 439.50 |
| | (Li + Na + K)/Zr | 1.66 | 1.66 | 1.66 | 2.00 |
| | Ti/Zr | 0.0031 | 0.0031 | 0.0031 | 0.909 |
| | Ti/(Ti + Fe) | 0.615 | 0.615 | 0.615 | 0.993 |
| | Na + K + Ca + Sr + Ba | 1.95 | 1.95 | 1.95 | 4.8 |
| | (Mg + Ca + Sr + Ba)/Zr | 0.49 | 0.49 | 0.49 | 0.86 |
| | (Mg + Ca + Sr + Ba)/(Li + Na + K) | 0.29 | 0.29 | 0.29 | 0.43 |
| | Sb + As | 0.65 | 0.65 | 0.68 | 0 |
| Before crystallization | | | | | |
| Transmittance [%] 3 mm thickness | 200 nm | Not measured | Not measured | Not measured | Not measured |
| | 250 nm | Not measured | Not measured | Not measured | Not measured |
| | 300 nm | Not measured | Not measured | Not measured | Not measured |
| | 325 nm | Not measured | Not measured | Not measured | Not measured |
| | 350 nm | Not measured | Not measured | Not measured | Not measured |
| | 380 nm | Not measured | Not measured | Not measured | Not measured |
| | 800 nm | Not measured | Not measured | Not measured | Not measured |
| | 1200 nm | Not measured | Not measured | Not measured | Not measured |

TABLE 29-continued

| | | No. 96 | No. 97 | No. 98 | No. 99 |
|---|---|---|---|---|---|
| | L* | Not measured | Not measured | Not measured | Not measured |
| | a* | Not measured | Not measured | Not measured | Not measured |
| | b* | Not measured | Not measured | Not measured | Not measured |
| Low temperature | Strain point [° C.] | Not measured | Not measured | Not measured | Not measured |
| viscosity | Annealing point [° C.] | Not measured | Not measured | Not measured | Not measured |
| | Glass transition point [° C.] | Not measured | Not measured | Not measured | Not measured |
| High | 10^4[° C.] | Not measured | Not measured | Not measured | Not measured |
| temperature | 10^3[° C.] | Not measured | Not measured | Not measured | Not measured |
| viscosity | 10^2.5[° C.] | Not measured | Not measured | Not measured | Not measured |
| | 10^2[° C.] | Not measured | Not measured | Not measured | Not measured |
| Liquidus temperature (° C.) | | Not measured | Not measured | Not measured | Not measured |
| Liquidus viscosity [—] | | Not measured | Not measured | Not measured | Not measured |
| $\alpha[\times 10^{-7}/°\,C.]$ | 30-380° C. | Not measured | Not measured | Not measured | Not measured |
| Density [g/cm3] | | Not measured | Not measured | Not measured | Not measured |
| β-OH[/mm] | | 0.001 | 1.12 | 0.69 | Not measured |

TABLE 30

| | | No. 96 | No. 97 | No. 98 | No. 99 |
|---|---|---|---|---|---|
| After crystallization | | | | | |
| Crystallization condition | | 780° C.-3 h 890° C.-1 h | 780° C.-3 h 890° C.-1 h | 780° C.-3 h 890° C.-1 h | 780° C.-3 h 890° C.-1 h |
| Transmittance | 200 nm | Not measured | Not measured | Not measured | Not measured |
| [%] 3 mm | 250 nm | Not measured | Not measured | Not measured | Not measured |
| thickness | 300 nm | Not measured | Not measured | Not measured | Not measured |
| | 325 nm | Not measured | Not measured | Not measured | Not measured |
| | 350 nm | Not measured | Not measured | Not measured | Not measured |
| | 380 nm | Not measured | Not measured | Not measured | Not measured |
| | 800 nm | Not measured | Not measured | Not measured | Not measured |
| | 1200 nm | Not measured | Not measured | Not measured | Not measured |
| L* | | Not measured | Not measured | Not measured | 88.0 |
| a* | | Not measured | Not measured | Not measured | 0.0 |
| b* | | Not measured | Not measured | Not measured | 6.2 |
| Precipitated crystal | | β-Q | β-Q | β-Q | β-Q |
| Average crystallite size [nm] | | Not measured | Not measured | Not measured | Not measured |
| $\alpha[\times 10^{-7}/°\,C.]$ | 30-380° C. | Not measured | Not measured | Not measured | Not measured |
| $\alpha[\times 10^{-7}/°\,C.]$ | 30-750° C. | Not measured | Not measured | Not measured | Not measured |
| Density [g/cm3] | | Not measured | Not measured | Not measured | Not measured |
| Young's Modulus [GPa] | | Not measured | Not measured | Not measured | Not measured |
| Modulus of rigidity [GPa] | | Not measured | Not measured | Not measured | Not measured |
| Poisson's ratio | | Not measured | Not measured | Not measured | Not measured |
| Appearance | | Colorless and transparent | Colorless and transparent | Colorless and transparent | Yellow |
| Rate of change before and after crystallization [%] | | | | | |
| 200 nm | | Not measured | Not measured | Not measured | Not measured |
| 250 nm | | Not measured | Not measured | Not measured | Not measured |
| 300 nm | | Not measured | Not measured | Not measured | Not measured |
| 325 nm | | Not measured | Not measured | Not measured | Not measured |
| 350 nm | | Not measured | Not measured | Not measured | Not measured |
| 380 nm | | Not measured | Not measured | Not measured | Not measured |
| 800 nm | | Not measured | Not measured | Not measured | Not measured |
| 1200 nm | | Not measured | Not measured | Not measured | Not measured |

Manufacture and Evaluation of $Li_2O$—$Al_2O_3$—$SiO_2$-Based Crystallized Glass Sheet Firstly, in order that the glass has the composition shown in each table, each raw material was mixed in the form of an oxide, a hydroxide, a carbonate, a nitrates, and the like to obtain a glass batch (composition shown in each table is an analytical value of an actually-prepared glass). The obtained glass batch was placed in a crucible containing platinum and rhodium, a strengthened platinum crucible containing no rhodium, a refractory crucible, or a quartz crucible, the glass batch was melted at 1600° C. for 4 to 100 hours, and then, the temperature was raised to 1650 to 1680° C. to melt the glass batch for 0.5 to 20 hours, the melted glass batch was formed into a roll having a thickness of 5 mm, the resultant glass roll was further subject to heat treatment at 700° C. for 30 minutes using an annealing furnace, and the temperature of the annealing furnace was decreased to room temperature at 100° C./h to obtain a crystallizable glass. Note that the melting was performed by an electro-melting method used broadly for the development of glass materials.

The contents of Pt and Rh of the sample were analyzed using ICP-MS equipment (Agilent 8800 manufactured by Agilent Technologies, Inc.). Firstly, after the produced glass sample was pulverized and wetted with pure water, perchloric acid, nitric acid, sulfuric acid, hydrofluoric acid, and the like were added, and the sample was melted. Thereafter, the contents of Pt and Rh of the sample were measured by ICP-MS. Based on a calibration curve prepared by using solutions containing Pt and Rh at known concentrations, which were prepared in advance, the contents of Pt and Rh of each measurement sample were evaluated. The measurement mode was He gas/HMI (low mode) for Pt and HEHe gas/HMI (medium mode) for Rh, and the mass numbers were 198 for Pt and 103 for Rh. Note that the content of $Li_2O$ of the prepared sample was analyzed by using an atomic absorption spectrometer (ContrAA600, manufactured by Analytik Jena GmbH). Including a flow of melting the glass sample and the use of calibration curves, the analysis was performed basically in much the same way as in the analysis of Pt and Rh. The contents of other components were measured by using ICP-MS or atomic absorption spectrometry in much the same way as Pt, Rh, $Li_2O$, or by creating a calibration curve on an XRF analyzer (ZSX Primus IV manufactured by Rigaku Corporation) by using, as a calibration curve sample, a glass sample with a known concentration determined in advance using ICP-MS or an atomic absorption spectrometer, and, based on the calibration curve, evaluating an actual content of each component from an XRF analysis value of the measurement sample. During the XRF analysis, a tube voltage, a tube current, an exposure time, and the like were adjusted in accordance with the components to be analyzed.

The crystallizable glass described in each table was subjected to heat treatment for nucleation at from 750 to 900° C. for 0.75 to 60 hours, and then, a heat treatment at from 800 to 1000° C. for 0.25 to 3 hours was further performed for crystallization. Thereafter, heat treatment was performed at 700° C. for 30 minutes, and the temperature was decreased to room temperature by 100° C./h. The obtained crystallized glass was evaluated in terms of transmittance, diffuse transmittance, lightness, chromaticity, precipitated crystal, average crystallite size, thermal expansion coefficient, density, Young's modulus, modulus of rigidity, Poisson's ratio, and appearance. For the crystallizable glass before crystallization, the transmittance, the lightness, the chromaticity, and the like were measured in much the same way as in the crystallized glass. The crystallizable glass was further evaluated in terms of a β-OH value, a viscosity, and a liquidus temperature.

The transmittance, the lightness, and the chromaticity were evaluated by measurement by using a spectrophotometer for a crystallized glass sheet with both surfaces being optically polished to have 3 mm thick. A spectrophotometer V-670 manufactured by JASCO Corporation was used for the measurement. Note that V-670 is attached with "ISN-723", which is an integrating sphere unit, and the transmittance measured corresponds to a total light transmittance. A measurement wavelength range was set from 200 to 1500 nm, a scan speed was set to 200 nm/min, a sampling pitch was set to 1 nm, a bandwidth was set to 5 nm for a wavelength range from 200 to 800 nm, and was set to 20 nm for other wavelength ranges. Baseline correction (100% adjustment) and dark measurement (0% adjustment) were performed before the measurement. During the dark measurement, a barium sulfate plate that came along with ISN-723 was removed. The measured transmittance was used to calculate tristimulus values XYZ according to JISZ8781-42013 and the corresponding international standards, and the lightness and the chromaticity were calculated from each stimulus value (light source) C/10°. When the diffuse transmittance of the crystallized glass was measured, the same model as above was used, and the sample to be measured was placed and the measurement was performed while a barium sulfate plate that came along with ISN-723 was removed.

The precipitated crystal was evaluated by using an X-ray diffractometer (fully automatic multi-purpose horizontal X-ray diffractometer Smart Lab, manufactured by Rigaku Corporation). The scanning mode was set to 2θ/θ measurement, scan type was continuous scan, scattering and divergence slit width were 1°, light receiving slit width was 0.2°, a measuring range was from 10 to 60°, a measurement step was 0.1°, a scanning speed was 5°/min, and an analysis software packaged with the instrument was used to evaluate a main crystal and a crystal grain size. As a precipitation crystal seed identified as the main crystal, a β-quartz solid solution is indicated in the table as "β-Q". The average crystallite size of the main crystals was calculated by using the measured X-ray diffraction peak, based on the ebeye-Scherrer method. Note that in the measurement for calculating the average crystallite size, the scanning speed was set to 1°/min.

The thermal expansion coefficient was evaluated by using a crystallized glass sample processed to have a length of 20 mm and a diameter of 3.8 mm, and as an average linear thermal expansion coefficient measured in the temperature ranges from 30 to 380° C. and from 30 to 750° C. A Dilatometer manufactured by NETZSCH was used for the measurement. Further, the same measuring instrument was used to measure the thermal expansion curve for the temperature range from 30 to 750° C. and the inflection point of the curve was calculated to evaluate the glass transition point of the crystallizable glass before crystallization.

The Young's modulus, the modulus of rigidity, and the Poisson's ratio was measured at room temperature by using a plate-shaped sample (40 mm×20 mm×20 mm) whose surface was polished with a polishing liquid in which 1200 mesh alumina powder was dispersed, and by using a free resonance type elastic modulus measuring device (JE-RT3 manufactured by Nihon Techno-Plus Co. Ltd.)

The density was evaluated by an Archimedes's method.

The strain point and the annealing point were evaluated by a fiber elongation method. Note that a fiber sample was prepared by subjecting the crystallizable glass to hand-drawing.

An FT-IR Frontier (PerkinElmer Inc.) was used to measure the transmittance of the glass to evaluate the β-OH value according to the following formula. Note that the scanning speed was set to 100 μm/min, and the sampling pitch was set to 1 $cm^{-1}$, and the number of times of scans was set to 10 times per measurement.

$$\beta\text{-OH value}=(1/X)\log 10(T_1/T_2)$$

X: Glass thickness (mm)

$T_1$: Transmittance (%) at a reference wavelength of 3846 $cm^{-1}$ $T_2$: Minimum transmittance (%) near an absorption wavelength of hydroxyl groups of 3600 $cm^{-1}$ The high temperature viscosity was evaluated by a platinum ball pulling-up method. For the evaluation, a lumpy glass sample was crushed into appropriate sizes, and fed into an alumina crucible while inclusion of air bubbles was avoided as much as possible. Then, the alumina crucible was heated to melt the sample, and the viscosity of the glass was measured at a plurality of temperatures. The constant of the Vogel-Fulcher equation was calculated, a viscosity curve was created, and the temperature at each viscosity was calculated.

The liquidus temperature was evaluated by the following method. Firstly, a platinum boat of about 120×20×10 mm was filled with a glass powder having a uniform size from 300 to 500 micrometers, placed in an electric furnace, and melted at 1600° C. for 30 minutes. Thereafter, the platinum boat was placed in an electric furnace having a linear temperature gradient, left to stand for 20 hours, and the devitrification was precipitated. After air cooling of the measurement sample to room temperature, the devitrification precipitated at an interface between the platinum boat and the glass was observed. A temperature of a part where devitrification was precipitated was calculated from a temperature gradient graph of the electric furnace, and was recorded as the liquidus temperature. The obtained liquidus temperature was interpolated into a high-temperature viscosity curve of the glass, and the viscosity corresponding to the liquidus temperature was recorded as the liquidus viscosity. Note that it was found from results of X-ray diffraction, composition analysis, and the like (scanning electron microscope S3400N TyPE2 manufactured by Hitachi, Ltd., and EMAX ENERGY EX250X manufactured by HORIBA, Ltd.) that a primary phase of the glasses listed in each table was mainly $ZrO_2$.

Appearance was evaluated by visually observing the color tone of the crystallized glass. Note that the visual observation was performed on a white background and a black background under indoor light and sunlight, respectively (performed at 8:00, 12:00, and 16:00 on clear and cloudy days in January, April, July, and October). The color tone was determined comprehensively from each visual result.
Manufacture and Evaluation of Glass Article Firstly, 29.9 parts by mass of a silicone resin (resin solid content), 35.2 parts by mass of a white $TiO_2$ powder pigment (average particle size: 0.2 μm), and 11.7 parts by mass of talc (average particle size: 20 μm) as an extender pigment were mixed, and 23.2 parts by mass of an organic solvent was added to the mixture to produce a paste. Next, onto the entire surface of the thus-produced $Li_2O$—$Al_2O_3$—$SiO_2$-based crystallized glass sheet, the paste was applied by using screen printing so as to have a thickness of 10 μm. Thereafter, the paste was dried for 10 minutes at 70° C., and then subjected to firing for 15 minutes at 320° C. to form a white colored layer. As a result, a glass article was obtained.

The resultant glass articles were evaluated in terms of color tone. For Sample Nos. 1 to 98, which were Examples, white color equivalent to the color of the colored layer were obtained. In contrast, for Sample No. 99, which was Comparative Example, more yellowish color than the color of the colored layer was observed and the color tone of the colored layer was impaired.

Figure 2:
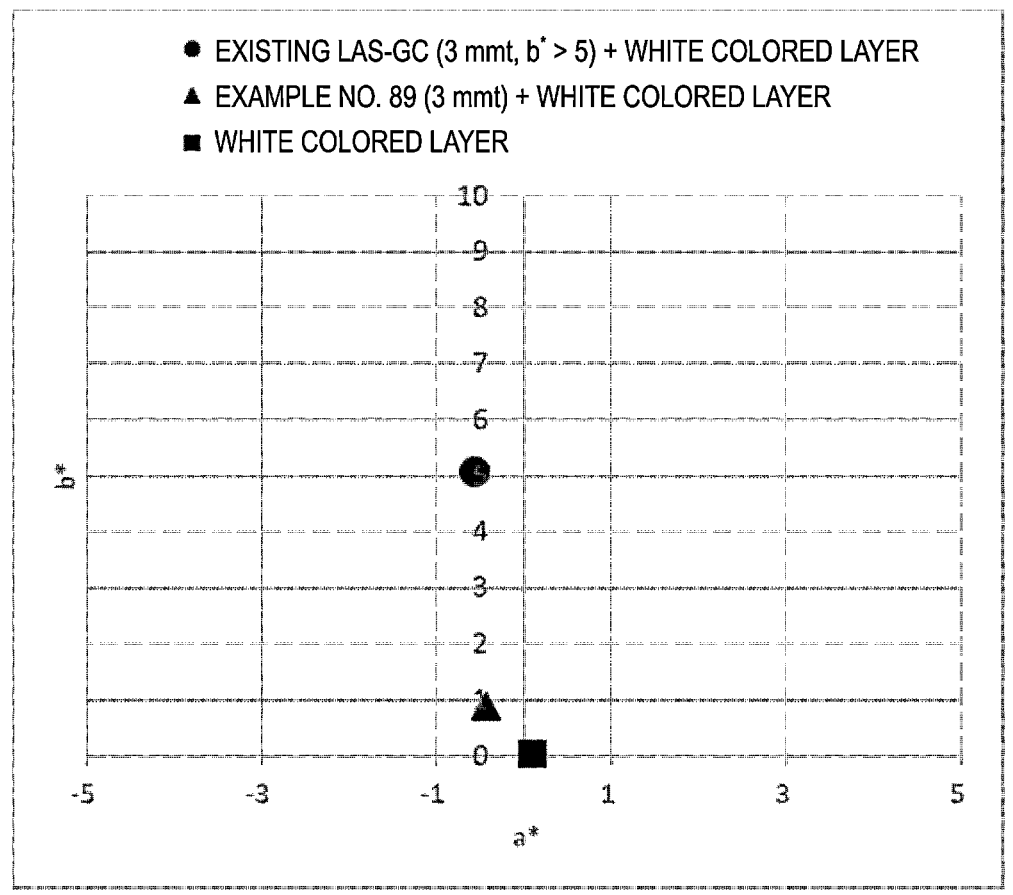
FIG. 2 shows measurement results of reflection chromaticity.

FIG. 2 shows measurement results of reflection chromaticity, for a glass article prepared by forming a white colored layer on Sample No. 89 (3 mm thick), and a glass article prepared by forming a white colored layer on an existing $Li_2O$—$Al_2O_3$—$SiO_2$-based crystallized glass sheet commercially available in the top plate market (3 mm thick, with chromaticity b* of greater than 5 as measured by the method described above) (the reflection chromaticity was measured using CM-600d manufactured by Konica Minolta, Inc.). As is obvious from FIG. 2, there was no difference in reflection chromaticity between Sample No. 89 and the colored layer, and, for Sample No. 89, the color tone equivalent to that of the colored layer could be observed. In contrast, there was a significant difference in reflection chromaticity between the existing $Li_2O$—$Al_2O_3$—$SiO_2$-based crystallized glass sheet and the colored layer, and, for that existing crystallized glass sheet, the color tone equivalent to that of the colored layer could not be observed. Note that the effects of the present invention were also confirmed for the colored layers in red, pink, blue, silver, and green, for example.

REFERENCE SIGNS LIST

1. Glass article
2. $Li_2O$—$Al_2O_3$—$SiO_2$-based crystallized glass sheet
2a. Cooking surface
2b. Back surface
3. Colored layer
The invention claimed is:
1. A glass article comprising:
a $Li_2O$—$Al_2O_3$—$SiO_2$-based crystallized glass sheet having lightness L* of 70 or greater, chromaticity a* of within ±5, and chromaticity b* of within ±5 at a thickness of 3 mm; and
a colored layer formed on a back surface of the $Li_2O$—$Al_2O_3$—$SiO_2$-based crystallized glass sheet; wherein
the $Li_2O$—$Al_2O_3$—$SiO_2$-based crystallized glass sheet includes, in mass %, $TiO_2$ from 0 to less than 2% and $ZrO_2$ from 2.1 to 20%, and
the mass ratio of $(Li_2O+Na_2O+K_2O)/ZrO_2$ is 1.98 or less.
2. The glass article according to claim 1, wherein the $Li_2O$—$Al_2O_3$—$SiO_2$-based crystallized glass sheet includes, in mass %, $SiO_2$ from 40 to 90%, $Al_2O_3$ from 5 to 30%, $Li_2O$ from 1 to 10%, $SnO_2$ from 0 to 20%, MgO from 0 to 10%, $P_2O_5$ from 0 to 10%, and $Sb_2O_3+As_2O_3$ from 0 to less than 2%.
3. The glass article according to claim 1, wherein appearance of the $Li_2O$—$Al_2O_3$—$SiO_2$-based crystallized glass sheet is colorless and transparent.
4. The glass article according to claim 1, wherein the $Li_2O$—$Al_2O_3$—$SiO_2$-based crystallized glass sheet has a transmittance of 10% or greater at a thickness of 3 mm and a wavelength of 300 nm.
5. The glass article according to claim 1, wherein the $Li_2O$—$Al_2O_3$—$SiO_2$-based crystallized glass sheet has a thermal expansion coefficient of $30 \times 10^{-7}/°$ C. or less at 30 to 380° C.
6. The glass article according to claim 1, wherein the $Li_2O$—$Al_2O_3$—$SiO_2$-based crystallized glass sheet has a thermal expansion coefficient of $30 \times 10^{-7}/°$ C. or less at 30 to 750° C.
7. A top plate for a cooker comprising the glass article according to claim 1.

* * * * *